United States Patent [19]

Kagawa et al.

[11] Patent Number: 5,729,636
[45] Date of Patent: Mar. 17, 1998

[54] METHOD AND APPARATUS FOR PERFORMING TONE CONVERSION

[75] Inventors: Shuichi Kagawa; Kazuhiro Chiba; Noriko Bamba; Yoshiaki Okuno, all of Nagaokakyo, Japan

[73] Assignee: Mitsubishi Denki Kabushiki Kaisha, Tokyo, Japan

[21] Appl. No.: 667,931

[22] Filed: Jun. 24, 1996

Related U.S. Application Data

[62] Division of Ser. No. 600,204, Feb. 12, 1996, Pat. No. 5,588,050, which is a continuation of Ser. No. 292,012, Aug. 18, 1994, abandoned.

[30] Foreign Application Priority Data

| Aug. 27, 1993 | [JP] | Japan | 5-212781 |
| Oct. 19, 1993 | [JP] | Japan | 5-260943 |
| Jun. 10, 1994 | [JP] | Japan | 6-129003 |

[51] Int. Cl.⁶ .................................................. G06K 9/40
[52] U.S. Cl. .................................................. 382/274; 358/455
[58] Field of Search .................................. 382/254, 274, 382/276; 358/455, 461, 523; 348/671, 674, 687

[56] References Cited

U.S. PATENT DOCUMENTS

| 4,665,435 | 5/1987  | Miura ............................ 358/80 |
| 4,862,255 | 8/1989  | Takanashi et al. ............ 358/80 |
| 4,887,150 | 12/1989 | Chiba et al. .................... 358/80 |
| 4,941,039 | 7/1990  | D'Errico ......................... 358/80 |
| 4,970,584 | 11/1990 | Sato et al. ...................... 358/75 |
| 5,233,412 | 8/1993  | Nishihara ....................... 358/75 |
| 5,267,030 | 11/1993 | Giorgianni et al. ............ 358/527 |
| 5,325,311 | 6/1994  | Yamada et al. ................. 364/525 |
| 5,343,312 | 8/1994  | Hibi et al. ....................... 358/520 |
| 5,345,320 | 9/1994  | Hirota ............................. 358/518 |
| 5,481,380 | 1/1996  | Bestmann ....................... 358/504 |
| 5,588,050 | 12/1996 | Kagawa et al. ................. 382/167 |

FOREIGN PATENT DOCUMENTS

| 57-9072   | 2/1982  | Japan | G07G 1/06 |
| 63-227181 | 9/1988  | Japan | H04N 1/46 |
| 64-47174  | 2/1989  | Japan | H04N 1/46 |
| 2-30226   | 7/1990  | Japan | H04N 1/46 |
| 3-81346   | 12/1991 | Japan | H04N 1/40 |
| 4-41551   | 7/1992  | Japan | H04N 1/40 |
| 5-73310   | 10/1993 | Japan | H04N 1/40 |

*Primary Examiner*—Andrew Johns

[57] ABSTRACT

An image processing method and apparatus for performing tone conversion on input image data X to produce converted data Y set a functional formula including at least two of a first-order term of the input image data X, a third-order term of the input image data X, and a fraction term of the input image data X. Alternatively, the function formula includes at least two of a second-order term of the input image data X, a third-order term of the input image data X, and a fraction term of the input image data X. Then, the converted data Y is output in accordance with the functional formula.

102 Claims, 62 Drawing Sheets

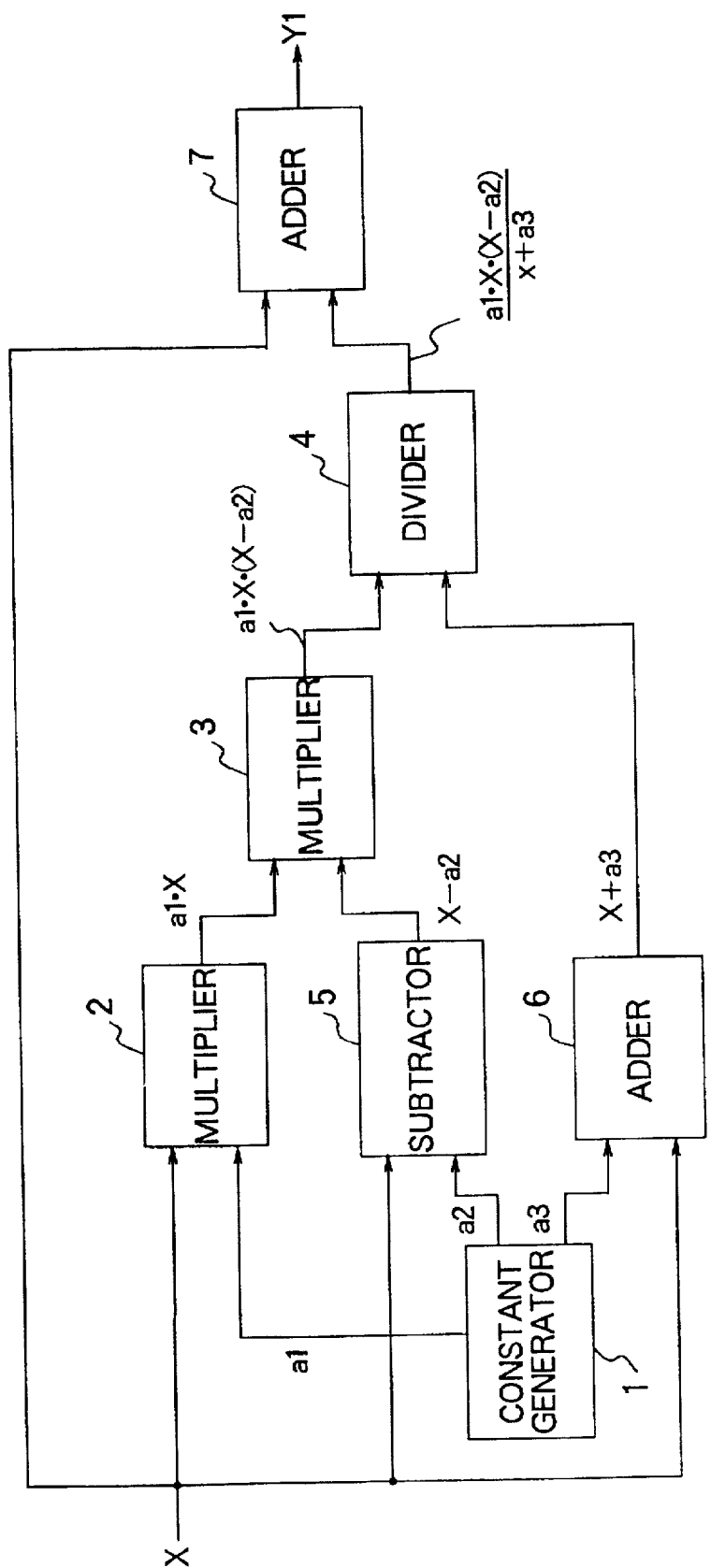

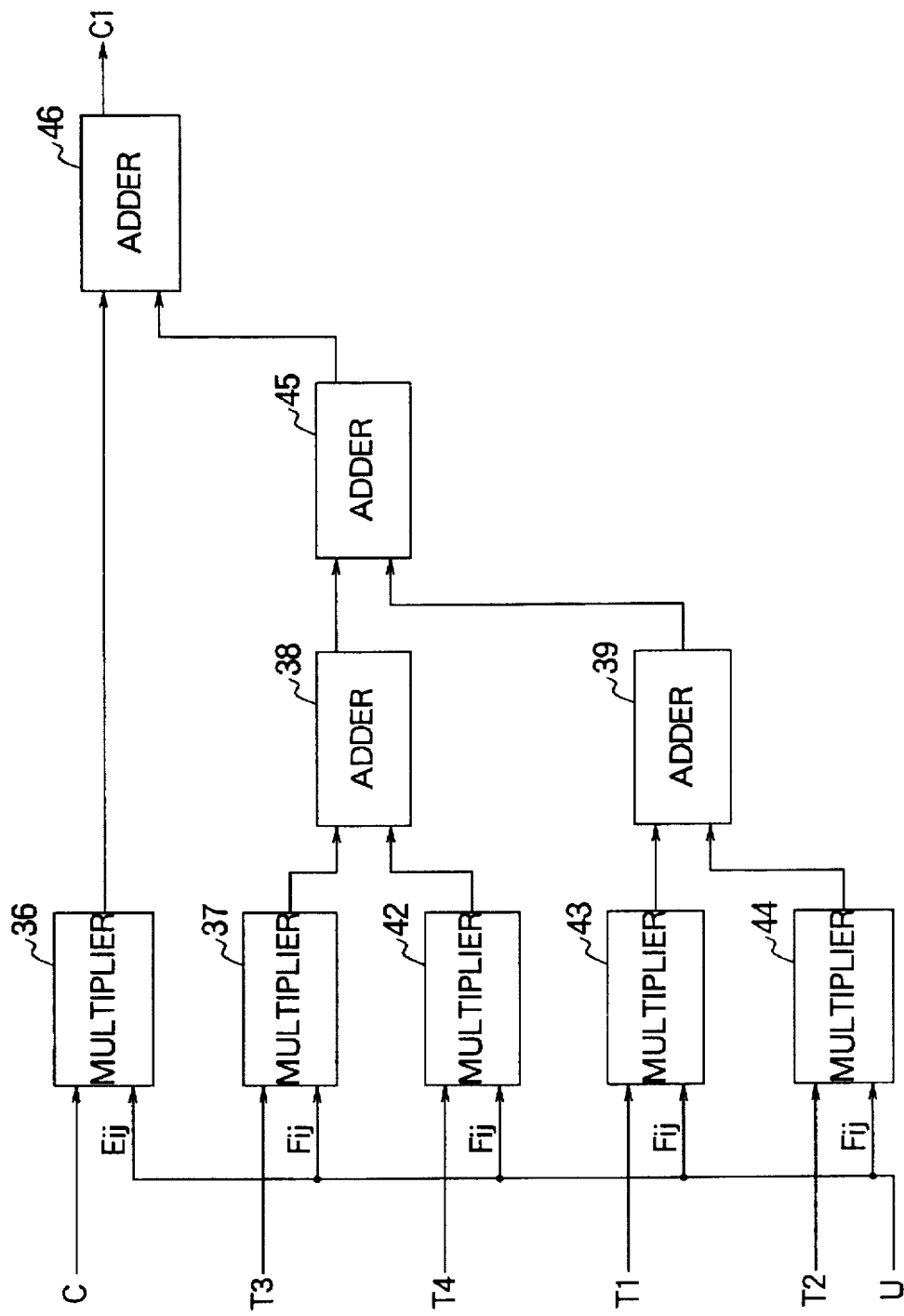

FIG.45A

| c | P1 * P2 | $\frac{P1 * P2}{P1 + P2}$ | Q1 * Q2 | $\frac{Q1 * Q2}{Q1 + Q2}$ |

| m | P1 * P2 | $\frac{P1 * P2}{P1 + P2}$ | Q1 * Q2 | $\frac{Q1 * Q2}{Q1 + Q2}$ |

| y | P1 * P2 | $\frac{P1 * P2}{P1 + P2}$ | Q1 * Q2 | $\frac{Q1 * Q2}{Q1 + Q2}$ |

| Eij | Fij | Fij | Fij | Fij |

METHOD AND APPARATUS FOR PERFORMING TONE CONVERSION

This application is a divisional of application Ser. No. 08/600,204, filed on Feb. 12, 1996, now U.S. Pat. No. 5,588,050, which is a Rule 62 Continuation of Ser. No. 08/292,012 filed Aug. 18, 1994, now abandoned, the entire contents of which are hereby incorporated by reference.

BACKGROUND OF THE INVENTION

The present invention relates to an image processing method and apparatus, and in particular those for use in video devices such as television sets and video tape recorders, information processing systems such as personal computers, and printing-related devices such as image scanners and printers.

More particularly, the invention relates to an image conversion process for modifying the tone characteristic of the video data or image data, data processing for converting image data represented by red, green and blue to printing data of yellow, magenta and cyan, with or without black, data processing for converting sensor data into color-separated data of red, green and blue.

A prior art image information processing system, which has been used in display systems in information processing systems such as computers, will first be described.

FIG. 61 is an example of a conventional tone processing device shown in Japanese Patent Kokoku Publication No. S57-9072. It comprises a refresh pattern memory 100 storing image information in digital values, a table select circuit 101, a RAM (random-access memory) 102 for storing tone compensation information, and a controller 103 for controlling the table select circuit 101 and the RAM 102.

The RAM 102 includes a plurality of compensation tables, each of which stores compensation data. The refresh pattern memory 100 stores image data X consisting of a plurality of pixel data forming one screen or raster. The image data X are sent as image density information from a host computer (not shown). The image data X from the refresh pattern memory 100 are converted at the table select circuit 101 having a function of selecting the compensation characteristic, into synthetic address data, which is then converted at a selected one of the compensation tables in the RAM 102. The output of the RAM 102 is converted data Y corresponding to the input image data X.

The controller 103 generates conversion characteristic selection data and the like, and controls the timings of the table select circuit 101 and the RAM 102.

Usually, the image data include 8 to 10 bits for expressing the density of each pixel. To implement the table conversion for one compensation characteristic, the capacity of the memory required is 256 B (B being an abbreviation for byte(s)) for the case of 8 bits, and 1 kB for the case of 10 bits. The refresh pattern memory 100 is therefore configured of about 1200 gates for the case of 8 bits, and about 3000 gates for the case of 10 bits. If ROMs are used in place of RAMs, the numbers of the gates are reduced to 400 and 700, respectively. However, with ROMs, it is not possible to alter the compensation characteristic depending on the image information.

The term "image data" as used herein include not only the image data for expressing stationary picture, but also video data for expressing moving picture.

Other examples of prior art for tone conversion are disclosed in Japanese Patent Kokoku Publication H3-81346, Japanese Patent Kokoku Publication No. H4-41551, and Japanese Patent Kokoku Publication No. S57-9072.

FIG. 62 shows another example of a conventional tone conversion device. As illustrated, it comprises a density table 104 to which a luminance signal Y obtained by reading a color original is input, a density compensation table 105, logarithm converters 106a to 106c to which R, G and B color-separated data are input, and adders 107a to 107c.

A table of correlation between the luminance signal Y and the original density is prepared experimentally in advance, and this table is stored in the density table 104. By applying the luminance signal Y to the density table 104, density data Din of the original are obtained. The density data Din are input to the density compensation table 105. The output of the density compensation table 105 is a compensation amount α corresponding to the density data Din.

The color-separated data (R, G, B) having been obtained by scanning the original are converted at the logarithmic converters 106a to 106c to density data Dr, Dg and Db, which are added to the compensation amount α at the adders 107a to 107c. The output of the adders 107a to 107c are the density compensation data DR, DG and DB.

Each of the image data of red, green and blue, are represented by 8 to 10 bits. To implement the table conversion of one density compensation characteristic, the density compensation table 105 needs to have a capacity of 256 B to 1 kB.

The image data obtained from color original needs to be subjected to tone conversion as well as color conversion to optimize the printing. This is to avoid degradation of the picture quality which may results from the ink spectrum color-impurity due to the fact that the inks used for printing are not of saturated colors, and non-linearity of the transfer characteristic of the printing. The color conversion is to compensate the degradation in the picture quality, and to provide the printer with printing image having a good color reproducibility.

Two methods have been developed for the color conversion, namely matrix calculation method and table conversion method. In the matrix calculation method, the following expression (27) is used as a basic formula.

$$\begin{bmatrix} Y \\ M \\ C \end{bmatrix} = (Aij) \begin{bmatrix} R \\ G \\ B \end{bmatrix} \tag{27}$$

In the above formula, i=1 to 3, j=1 to 3, Y, M and C represent printing data, R, G and B represent image data, and (Aij) represents a color conversion coefficient matrix.

The linear calculation of the formula (27) is not sufficient to produce good conversion characteristic to compensate the non-linearity in the transfer characteristic of the printing with regard to printing data.

A method for improving the color conversion characteristic is disclosed in Japanese Patent Kokoku Publication H2-30226, in which the following matrix formula is adopted.

$$\begin{bmatrix} Y \\ M \\ C \end{bmatrix} = (Dij) \begin{bmatrix} R \\ G \\ B \\ R*G \\ G*B \\ B*R \\ R*R \\ G*G \\ B*B \\ N \end{bmatrix} \quad (28)$$

In the above formula, i=1 to 3, j=1 to 10, Y, M and C represent printing data, R, G and B represent image data, N represents a constant, and (Dij) represents a color conversion coefficient matrix.

In the matrix calculation of the formula (28), the image data in which achromatic components and color components are both contained is directly used, so that interference occurs in the calculation. That is, changing the color conversion coefficients (matrix operator) with respect to one of the components or hues also affects other components or hues. It was therefore difficult to compensate the degradation in the picture quality due to the color-impurity of the inks and to achieve a good conversion characteristic.

A solution to this problem is disclosed in Japanese patent Kokai Publication H1-47174. FIG. 63 shows an example of the color conversion device of this prior art. As illustrated, it comprises a minimum value circuit 108, a subtractor 109, a coefficient generator 110, a matrix calculator 300, a ROM 112 and a synthesizer 113.

Input to the minimum value circuit 108 are image data R, G and B (representing the red, green and blue components of the pixel in question). The minimum value circuit 108 produces the minimum value, α, of the three inputs. The subtractor 109 determines the differences between the image data R, G and B, and the minimum value α, to produce difference data R1, G1 and B1. The minimum value α corresponds to the achromatic component of the image data, and the difference data R1, G1 and B1 correspond to the color components, respectively. Input to the matrix calculator 300 are the difference data R1, G1 and B1, as well as the coefficients generated by the coefficient generator 110, and a matrix calculation given by the formula (28) is performed to produce the color ink data Ya, Ma and Ca. The ROM 112 contains a table for converting the minimum value α to produce achromatic data Yb, Mb and Cb. The synthesizer 113 determines the sums of the color components for the respective inks and the achromatic components to produce Ya+Yb, Ma+Mb, and Ca+Cb, respectively, as the printing data Y, M and C for yellow, magenta and cyan.

According to this color conversion, the interference between the color components and the achromatic component can be removed. However, the interference between the hues within each color component cannot be removed.

According to the color conversion method using the conversion tables, as shown in FIG. 61 and FIG. 62, the red, green and blue image data are input to a conversion table, and printing data Y, M and C stored in a memory, such as a ROM. With this method, any desired conversion characteristic can be obtained, and a color conversion with excellent color reproducibility can be realized.

However, in the simple configuration in which for each of the combinations of the image data R, G and B, the conversion table must have a capacity of about 400 Mbits. The color conversion device disclosed in Japanese Patent Kokoku Publication H5-73310 shows a method for reducing the memory capacity. However, even with the reduction, the memory has to have a capacity of about 5 Mbits. A shortcoming of this method is therefore a capacity for each of the conversion characteristic is large, and it is difficult to configure the circuit by means of an LSI. Moreover, it is difficult to adopt the device to alteration in the use of the different inks, and to cope with the variation in the conditions of the printing.

Because the prior art image processing (tone conversion or the color conversion) is performed using the conversion tables as described above, the processing is limited to those in accordance with the characteristics stored in the tables. As a result, the characteristics stored in the tables cannot be altered readily or at will. There are on the other hand demands for a diversity of types of processings. They include:

(a) gamma characteristic processing inherent to video equipment;

(b) matching (unification) of the tone characteristic between video equipment, image equipment and printing equipment; and (c) tone processing matching the contrast characteristic of the image, or the luminosity characteristic or the preference of the individual viewer.

If it is attempted to meet the above demands by increasing the capacity of the memory, the total capacity of the memory is too large to compose the memory of LSIs.

Moreover, it is difficult to implement the equivalent functions by means of software.

Similarly, in the prior art color conversion using the matrix calculation, compensation (retouching) cannot be performed independently for each hue. As a result, calculation interference occurs between different hues. It is therefore difficult to properly set color conversion coefficients, and to realize satisfactory conversion characteristics for all colors.

The color conversion using conversion tables encounters the problems similar to those which the tone compensation encounters; that is, the problem that the capacity of the memory required is intolerably large, and the conversion characteristic cannot be altered flexibly.

SUMMARY OF THE INVENTION

An object of the invention is to provide an image processing method for obtaining optimum image, which is adaptable flexibly to the characteristic of the input and output images.

Another object of the invention is to provide an image processing device which is capable of processing a diversity of types of input and output images without increasing the size of the circuitry for the calculation and storage, and without increasing the cost.

Another object of the invention is to provide an image processing method and device for performing tone calculation on image data X to produce converted data Y, by which it is possible to realize arbitrary tone characteristic according to the features of the image or the preference of the viewer, simply by changing the coefficients used in the functional calculation, and of which the circuitry used can be easily configured of LSIs, and identical or equivalent processing can be performed by hardware or software.

A further object of the invention is to provide an image processing method and device for performing, for each pixel, color conversion on the red, green and blue image data R, G and B, into cyan, magenta and yellow printing data C, M and Y, with or without black data, with which it is possible to compensate (retouch) each of the six hue regions (of the image data R, G and B, and the printing data C, M and Y) independently, and of which the conversion characteristic realized by means of the matrix calculation can be altered flexibly, and the capacity of the memory need not be increased substantially.

According to an aspect of the invention, there is provided an image processing method for performing tone calculation on input image data X to produce converted data Y, comprising the steps of:

setting a functional formula including at least two of a first-order term of the input image data X, a second-order term of the input image data X, a third-order term of the input image data X, and a fraction term of the input image data X; and outputting the converted data Y in accordance with the functional formula.

With the above arrangement, the tone characteristic is given a first-order component, a second-order component and a fraction component by the first-order term, the second-order term and the fraction term, respectively.

In the above-described method, the converted data Y may be expressed by $$Y = X + a1 \cdot X \cdot (X-a2)/(X+a3) \qquad (1),$$

or $$Y = X \cdot \{1 + a1 \cdot (X-a2)/(X+a3)\} \qquad (2)$$

where a1, a2 and a3 are constants.

The constant a2 determines the value of the image data X at which Y=X, and the constants a1 and a3 determine the amount of variation of the converted data Y from the image data X. By varying the constants a1, a2 and a3, tone processing of an arbitrary characteristic can be realized.

The converted data Y may alternatively be determined from the image data X and constants a1, a2, a3 and a4 in accordance with:

$$Y = X + a1 \cdot X \cdot (X-a2) \cdot (X-a3)/(X+a4) \qquad (3)$$

or $$Y = X \cdot \{1 + a1 \cdot (X-a2) \cdot (X \cdot a3)/(X+a4)\} \qquad (4)$$

When the above formulae (3) and (4) are used, the constants a2 and a3 determine the value of the image data X at which Y=X, and the constants a1 and a4 determine the amount of variation of the converted data Y from the image data X. By varying the constants a1, a2, a3 and a4, tone processing of an arbitrary characteristic can be realized.

The converted data Y may still alternatively be determined from the image data X and constants a1, a2, a3, a4 and a5 in accordance with:

$$Y = X + a1 \cdot X \cdot (X-a2) + a3 \cdot (X-a4)/(X+a5) \qquad (5)$$

of $$Y = X \cdot \{1 + a1 \cdot (X-a2) + a3 \cdot (X-a2) \cdot (X-a4)/(X+a5)\} \qquad (6)$$

When the above formulae (5) and (6) are used, the constants a2 and a4 determine the value of the image data X at which Y=X, and the constants a1, a3 and a5 determine the amount of variation of the converted data Y from the image data X. By varying the constants a1, a2, a3, a4 and a5, tone processing of an arbitrary characteristic can be realized.

The converted data Y may alternatively determined from the image data X and constants a1, a2 and a3 in accordance with:

$$Y = X - a1 \cdot X \cdot (X-a2) \cdot (X-a3) \qquad (7)$$

or $$Y = X \cdot \{1 - a1 \cdot (X-a2) \cdot (X-a3)\} \qquad (8)$$

When the above formulae (7) and (8) are used, the constants a2 and a3 determine the value of the image data X at which Y=X, and the constant a1 determines the amount of variation of the converted data Y from the image data X. The tone conversion characteristic is therefore determined by the three constants a1, a2 and a3.

The converted data Y may still alternatively be determined from the image data X and constants a2, a3, a4 and a5 in accordance with:

$$Y = X - X \cdot (X-a3) \cdot \{a4 \cdot (X-a2) + a5 \cdot |X-a2|\} \qquad (9)$$

or $$Y = X \cdot [1 - (X-a3) \cdot \{a4 \cdot (X-a2) + a5 \cdot |X-a2|\}] \qquad (10)$$

When the above formulae (9) and (10) are used, the constants a2 and a3 determine the value of the image data X at which Y=X. With 0<a2<a3, the amounts of variation of the converted data Y from the image data X, in the region of X<a2 and X>a2 are determined by (a4−a5) and (a4+a5), respectively. The tone conversion characteristic is therefore determined by the four constants a2, a3 a4 and a5.

The converted data Y may still alternatively be determined from the image data X, a threshold value h and constants a1, a2, a3, a4 and a5 in accordance with:

$$Y = X - a1 \cdot X \cdot (X-h) \cdot (X-a3) \qquad (11)$$

when X≤h $$Y = X - a2 \cdot (X-h) \cdot (X-a4) \cdot (X-a5) \qquad (12)$$

when X>h.

When the above formulae (11) and (12) are used, the threshold value h and the constants a3, a4 and a5 determine the value of the image data X at which Y=X. The amounts of variation of the converted data Y from the image data X, in the regions of X<h and X>h are determined by a1 and a2, respectively. The tone conversion characteristic is therefore determined by the six constants h, a1, a2, a3, a4 and a5.

The converted data Y may still alternatively be determined from the image data X, a threshold value h and constants a1, a2 and a3 in accordance with:

$$Y = X - a1 \cdot X \cdot (X-h) \qquad (13)$$

when X≤h $$Y = X - a2 \cdot (X-h) \cdot (X-a3) \qquad (14)$$

when X>h.

When the above formulae (13) and (14) are used, the threshold value h and the constant a3 determine the value of the image data X at which Y=X. The amounts of variation of the converted data Y from the image data X, in the regions of X<h and X>h are determined by a1 and a2, respectively. The tone conversion characteristic is therefore determined by h, a1, a2 and a3.

In any of the methods described above, constants and/or the threshold value inherent to the functional formulae may be varied to realize a selected one of a plurality of tone conversion characteristics.

Then, the tone conversion characteristic can be varied or adjusted according to the preference of the user, or the features of the image.

According to another aspect of the invention, there is provided an image processing method for performing a tone calculation on input image data X to produce converted data Y, comprising the steps of:

setting a functional formula including a logarithmic term of the image data X; and outputting the converted data Y in accordance with the functional formula.

With the above method, an approximate value of a logarithmic calculation is determined. Because the human luminosity characteristic can be approximated by a logarithmic function, the use of the logarithmic calculation or its approximation is advantageous in for example of tone conversion of color-separated data in a scanner.

According to another aspect of the invention, there is provided an image processing method for performing color conversion, for each pixel, on image data R, G and B expressed by three colors red, green and blue, to produce printing data C, M and Y expressed by three ink colors cyan, magenta and yellow, the method comprising the steps of:

(a) generating complementary color data Ci, Mi and Yi from the image data R, G and B;

(b) determining a minimum value $\alpha$ and a maximum value $\beta$ of the complementary color data in accordance with the following expression:

$$\alpha = \text{MIN (Ci, Mi, Yi)}$$

$$\beta = \text{MAX (Ci, Mi, Yi)}$$

(c) generating hue data r, g, b, y, m and c from the complementary color data, the minimum value and the maximum value, in accordance with the following equations:

$$r = \beta - Ci$$

$$g = \beta - Mi$$

$$b = \beta - Yi$$

$$y = Yi - \alpha$$

$$m = Mi - \alpha$$

$$c = Ci - \alpha$$

(d) generating predetermined matrix coefficients (Eij) and (Fij), with i=1 to 3 and j=1 to 3 for (Eij) and i=1 to 3 and j=1 to 12 for (Fij); and (e) determining printing data C, M, Y in accordance with a matrix calculation of the following formula (15):

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(c+m) \\ m^*y/(m+y) \\ y^*c/(y+c) \\ r^*g/(r+g) \\ g^*b/(g+b) \\ b^*r/(b+r) \end{bmatrix} + \begin{bmatrix} \alpha \\ \alpha \\ \alpha \end{bmatrix} \quad (15)$$

With the above method, the minimum value $\alpha$ is obtained as an achromatic component of the printing data (at step (b)), and is separated from the color components of the printing data (at step (c)). By these steps, matrix operators $\alpha$, c, m, y, r, g and b, which will be used for the matrix calculation are obtained. An ideal ink, free from color impurity, is determined by the first term of the matrix calculation (at step (e)), and compensation (retouching) is determined by the second term, and the data of the achromatic component is added by the third term. The product terms, such as (c*m), in the second term are for compensating the distortion of a specific hue in an x-y chromaticity diagram. The fraction terms, such as (c*m)/(c+m), are for compensating rotation of a specific hue in the chromaticity diagram. In this way, the achromatic data and the six hue data are generated from the image data R, G and B, and their hues can be compensated (retouched) independently.

In place of the above formula (15), the following formula (16) may be used to determine printing data C, M, Y.

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ (c^*m)^{1/2} \\ (m^*y)^{1/2} \\ (y^*c)^{1/2} \\ (r^*g)^{1/2} \\ (g^*b)^{1/2} \\ (b^*r)^{1/2} \end{bmatrix} + \begin{bmatrix} \alpha \\ \alpha \\ \alpha \end{bmatrix} \quad (16)$$

In place of the above formula (15), the following formula (17) may be used to determine printing data C, M, Y.

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(r+c) \\ m^*y/(r+c) \\ y^*c/(r+c) \\ r^*g/(r+c) \\ g^*b/(r+c) \\ b^*r/(r+c) \end{bmatrix} + \begin{bmatrix} \alpha \\ \alpha \\ \alpha \end{bmatrix} \quad (17)$$

In the above formula (17), (r+c) may be replaced by (g+m) or (b+y).

According to another aspect of the invention, there is provided an image processing method for performing color conversion, for each pixel, on image data R, G and B expressed by three colors red, green and blue, to produce printing data C, M and Y expressed by three ink colors cyan, magenta and yellow, the method comprising the steps of:

(a) generating complementary color data Ci, Mi and Yi from the image data R, G and B;

(b) determining a minimum value $\alpha$ and a maximum value $\beta$ of the complementary color data in accordance with the following expression:

$\alpha$=MIN (Ci, Mi, Yi)

$\beta$=MAX (Ci, Mi, Yi)

(c) generating hue data r, g, b, y, m and c from the complementary color data, the minimum value and the maximum value, in accordance with the following equations:

$r = \beta - Ci$ $g = \beta - Mi$ $b = \beta - Yi$ $y = Yi - \alpha$ $m = Mi - \alpha$ $c = Ci - \alpha$ (d) generating predetermined matrix coefficients (Eij) and (Fij), with i=1 to 3 and j=1 to 3 for (Eij) and i=1 to 3 and j=1 to 14 for (Fij); and (e) determining printing data C, M, Y in accordance with matrix calculation of the following formula (18):

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(c+m) \\ m^*y/(m+y) \\ y^*c/(y+c) \\ r^*g/(r+g) \\ g^*b/(g+b) \\ b^*r/(b+r) \\ \alpha \\ \alpha^*\alpha \end{bmatrix} \quad (18)$$

With the above method, the minimum value $\alpha$ is obtained as an achromatic component of the printing data (at step (b)), and is separated from the color components of the printing data (at step (c)). By these steps, matrix operators $\alpha$, c, m, y, r, g and b, which will be used for the matrix calculation are obtained. An ideal ink, free from color impurity, is determined by the first term of the matrix calculation (at step (e)), and the data of the achromatic component by means of $\alpha$, $\alpha^*\alpha$ is determined by the second term for fine adjustment of the achromatic ink data. The product terms, such as (c*m), in the second term are for compensating the distortion of a specific hue in an x-y chromaticity diagram. The fraction terms, such as (c*m)/(c+m), are for compensating rotation of a specific hue in the chromaticity diagram. In this way, the achromatic data and the six hue data are generated from the image data R, G and B, and their hues can be compensated (retouched) independently.

In place of the above formula (18), the following formula (19) may be used to determine printing data C, M, Y.

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ (c^*m)^{1/2} \\ (m^*y)^{1/2} \\ (y^*c)^{1/2} \\ (r^*g)^{1/2} \\ (g^*b)^{1/2} \\ (b^*r)^{1/2} \\ \alpha \\ \alpha^*\alpha \end{bmatrix} \quad (19)$$

In place of the above formula (18), the following formula (20) may be used to determine printing data C, M, Y.

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(r+c) \\ m^*y/(r+c) \\ y^*c/(r+c) \\ r^*g/(r+c) \\ g^*b/(r+c) \\ b^*r/(r+c) \\ \alpha \\ \alpha^*\alpha \end{bmatrix} \quad (20)$$

In the above formula (20), (r+c) may be replaced by (g+m) or (b+y).

The above-recited method using the formulae (15) to (20) may be used to convert sensor data Rin, Gin, Bin into color-separated data Rout, Gout and Bout.

According to another aspect of the invention, there is provided an image processing method for performing color conversion, for each pixel, on image data R, G and B expressed by three colors red, green and blue, to produce printing data C, M, Y and K expressed by four ink colors cyan, magenta, yellow and black, the method comprising the steps of:

(a) generating complementary color data Ci, Mi and Yi from the image data R, G and B;

(b) determining a minimum value a a and a maximum value $\alpha$ of the complementary color data in accordance with the following expression:

$\alpha$=MIN (Ci, Mi, Yi)

$\alpha$=MAX (Ci, Mi, Yi)

(c) generating hue data r, g, b, y, m and c from the complementary color data, the minimum value and the maximum value, in accordance with the following equations:

$r = \alpha - Ci$ $g = \beta - Mi$ $b = \beta - Yi$ $y = Yi - \alpha$ $m = Mi - \alpha$ $c = Ci - \alpha$ (d) dividing the minimum value into the printing data K and a remainder data $\alpha - K$;

(e) generating predetermined matrix coefficients (Eij) and (Fij), with i=1 to 3 and j=1 to 3 for (Eij) and i=1 to 3 and j=1 to 12 for (Fij); and (f) determining printing data C, M, Y in accordance with matrix calculation of the following formula (21):

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(c+m) \\ m^*y/(m+y) \\ y^*c/(y+c) \\ r^*g/(r+g) \\ g^*b/(g+b) \\ b^*r/(b+r) \end{bmatrix} + \begin{bmatrix} \alpha - K \\ \alpha - K \\ \alpha - K \end{bmatrix} \quad (21)$$

With the above method, the minimum value $\alpha$ is obtained as an achromatic component of the printing data (at step (b)), and is separated from the color components of the printing data (at step (c)), and the proportion of the black ink used for achromatic printing is determined (at step (d)). By these steps, the matrix operators $\alpha$, c, m, y, r, g and b, which will be used for the matrix calculation are obtained. An ideal ink, free from color impurity, is determined by the first term of the matrix calculation (at step (f)), and compensation (retouching) for the ink with color impurity is calculated, the data of the achromatic component is calculated by the third term. The product terms, such as (c*m), in the second term are for compensating the distortion of a specific hue in an x-y chromaticity diagram. The fraction terms, such as (c*m)/(c+m), are for compensating rotation of a specific hue in the chromaticity diagram. In this way, the achromatic data and the six hue data are generated from the image data R, G and B, and their hues can be compensated (retouched) independently.

In place of the above formula (21), the following formula (22) may be used to determine printing data C, M, Y.

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ (c^*m)^{1/2} \\ (m^*y)^{1/2} \\ (y^*c)^{1/2} \\ (r^*g)^{1/2} \\ (g^*b)^{1/2} \\ (b^*r)^{1/2} \end{bmatrix} + \begin{bmatrix} \alpha - K \\ \alpha - K \\ \alpha - K \end{bmatrix} \quad (22)$$

In place of the above formula (21), the following formula (23) may be used to determine printing data C, M, Y.

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(r+c) \\ m^*y/(r+c) \\ y^*c/(r+c) \\ r^*g/(r+c) \\ g^*b/(r+c) \\ b^*r/(r+c) \end{bmatrix} + \begin{bmatrix} \alpha - K \\ \alpha - K \\ \alpha - K \end{bmatrix} \quad (23)$$

In the above formula (23), (r+c) may be replaced by (g+m) or (b+y).

According to another aspect of the invention, there is provided an image processing method for performing color conversion, for each pixel, on image data R, G and B expressed by three colors red, green and blue, to produce printing data C, M, Y and K expressed by four ink colors cyan, magenta, yellow and black, the method comprising the steps of:

(a) generating complementary color data Ci, Mi and Yi from the image data R, G and B;

(b) determining a minimum value $\alpha$ and a maximum value $\beta$ of the complementary color data in accordance with the following expression:

$\alpha = \text{MIN (Ci, Mi, Yi)}$ $\beta = \text{MAX (Ci, Mi, Yi)}$ (c) generating hue data r, g, b, y, m and c from the complementary color data, the minimum value and the maximum value, in accordance with the following equations:

$r = \beta - Ci$ $g = \beta - Mi$ $b = \beta - Yi$ $y = Yi - \alpha$ $m = Mi - \alpha$ $c = Ci - \alpha$ (d) generating predetermined matrix coefficients (Eij) and (Fij), with i=1 to 3 and j=1 to 3 for (Eij) and i=1 to 3 and j=1 to 14 for (Fij); and (e) determining printing data C, M, Y in accordance with matrix calculation of the following formula (24):

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ (\alpha - K) \\ (\alpha - K)*(\alpha - K) \end{bmatrix} \quad (24)$$

With the above method, the minimum value α is obtained as an achromatic component of the printing data (at step (b)), and is separated from the color components of the printing data, and the proportion of the black ink used in achromatic printing is determined (at step (d)). By these steps, matrix operators α, c, m, y, r, g and b, which will be used for the matrix calculation are obtained. An ideal ink, free from color impurity, is determined by the first term of the matrix calculation (at step (f)), and the data of the achromatic component by means of (α–K), (α–K)*(α–K) is determined by the second term for fine adjustment of the achromatic ink data. The product terms, such as (c*m), in the second term are for compensating the distortion of a specific hue in an x-y chromaticity diagram. The fraction terms, such as (c*m) /(c+m), are for compensating rotation of a specific hue in the chromaticity diagram. In this way, the achromatic data and the six hue data are generated from the image data R, G and B, and their hues can be compensated (retouched) independently.

In place of the above formula (24), the following formula (25) may be used to determine printing data C, M, Y.

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ (c*m)^{1/2} \\ (m*y)^{1/2} \\ (y*c)^{1/2} \\ (r*g)^{1/2} \\ (g*b)^{1/2} \\ (b*r)^{1/2} \\ (\alpha - K) \\ (\alpha - K)*(\alpha - K) \end{bmatrix} \quad (25)$$

In place of the above formula (24), the following formula (26) may be used to determine printing data C, M, Y.

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(r+c) \\ m*y/(r+c) \\ y*c/(r+c) \\ r*g/(r+c) \\ g*b/(r+c) \\ b*r/(r+c) \\ (\alpha - K) \\ (\alpha - K)*(\alpha - K) \end{bmatrix} \quad (26)$$

In the above formula (26), (r+c) may be replaced by (g+m) or (b+y).

According to another aspect of the invention, there is provided an image processing device for performing conversion on an input image data X by means of a conversion table to produce converted data Y, comprising:

(a) means for selecting image data and address data;

(b) means for switching the direction of transfer of write data and read data;

(c) rewritable memory means;

(d) means for generating the write data by means of functional calculation;

(e) means for generating the address data; and (f) means for controlling the operation of the means (a) to (e).

With the above device, by means of a conversion table formed using a certain memory capacity for one characteristic, an arbitrary tone conversion is effected, and the speed of the conversion is higher than if multipliers and dividers are used. The memory capacity is fixed, and it is necessary to store, in advance, the converted data obtained by the functional calculation of the invention each time the tone characteristic is altered.

According to another aspect of the invention, there is provided an image processing device for performing color conversion, for each pixel, on image data R, G and B expressed by three colors red, green and blue, to produce printing data, comprising at least one of:

(a) means for selecting three-color conversion or four-color conversion, with regard to the conversion into the printing data;

(b) means for selecting use or non-use of muddiness-removal function in the color conversion;

(c) means for selecting use or non-use of fine adjustment of achromatic components;

(d) means for selecting constants corresponding to division function; and (g) means for selecting calculation constants corresponding to a set of plurality of inks.

With the above device, a variety of color conversion modes are provided, and a plurality of the functions can be selectively used to provide color conversion functions for a variety of purposes.

According to another aspect of the invention, there is provided an image processing device for performing color conversion, for each pixel, on image data to produce printing data, display data, or a different type of image data, comprising at least one of:

- (a) means for converting the image data R, G and B expressed by three colors red, green and blue into the printing data;
- (b) means for converting the image data R, G and B expressed by three colors red, green and blue into the display data;
- (c) means for converting the image data from a sensor into color-separated data, or image data R, G and B expressed by three colors red, green and blue;
- (d) means for converting a first type of image data into a second type of image data;
- (e) means for converting a first type of printing data into a second type of printing data;
- (f) means for converting a first type of color-separated data into a second type of color-separated data; and
- (g) means for performing conversion in such a manner as to unify or obtaining matching of the color reproducibility in each of the combinations of at least three of the color-separated data, image data, printing data and display data.

With the above device, it is possible to provide conversion functions for a variety of purposes, using a memory having a capacity for one characteristic only.

According to another aspect of the invention, there is provided an image processing device for performing image processing, with a processing characteristic selected from a plurality of processing characteristics, on image data X to produce converted data Y, comprising:

means for selecting one of the processing characteristics, according to the characteristics of an input equipment, or an output equipment; and means for varying and setting a conversion function or constants in the conversion function according to the selected processing characteristics.

With the above device, it is possible to select a specific one of the processing characteristic among a plurality of processing characteristics taking account of the characteristics of the input device, the output device and the overall characteristic that is to be attained, and to process the image data with the selected processing characteristic.

BRIEF DESCRIPTION OF THE DRAWINGS

FIG. 1 is a block diagram showing the configuration of a tone conversion device of an embodiment of the invention.

FIG. 32 is a block diagram showing an example of configuration of a matrix calculator shown in FIG. 30.

FIG. 45A to FIG. 45D are diagrams for explaining time-division calculation by means of the color conversion device of FIG. 44.

DETAILED DESCRIPTION OF THE PREFERRED EMBODIMENTS

Embodiment 1

Figure 2A:
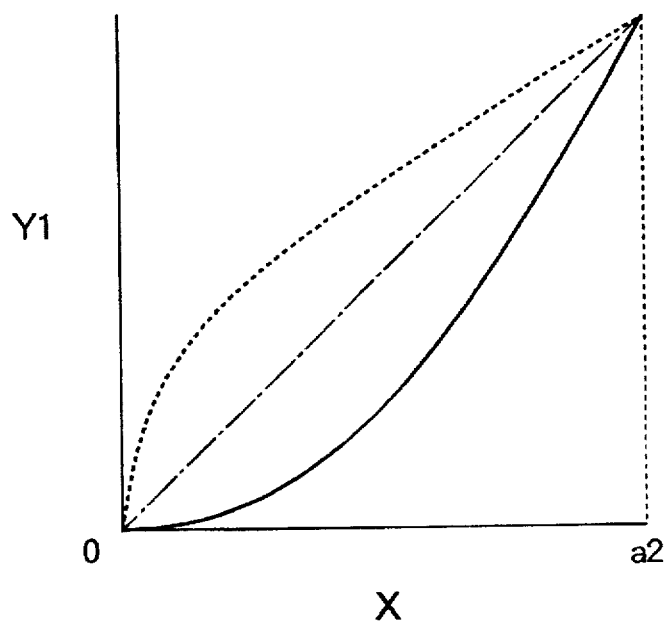
FIG. 2A and FIG. 2B are diagrams showing input-output characteristics of the tone conversion device of FIG. 1.

FIG. 1 is a block diagram showing a tone processing apparatus of an embodiment of the invention. As illustrated, it comprises a constant generator 1, a first multiplier 2, a second multiplier 3, a divider 4, a first subtractor 5, a first adder 6 and a second adder 7. The constant generator 1 includes means and functions for altering the constants which it generates, in accordance with externally supplied input. In the following description, constants a1, a2 and so on may sometimes be referred to simply as a1, a2, and so on, without the preceding word "constant(s)".

Input image data X are supplied to the first multiplier 2, the first subtractor 5 and the first adder 6. The constant generator 1 generates constants a1, a2 and a3, and supplies them to the first multiplier 2, the first subtractor 5 and the first adder 6. The first multiplier 2 multiplies the input image data X by a1 and outputs a product a1·X. The first subtractor 5 subtracts a2 from the input image data to produce a difference (X−a2). The first adder 6 adds a3 to the input image data to produce a sum (X+a3). The second multiplier 3 multiplies the output of the first multiplier 2 by the output of the first subtractor 5 to produce a product a1·X·(X−a2). The divider 4 divides the output of the second multiplier 3 by the output of the first adder 6 to produce a quotient a1·X·(X−a2)/(X+a3).

The second adder 7 adds the output of the divider 4 to the input image data to output converted data Y1, which is given by following formula (1)

$$Y1 = X + a1 \cdot X \cdot (X-a2)/(X+a3) \tag{1}$$

The right side of the formula (1) consists of a first, linear term, and a second, compensation term. The compensation term relates to the retouch amount that is applied to the linear term. The maximum of the retouch amount is determined by the constant a1, and the input value at which the retouch amount is maximum is determined by the constant a3. The retouch amount is zero when X=0 and X=a2.

Figure 2B:
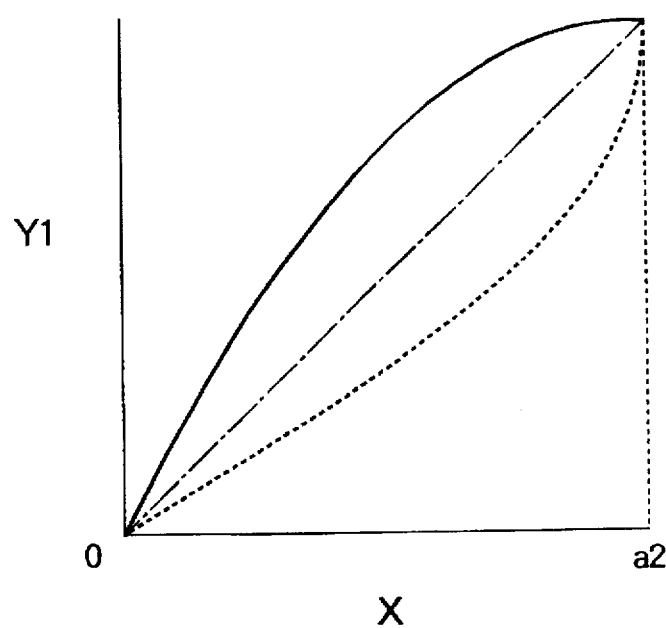

FIG. 2A and FIG. 2B show input-output characteristics of the tone processing device. In each figure, the horizontal axis represents the input density value of the image data X, and the vertical axis represents the output density value of the converted data Y1. The correlation between them are indicated by the input-output conversion curves. Here, a2=Xmax (the maximum value of the image data X). FIG. 2A shows the case where a3>0, while FIG. 2B shows the case where a3<−a2. The solid line indicates the case where a1<3, the broken line indicates the case where a1>0, and the straight, chain line indicates the case where a1=0.

Figure 3A:
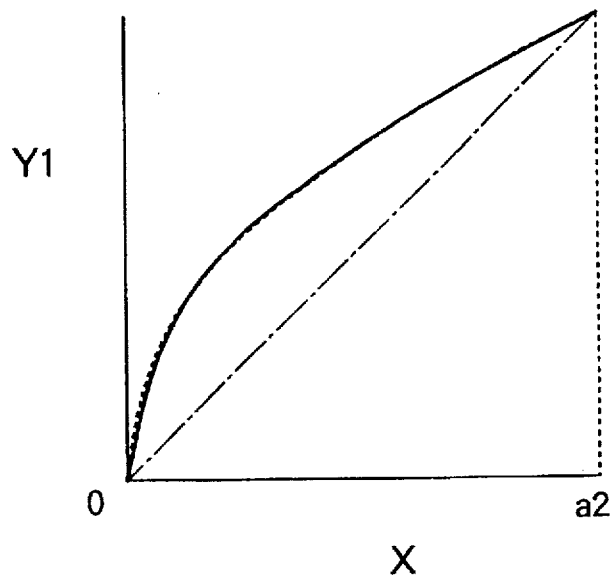
FIG. 3A and FIG. 3B are diagrams showing other input-output characteristics of the tone conversion device of FIG. 1.
Figure 3B:
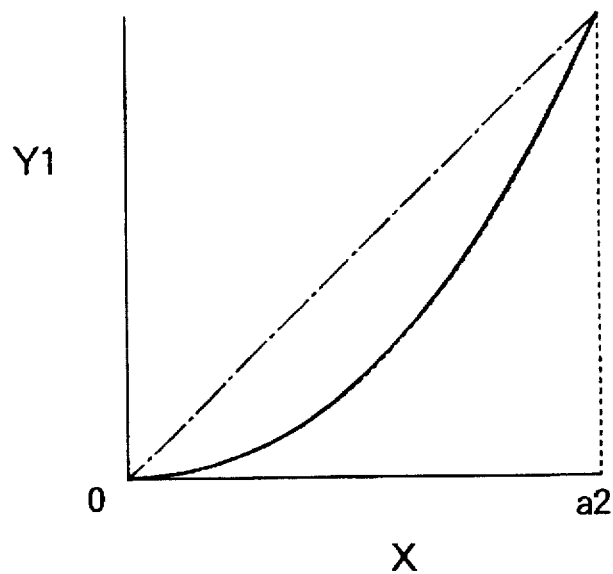

FIG. 3A and FIG. 3B show other input-output characteristics of the tone processing device of FIG. 1. They are the input-output characteristics expressed by the functional calculation of $$Y1 = Y1\ max \cdot (X/X\ max)^{\gamma}$$

where Y1max represents the maximum value of Y1. The input-output characteristics are the functional approximations of the γ (gamma) characteristics. In the figures, a2=Xmax. FIG. 3A shows the case where γ=½.2, while FIG. 3B shows the case where γ=2.2.

The solid line indicates the approximation characteristics by the formula (1), while the broken line indicates the theoretical values. The characteristics shown in FIG. 3A are for the case where a1=−0.57 and a3=30, while the characteristics shown in FIG. 3B are for the case where a1=−7.8 and a3=−1895. The "gamma" and "tone" are used in the same sense.

Figure 4A:
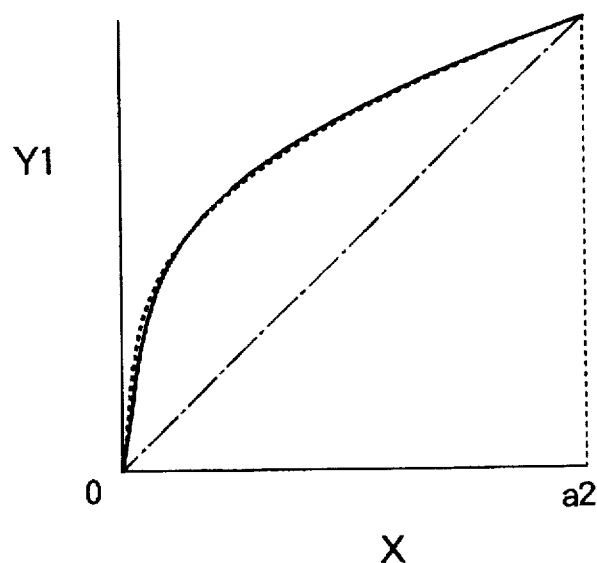
FIG. 4A and FIG. 4B are diagrams showing further input-output characteristics of the tone conversion device of FIG. 1.
Figure 4B:
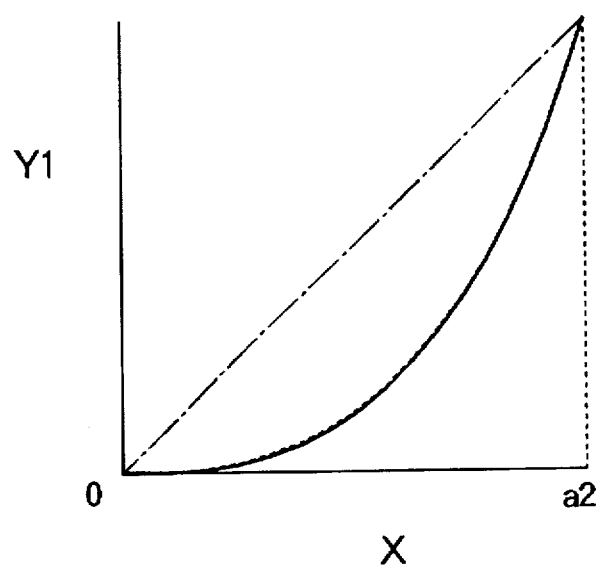

FIG. 4A and FIG. 4B show further input-output characteristics of the tone processing device of FIG. 1. This tone processing is an example for approximating another gamma characteristic and a2=Xmax. FIG. 4A shows the case where γ=⅓.0, while FIG. 4B shows the case where γ3.0. The solid line indicates the approximation characteristic by the formula (1), while the broken line indicates the theoretical values. For each of the approximation characteristics, a2=255. FIG. 4A is for the case where a1=−0.67 and a3=18, while FIG. 4B is for the case where a1=−2.5 and a3=−553.

It has been assumed that, as a representative gamma characteristic, $\gamma=1/2.2$ and $\gamma=2.2$ used for gamma compensation and inverse gamma compensation, and $\gamma=1/3$ and $\gamma=3$ used for the conversion of the L*a*b* color system into the lightness characteristic L* or the inverse conversion thereof. The formula (1) can be used for any gamma characteristic other than those of the above examples, by setting the values of a1, a2 and a3 appropriately.

The above formula (1) can be rewritten as $$Y1=X \cdot \{1+a1 \cdot (X-a2)/(X+a3)\} \quad (2)$$

This indicates that the product of the image data X and the retouch coefficients $\{1+a1 \cdot (X-a2)/(X+a3)\}$ equals the converted data Y1. The configuration for implementing the functional calculation of the formula (2) can be realized by modifying the tone processing device of FIG. 1.

Embodiment 2

Figure 5:
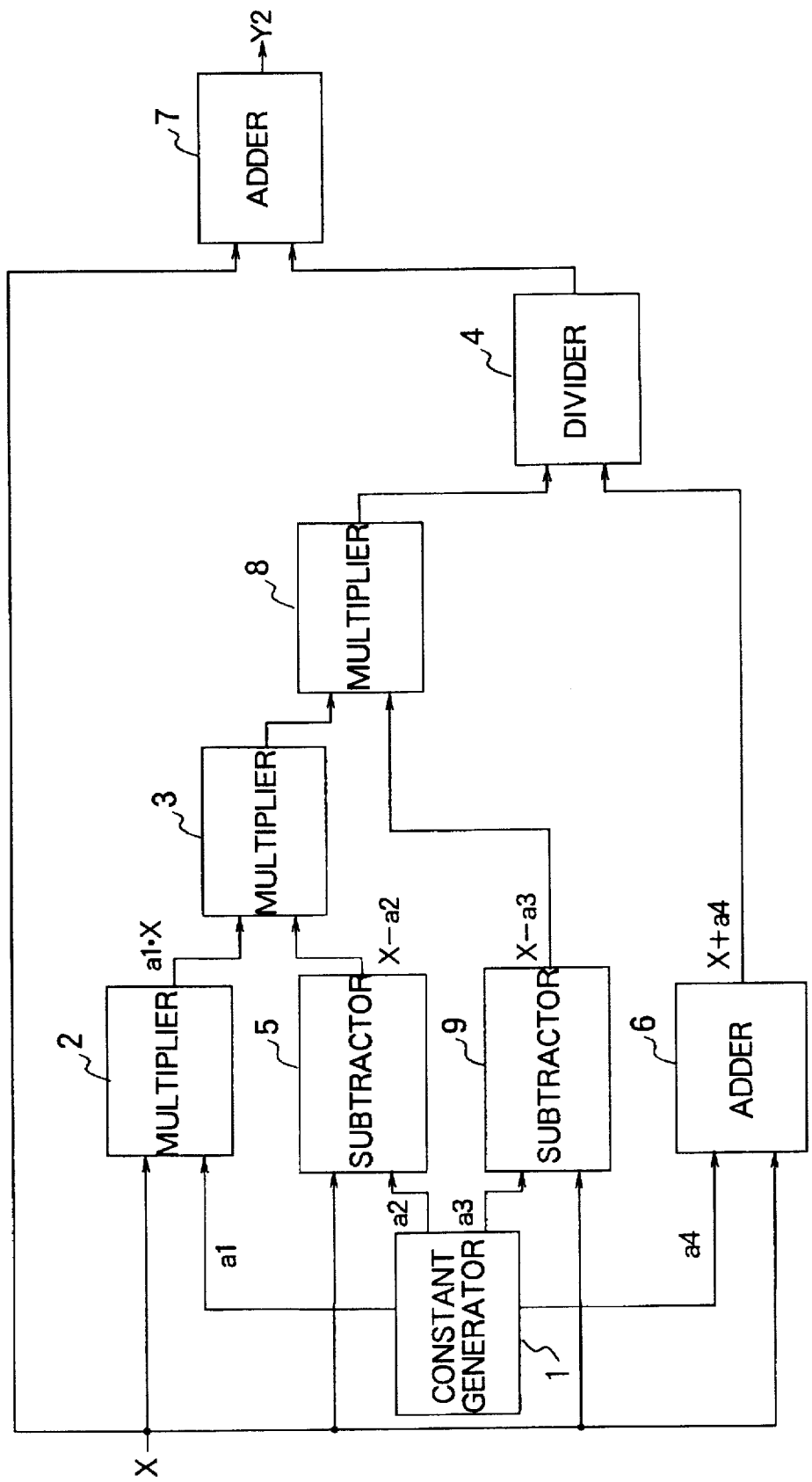
FIG. 5 is a block diagram showing the configuration of a tone conversion device of another embodiment of the invention.

FIG. 5 is a block diagram showing a tone processing device of another embodiment of the invention. Reference numerals identical to those in FIG. 1 denote identical or corresponding circuits. Circuits which are not in the device of FIG. 1 are a third multiplier 8 and a second subtractor 9.

The input image data X are supplied to the first multiplier 2, the first subtractor 5, the second subtractor 9 and the first adder 6. The constant generator 1a generates a1, a2, a3 and a4, and supplies them to the first multiplier 2, the first subtractor 5, the second subtractor 9 and the first adder 6. The first multiplier 2 multiplies the input image data X by a1 and outputs a product a1·X. The first subtractor 5 subtracts a2 from the input image data X to produce a difference (X−a2). The second subtractor 9 subtracts a3 from the input image data X to produce a difference (X−a3). The first adder 6a adds a4 to the input image data X to produce a sum (X+a4). The second multiplier 3 multiplies the output of the first multiplier 2 by the output of the first subtractor 5, and outputs a product a1·X·(X−a2). The third multiplier 8a multiplies the output the second multiplier 3 by the output of the second subtractor 9, and outputs a product ·X·(X−a2)·(X−a3). The divider 4a divides the output of the third multiplier 8a by the output of the first adder 6, and outputs a quotient a1·X·(X−a2)·(X−a3)/(X+a4).

The second adder 7a adds the output of the divider 4a to the input image data X, and outputs converted data Y2 given by the following formula (3).

$$Y2=X+a1 \cdot X \cdot (X-a2) \cdot (X-a3)/(X+a4) \quad (3)$$

The right side of the formula (3) consists of a linear term and a compensation term. The compensation term relates to a retouch amount applied to the linear term, and a4 determines the input value at which the retouch amount is maximum, and the maximum value is determined by a1. The retouch amount is zero when X=0, X=a2, and X=a3. The sign (plus or minus) of the retouch amount is altered at or about a2.

Figure 6A:
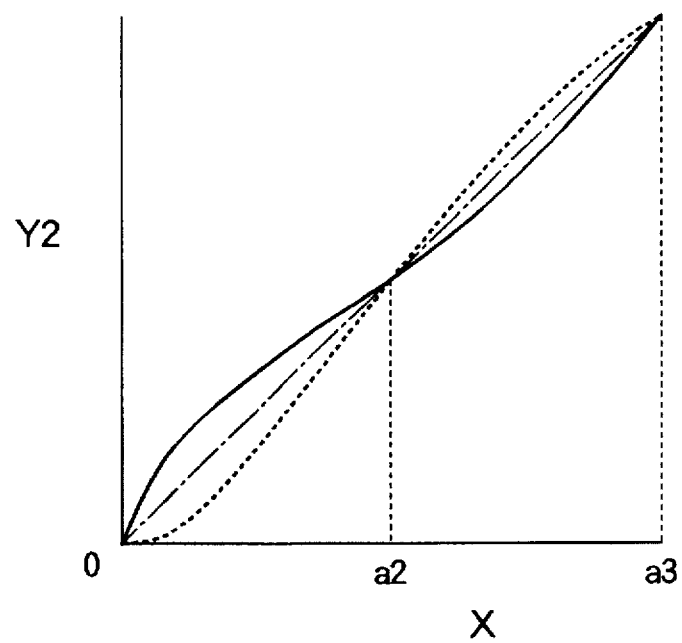
FIG. 6A and FIG. 6B are diagrams showing input-output characteristics of the tone conversion device of FIG. 5.
Figure 6B:
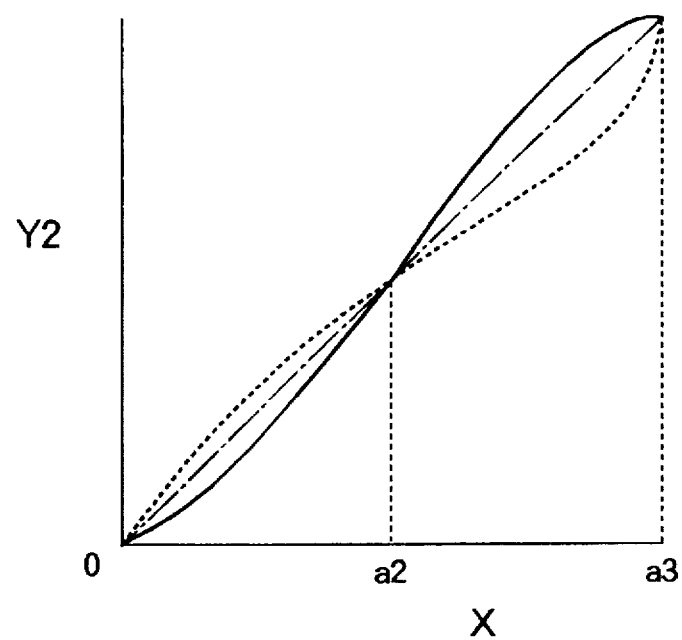

FIG. 6A and FIG. 6B show the input-output characteristics of the tone processing device of FIG. 5. As illustrated, the input-output characteristics are S-shaped. In the figures, a3=Xmax. FIG. 6A shows the case where a4>0, and FIG. 6B shows the case where a4<−a3. The solid line indicates the case where a1>0, while the broken line indicates the case where a1<0, and the straight, chain line indicates the case where a1=0.

FIG. 7A, FIG. 7B, FIG. 8A and FIG. 8B show other input-output characteristics of the tone processing device of FIG. 5. The illustrated characteristics are not S-shaped.

Figure 7A:
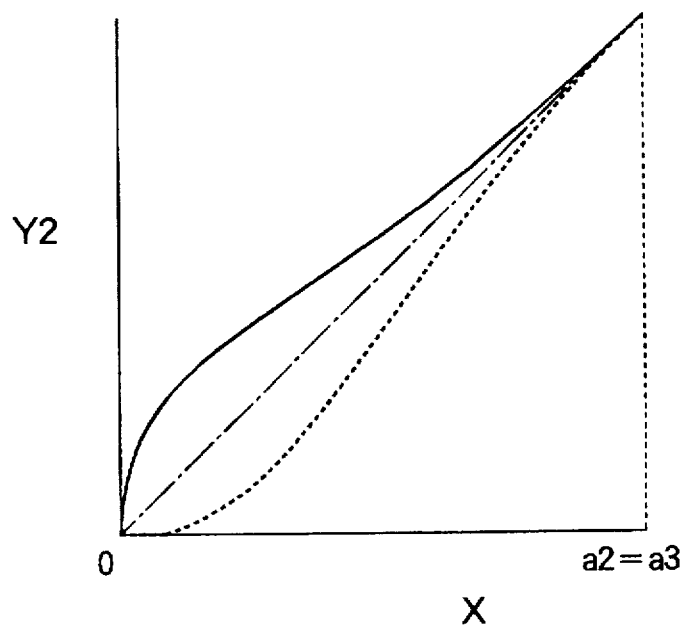
FIG. 7A and FIG. 7B are diagrams showing other input-output characteristics of the tone conversion device of FIG. 5.
Figure 7B:
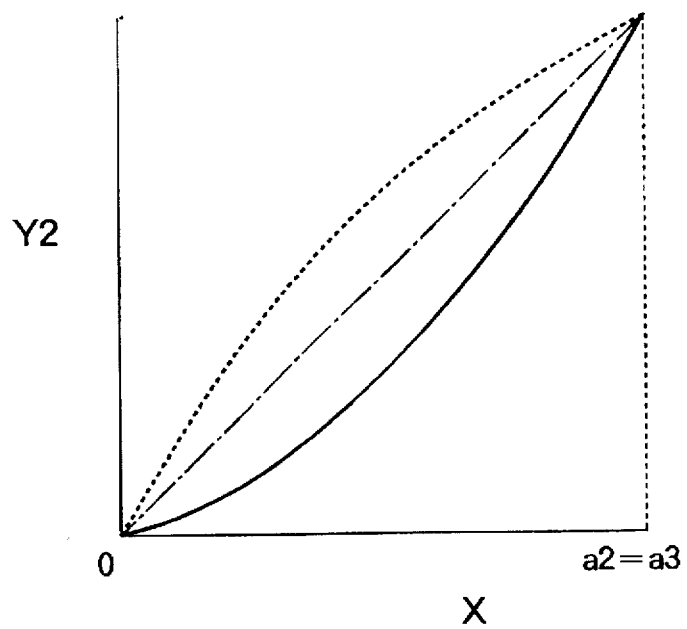
Figure 8A:
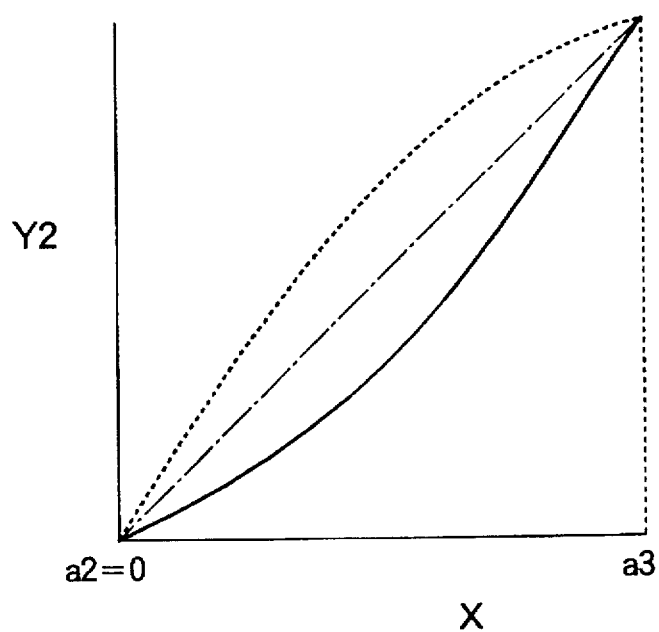
FIG. 8A and FIG. 8B are diagrams showing further input-output characteristics of the tone conversion device of FIG. 5.
Figure 8B:
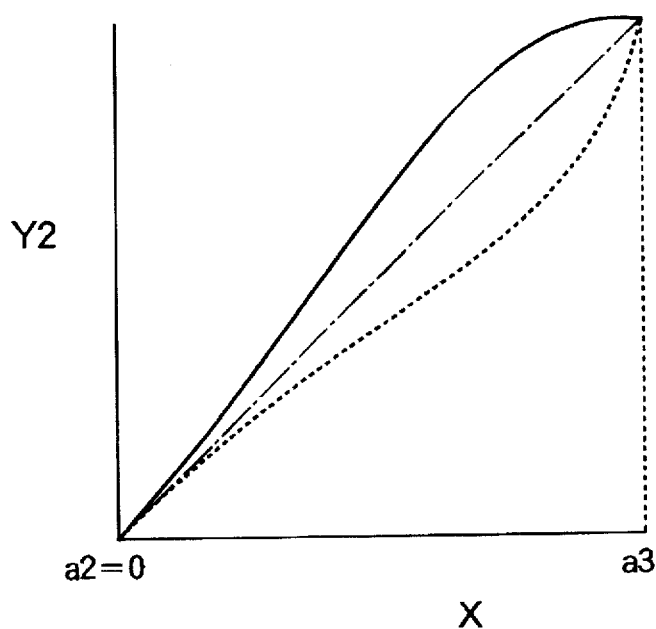

FIG. 7A shows the case where a2=a3=Xmax, and a4>0, while FIG. 7B shows the case where a2=a3=Xmax, and a4<−a3. FIG. 8A shows the case where a2=0, a3=Xmax and a4>0, while FIG. 8B shows the case where a2=0, a3=Xmax and a4<−a3. The solid lines indicate the cases where a1>0, the broken lines indicate the case where a1<0, and the straight, chain lines indicate the case where a1=0.

Thus, complicated input-output characteristics can be realized by the functional calculation of the formula (3).

The formula (3) can be rewritten as $$Y2=X \cdot \{1+a1 \cdot (X-a2) \cdot (X-a3)/(X+a4)\} \quad (4)$$

The formula (4) shows that the converted data Y2 is given by a product of the image data X and the retouch coefficient $\{1+a1 \cdot (X-a2) \cdot (X-a3)/(X+a4)\}$. The configuration for implementing the formula (4) can be realized by modifying the tone processing device of FIG. 5.

Embodiment 3

Figure 9:
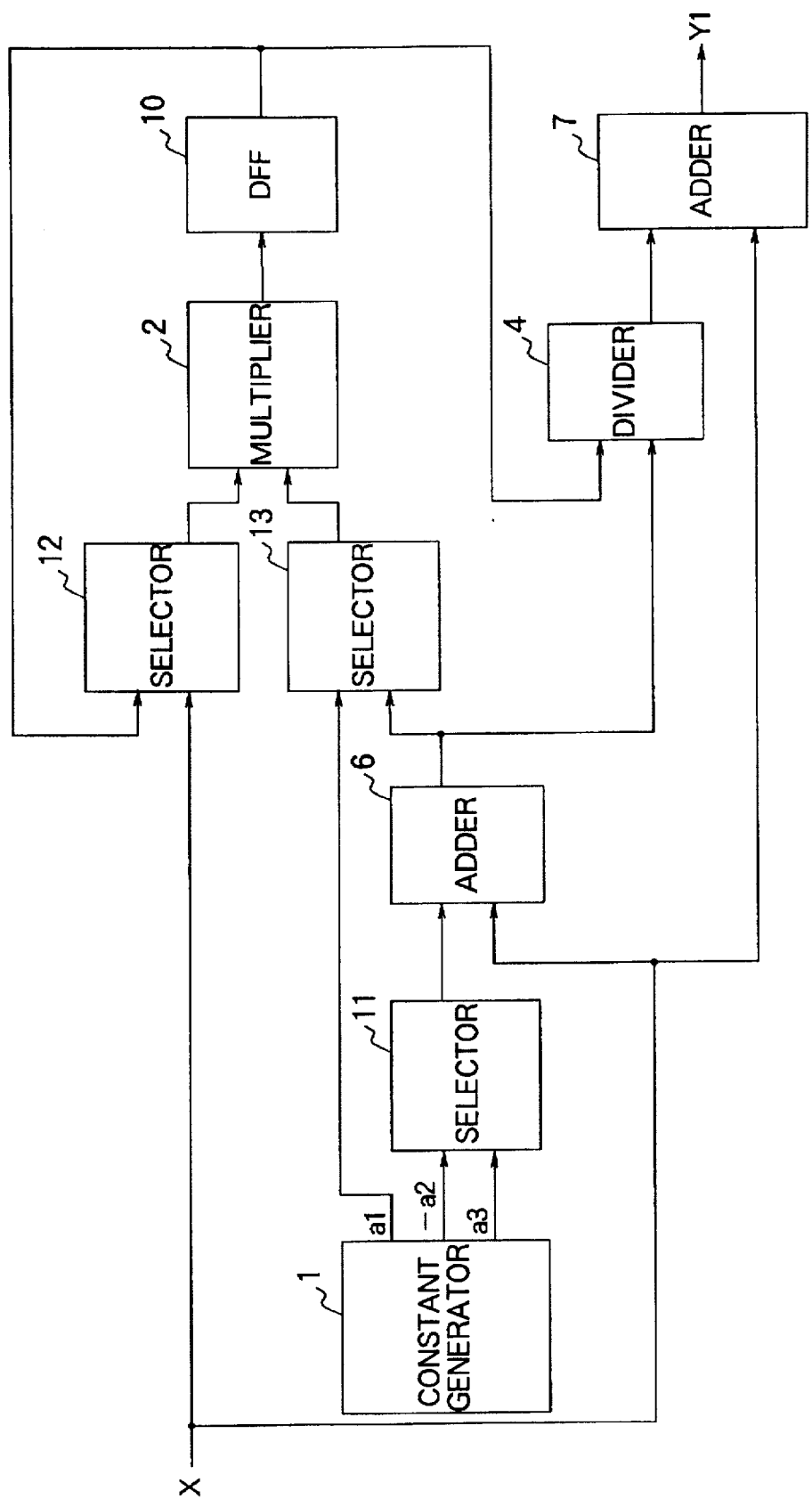
FIG. 9 is a block diagram showing the configuration of a tone conversion device of Embodiment 3 of the invention.

FIG. 9 is a block diagram showing a tone conversion device of another embodiment of the invention. The illustrated tone conversion device is configured so that the functional calculation of the formula (1) is cyclically processed. The reference numerals identical to those in FIG. 1 and FIG. 5 denote identical or corresponding circuits. The circuits which are not in the devices of FIG. 1 and FIG. 5 are a DFF (D-type flip-flop) 10 for temporarily storing the calculation data, and first, second and third selectors 11, 12 and 13.

The input image data X are supplied to the first adder 6, the second adder 7 and the second selector 12. The constant generator 11 generates a1, −a2 and a3 and supplies a1 to the third selector 13, and supplies −a2 and a3 to the first selector 11.

The second selector 12 outputs the image data X. The third selector 13 outputs a1·The first multiplier 2b outputs a product a1·X. The DFF 10 temporarily stores the product.

The second selector 12 outputs the product a1·X output by the DFF 10. The first adder 6b adds −a2 output by the first selector 11 to the image data X to output the sum (X−a2). The third selector 13 outputs this sum. The first multiplier 2b outputs a product a1·X·(X−a2). The DFF 10 temporarily stores this product.

The first adder 6b adds a3 output from the first selector 11 and the image data X to produce the sum (X+a3). The divider 4b divides the product a1·X·(X−a2) by the sum (X+a3) to produce a quotient a1·X·(X−a2)/(X+a3). The second adder 7b adds the image data X and the quotient to produce the converted data Y1 expressed by the formula (1).

The tone conversion device of FIG. 9 can be realized with a smaller hardware than the tone conversion device of FIG. 1. For instance, assuming that a multiplier is formed of about 500 gates, a divider is formed of about 700 gates, an adder is formed of about 50 gates, a selector is formed of about 20 gates, a DFF is formed of about 40 gates, the tone conversion device of FIG. 1 is formed of about 1850 gates, while the tone conversion device of FIG. 9 is formed of about 1400 gates. Accordingly, the tone conversion device of FIG. 1 is suitable for high-speed processing, while the tone conversion device of FIG. 9 is suitable for cost reduction.

As a modification to the tone conversion device of FIG. 9, the first adder 6b and the second adder 7b can be integrated into a single unit. The constant generator 1 can be formed of a microcontroller (microcomputer), or a hardware logic circuit.

In connection with Embodiment 3, the configuration for outputting the converted data Y1 expressed by the formula (1) was explained. Identical concept can be used to realize configurations for the formulae (2), (3) and (4).

Embodiment 4

Figure 10:
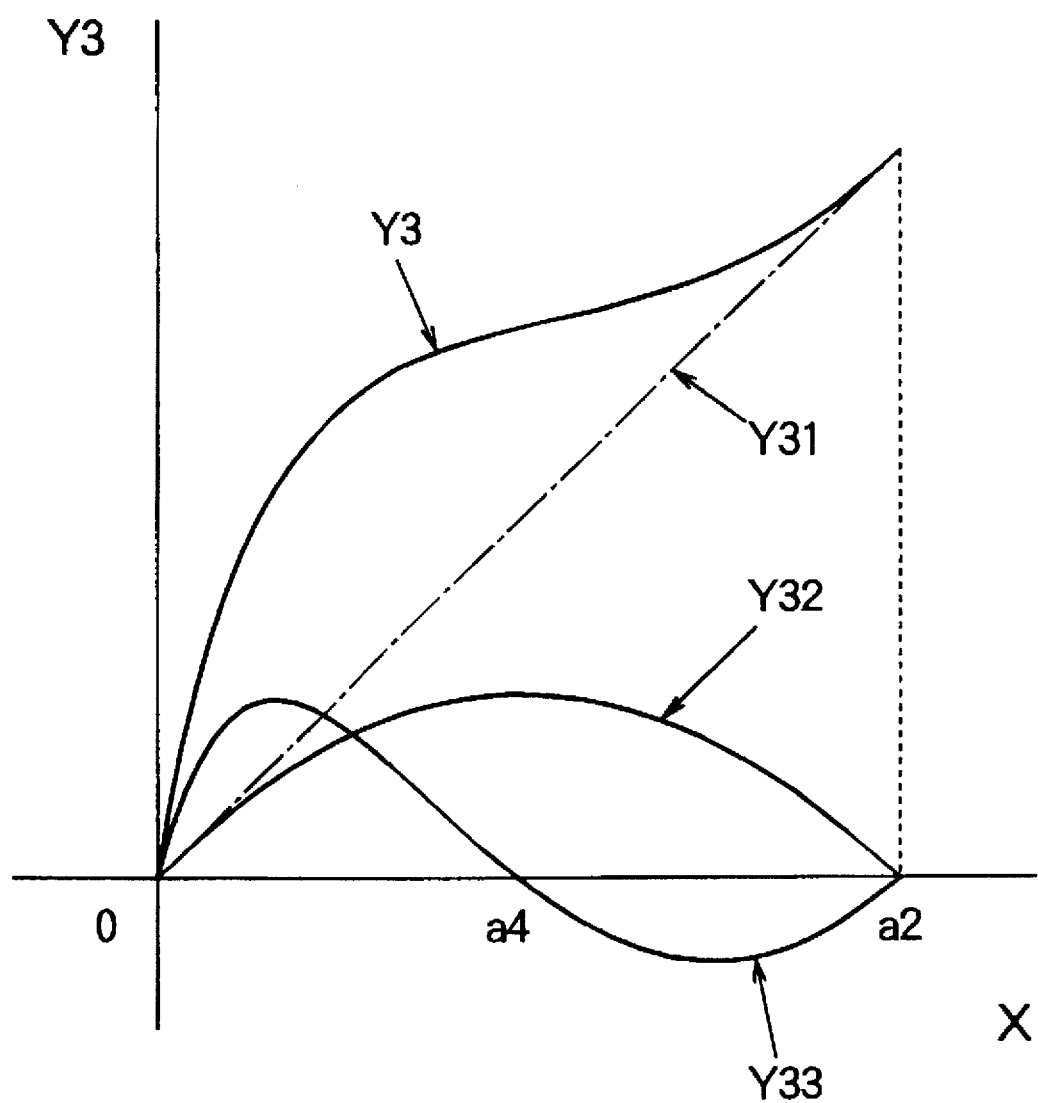
FIG. 10 is a diagram showing input-output characteristic of a tone conversion device of Embodiment 4 of the invention.

FIG. 10 shows an input-output characteristic of the tone conversion device of Embodiment 4. According to this input-output characteristic, the converted data Y3 is given by the following formula (5):

$$Y3 = X + a1 \cdot X \cdot (X-a2) + a3 \cdot X \cdot (X-a2) \cdot (X-a4)/(X+a5) \quad (5)$$

In the following description, the first, second and third terms are denoted by Y31, Y32 and Y33, and the converted data Y3 is therefore expressed by:

$$Y3 = Y31 + Y32 + Y33$$

In FIG. 10, Y31, Y32 and Y33 represent the characteristics of the first, second and third terms of the right side of the formula (5) and Y3 represents the overall characteristic of the formula (5). When the image data is of 8 bits, the following set of constants are employed.

$a2 = 255$ $a1 = -0.003$ $a3 = -0.01$ $a4 = 128$ $a5 = 50$

The right side of the formula (5) consists of the linear term Y31 and two compensation terms Y32 and Y33, and the sum of the three terms give the tone characteristic. The compensation term Y32 can modify the second-order component independently, while the compensation term Y33 modifies the (third-order/first-order) components independently. As a result, the formula (5) can realize complicated input-output characteristics.

The tone processing according to the formula (5) can be realized by adding a second-order term calculation means to the tone conversion device of Embodiment 2 shown in FIG. 5, or adding a second-order term calculation step to a tone processing method of Embodiment 13 which will be later described with reference to FIG. 24.

Further, the formula (5) can be rewritten as:

$$Y3 = X \cdot \{1 + a1 \cdot (X-a2) + a3 \cdot (X-a2) \cdot (X-a4)/(X+a5)\} \quad (6)$$

The functional calculation of this formula (6) can be implemented by modifying the tone conversion device for implementing the functional calculation of the formula (5).

Embodiment 5

Figure 11:
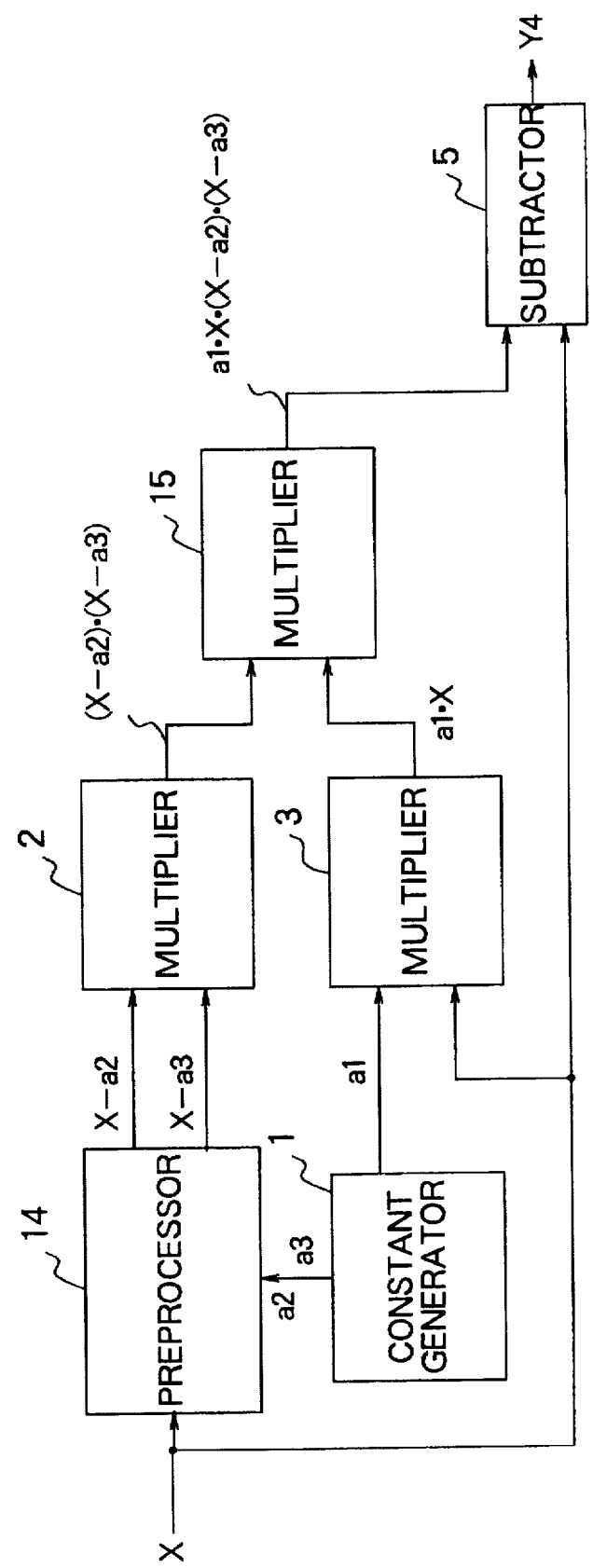
FIG. 11 is a block diagram showing the configuration of a tone conversion device of Embodiment 5 of the invention.

FIG. 11 is a block diagram showing a configuration of a tone conversion device of Embodiment 5. It comprises a first preprocessor 14, a constant generator 1, first to third multipliers 2c, 3c and 15, and a subtractor 5c.

The image data X is supplied to the preprocessor 14, the second multiplier 3c and the subtractor 5c. The constant generator 1 generates constant a1, a2 and a3, and supplies them to the preprocessor 14 and the multiplier 3c. The first preprocessor 14 subtracts a2 from X, and a3 from X and produces (X−a2) and (X−a3). The first multiplier 2c multiplies (X−a2) by (X−a3) to produce (X−a2)·(X−a3). The second multiplier 3c multiplies X by a1 to produce a1·X. The third multiplier 15 multiplies (X−a2)·(X−a3) by a1·X to produce a1·X·(X−a2)·(X−a3).

The subtractor 5c subtracts a1·X·(X−a2)·(X−a3) from X to produce the converted data Y4 expressed by the following formula (7):

$$Y4 = X - a1 \cdot X \cdot (X-a2) \cdot (X-a3) \quad (7)$$

The right side of the formula (7) consists of a first term which is a linear term and a second term which is a compensation term. The compensation term relates to a retouch amount with respect to the linear term, and its maximum is determined by the constant a1. The retouch amount is zero when X=0, X=a2 and X=a3. The sign (plus or minus) is reversed at these zero points.

Figure 12:
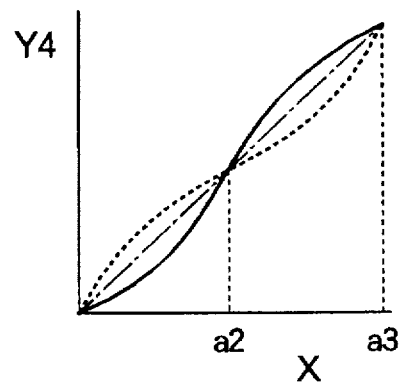
FIG. 12 is a diagram showing input-output characteristics of the tone conversion device of FIG. 11.

FIG. 12 shows an input-output characteristic of the tone conversion device of FIG. 11. It shows the input-output characteristic between the image data X and the converted data Y4, and the curve is S-shaped. The solid line shows the case where a1>0, the broken line shows the case where a<0, and the straight, chain line indicates the case where a1=0.

Figure 13A:
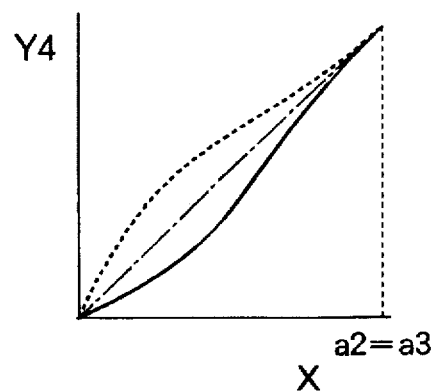
FIG. 13A and FIG. 13B are diagrams showing other input-output characteristics of the tone conversion device of FIG. 11.
Figure 13B:
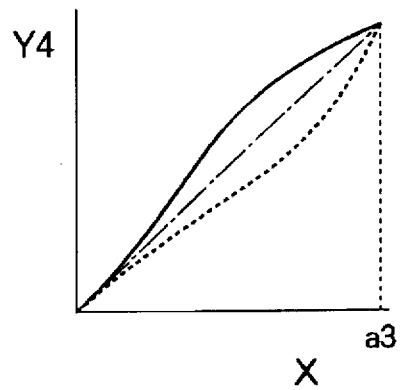

FIG. 13A and FIG. 13B show other input-output characteristics of the tone conversion device of FIG. 11. The illustrated conversion characteristics are not S-shaped. FIG. 13A shows the case where a2=a3=the maximum value of the image data. FIG. 13B shows the case where a2=0 and a3=the maximum value of the image data. The solid lines show the case where a1>0, the broken lines show the case where a1<0 and the straight, chain lines show the case where a1=0. When the actual image data (R, G and B) are substituted for X in the formula (7), the converted data (R1, G1, B1) can be determined.

The formula (7) can be rewritten as follows:

$$Y4 = X \cdot \{1 - a1 \cdot (X-a2) \cdot (X-a3)\} \quad (8)$$

The formula (8) indicates that the product of the retouch coefficients $\{1-a1 \cdot (X-a2) \cdot (X-a3)\}$ and the image data X gives the converted data Y4.

Embodiment 6

Figure 14:
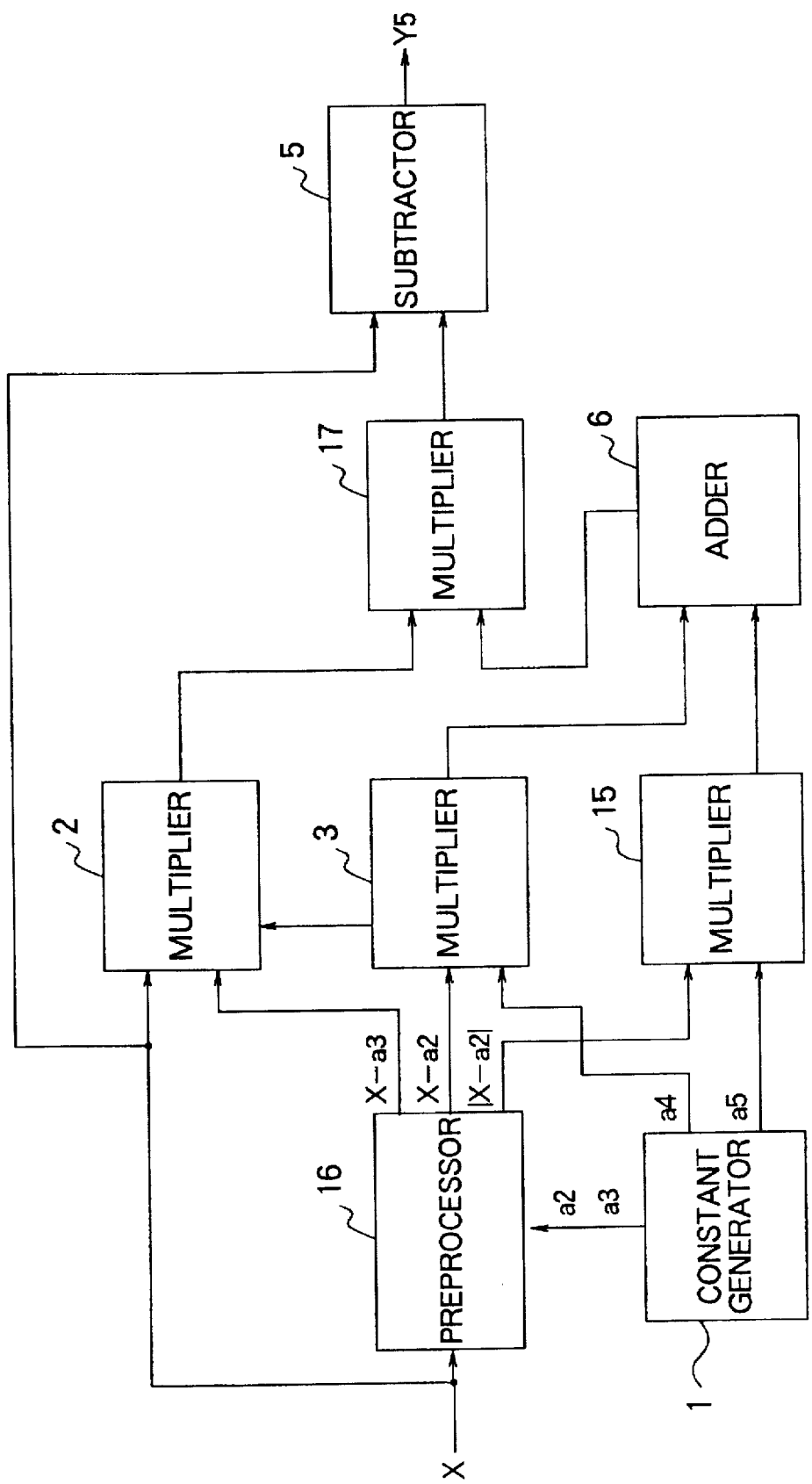
FIG. 14 is a block diagram showing the configuration of a tone conversion device of Embodiment 6 of the invention.

FIG. 14 is a block diagram showing the configuration of a tone conversion device of Embodiment 6. Reference numerals identical to those in FIG. 11 denote identical or corresponding circuits. The circuits which are not shown in FIG. 11 are a preprocessor 16, and a fourth multiplier 17.

The image data X is input to the preprocessor 16, the first multiplier 2d, and the subtractor 5d. The constant generator 1 generates constants a2, a3, a4 and and supplies them to the respective circuits as illustrated. The preprocessor 16 is similar to the first preprocessor 14 of FIG. 11 in that it produces the differences (X−a3) and (X−a2). It however has an additional function of calculating an absolute value |X−a2−a2|. The first multiplier 2d multiplies (X−a3) by X to produce X·(X−a3). The second multiplier 3d multiplies (X−a2) by a4 to produce a4·(X−a2). The third multiplier 15d multiplies |X−a2| by a5 to produce a5·|X−a2|. The adder 6d adds the output of the multiplier 2d to the output of the multiplier 3d to produce a4·(X−a2)+a5·|X−a2|. The fourth multiplier 17 multiplies the output of the adder 6d by the output of the multiplier 2d to produce X·(X−a3)·{a4·(X−a2)+a5·|X−a2|}.

The subtractor produces the converted data Y5 according the functional calculation of the following formula (9).

$$Y5 = X - X \cdot (X-a3) \cdot \{a4 \cdot (X-a2) + a5 \cdot |X-a2|\} \quad (9)$$

Figure 15:
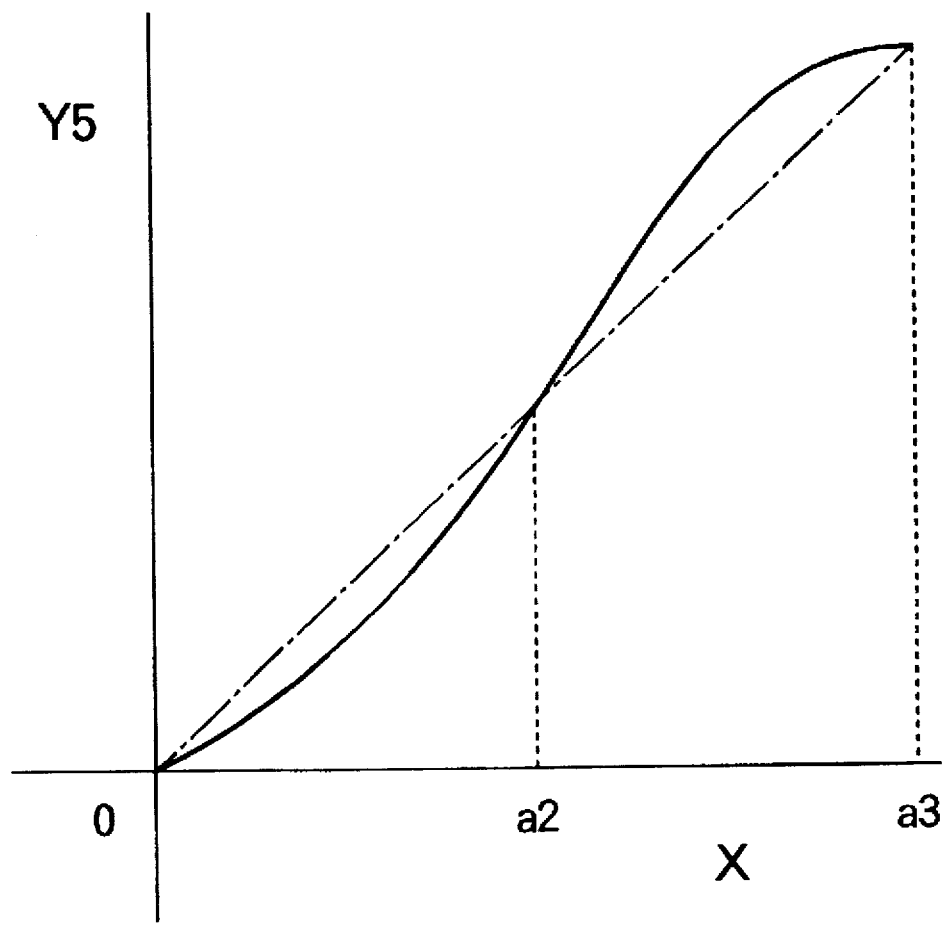
FIG. 15 is a diagram showing input-output characteristic of a tone conversion device of FIG. 14.

FIG. 15 shows an input-output characteristic of the tone conversion device of FIG. 14. The right side of the converted data Y5 of the formula (9) consists of a linear term and a compensation term, and
when $X \leq a2$ $$Y5=X-(a4-a5) \cdot X \cdot (X-a2) \cdot (X-a3)$$

while when X>a2

$$Y5=X-(a4+a5) \cdot X \cdot (X-a2) \cdot (X-a3)$$

The relationship between the image data X nd the converted data Y5 is S-shaped as shown in FIG. 15. The ratio of the retouch amount in the region of X<a2 and the retouch amount in the region of X>a2 is (a4−a5)/(a4+a5). Thus, the conversion characteristic can be adjusted by the ratio between a4 and a5.

The formula (9) can be rewritten as follows:

$$Y5=X \cdot [1-(X-a3) \cdot \{a4 \cdot (X-a2)+a5 \cdot |X-a2|\}] \tag{10}$$

The calculation according to this formula can be implemented by modifying the tone conversion device of FIG. 14.

Embodiment 7

Figure 16:
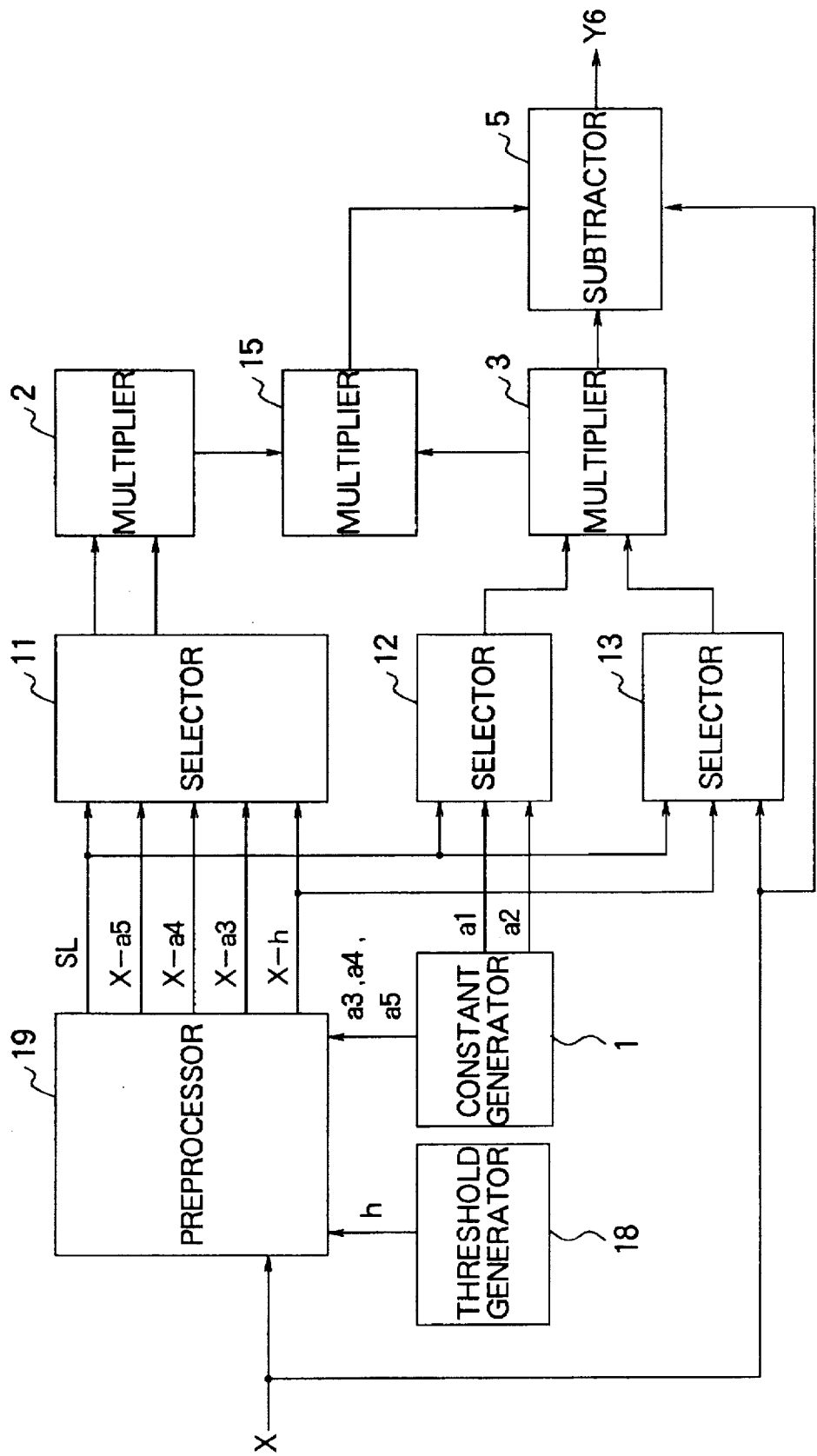
FIG. 16 is a block diagram showing the configuration of a tone conversion device of Embodiment 7 of the invention.

FIG. 16 is a block diagram showing the configuration of a tone conversion device of Embodiment 7. It comprises a threshold value generator 18, a third preprocessor 19, and selectors 11 and 12, as well as other circuits which are identical or corresponding to those in the previous figures, and which are therefore denoted by identical reference numerals.

The image data X is supplied to preprocessor 19, the third selector 13 and the subtractor 5. The threshold generator 18 generates a threshold value h, and the constant generator 1d generates constants a1, a2, a3, a4 and a5. The constants a3, a4 and a5 are supplied to the preprocessor 19, and the constants a1 and a2 are supplied to the second selector 12e. The third preprocessor 19 produces the differences (X−h), (X−a3), (X−a4) and (X−a5), and the comparison data SL. The comparison data SL represents the result of comparison of the magnitudes of X and h. When X≦h, the logical value of the comparison data SL is L, while when X>h, the logical value of the comparison data SL is H. The first selector 11e selectively outputs X−h and X−a3 when SL=L, and X−a4 and X−a5 when SL=H. The first multiplier 2e outputs the product (X−h)·(X−a3) or (X−a4)·(X−a5). The second selector 12e outputs a1 when SL=L, and a2 when SL=H. The third selector 13e selectively outputs X when SL=L, and X−h when SL=H. The second multiplier 3e outputs a product a1·X or a2·(X−h). The third multiplier 15e outputs a product a1·X·(X−h)·(X−a3), or a2·(X−h)·(X−a4)·(X−a5).

The subtractor 5e outputs the converted data Y6 by the functional calculation of the formulae (11) and (12):

When X<h $$Y6=X-a1 \cdot X \cdot (X-h) \cdot (X-a3) \tag{11}$$

When X>h $$Y6=X-a2 \cdot (X-h) \cdot (X-a4) \cdot (X-a5) \tag{12}$$

The right side of each of these formulae (11) and (12) consists of a linear term and a compensation term. The relationship between the image data X and the converted data Y6 is S-shaped. In the formulae (11) and (12), the retouch amount for X≦h and the retouch amount for X>h are determined by a1 and a2.

Figure 17A:
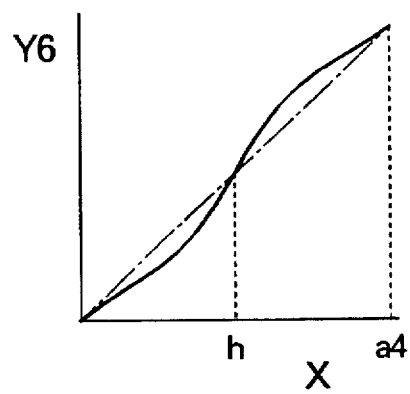
FIG. 17A to FIG. 17C are diagrams showing input-output characteristics of the tone conversion device of FIG. 16.
Figure 17B:
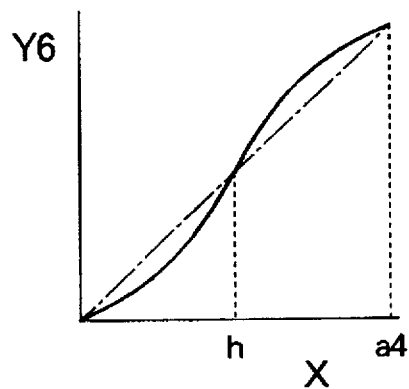
Figure 17C:
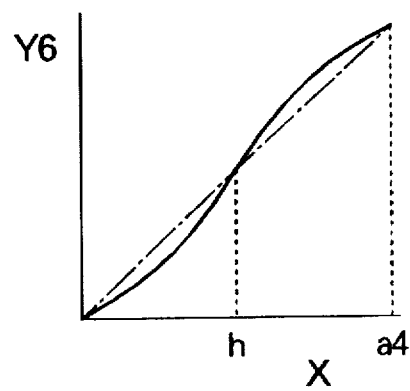

FIG. 17A, FIG. 17B and FIG. 17C show input-output characteristics of the tone conversion device of FIG. 16. The formulae (11) and (12) are featured by the fact that even if h, a1, a2 and a4 are fixed, the shape of the S-shaped characteristics curve can be varied at will by changing a3 and a5. FIG. 17A shows the case where a3=0 and a5=a4, FIG. 17B shows the case where a3=a4, and a5=0, and FIG. 17C shows the case where a3=a5=h.

Embodiment 8

Figure 18:
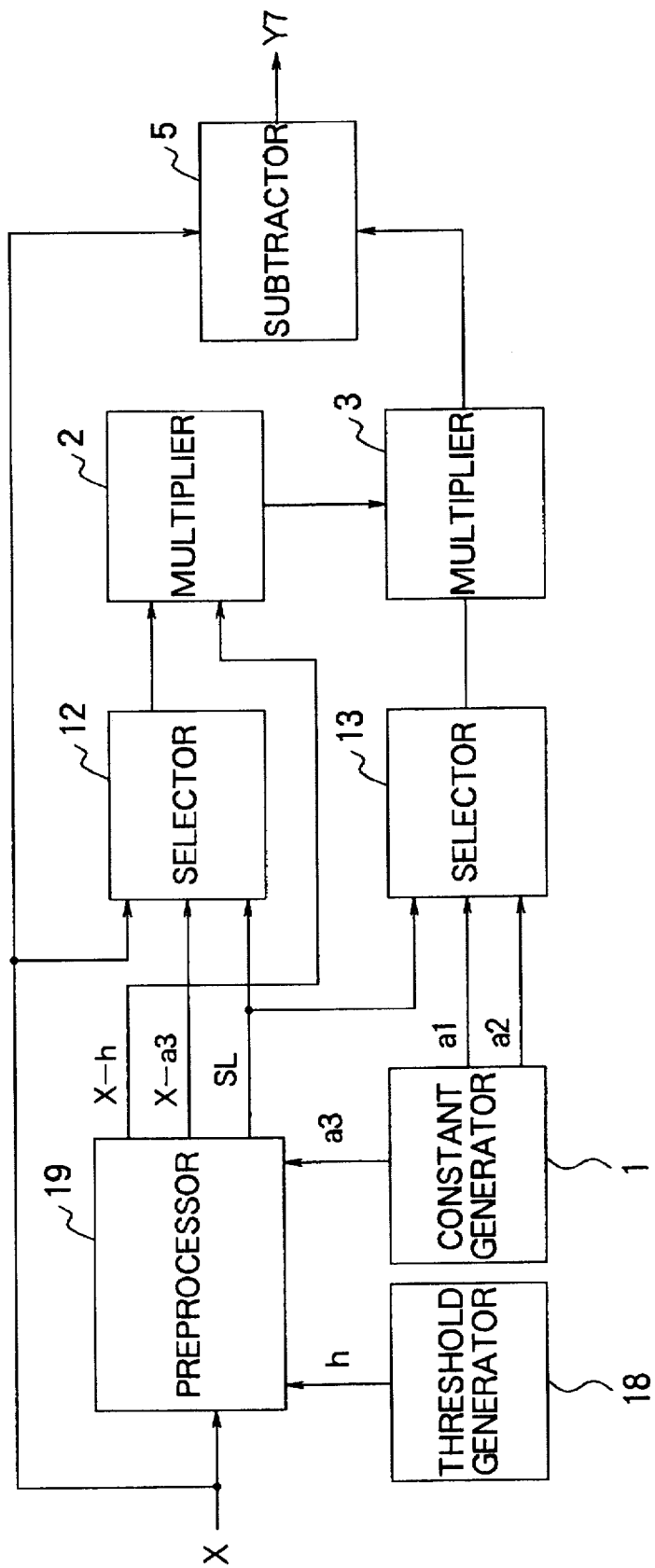
FIG. 18 is a block diagram showing the configuration of a tone conversion device of Embodiment 8 of the invention.

FIG. 18 is a block diagram showing the configuration of the tone conversion device of Embodiment 8. The block configuration is simpler than any of those of the previous embodiments. The reference numerals identical to those of the previous figures denote identical or corresponding circuits.

The image data X is supplied to the preprocessor 19f, the second selector 12f and the subtractor 5f. The threshold value generator 18 generates a constant h, and the constant generator 1 generates constants a1, a2 and a3. The threshold value h and the constant a3, a4, a5 are supplied to the preprocessor 19f, and the constants a1 and a2 are supplied to the selector 13f. The preprocessor 19f outputs the differences (X−h) and (X−a3) and the comparison data SL. The comparison data SL is identical to that of the embodiment of FIG. 16. The selector 12f outputs X when SL=L, and X−a3 when SL=H. The first multiplier 2f outputs a product X·(X−h) or (X−h)·(X−a3). The selector 12f outputs a1 when SL=L, and a2 when SL=H. The second multiplier 3f outputs a1·X·(X−h), or a2·(X−h)·(X−a3).

The subtractor 5f outputs the converted data Y7 given by the following formulae (13) and (14).

When X≦h $$Y7=X-a1 \cdot X \cdot (X-h) \tag{13}$$

When X>h $$Y7=X-a2 \cdot (X-h) \cdot (X-a3) \tag{14}$$

Figure 19:
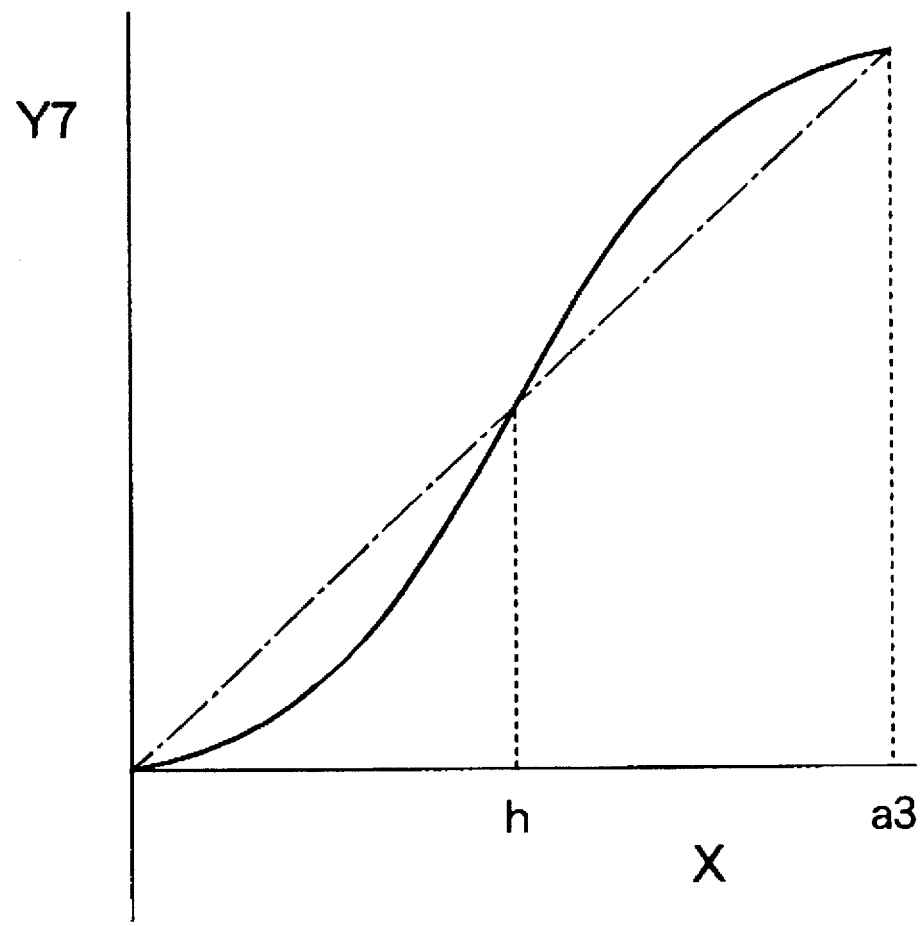
FIG. 19 is a block diagram showing input-output characteristic of a tone conversion device of FIG. 18.

FIG. 19 shows an input-output characteristic of the tone conversion device of FIG. 18. The formulae (13) and (14) are featured by the S-shaped conversion characteristics. With this arrangement, the size of the circuit of the tone conversion device is reduced, and the processing speed is increased.

Embodiment 9

Figure 20:
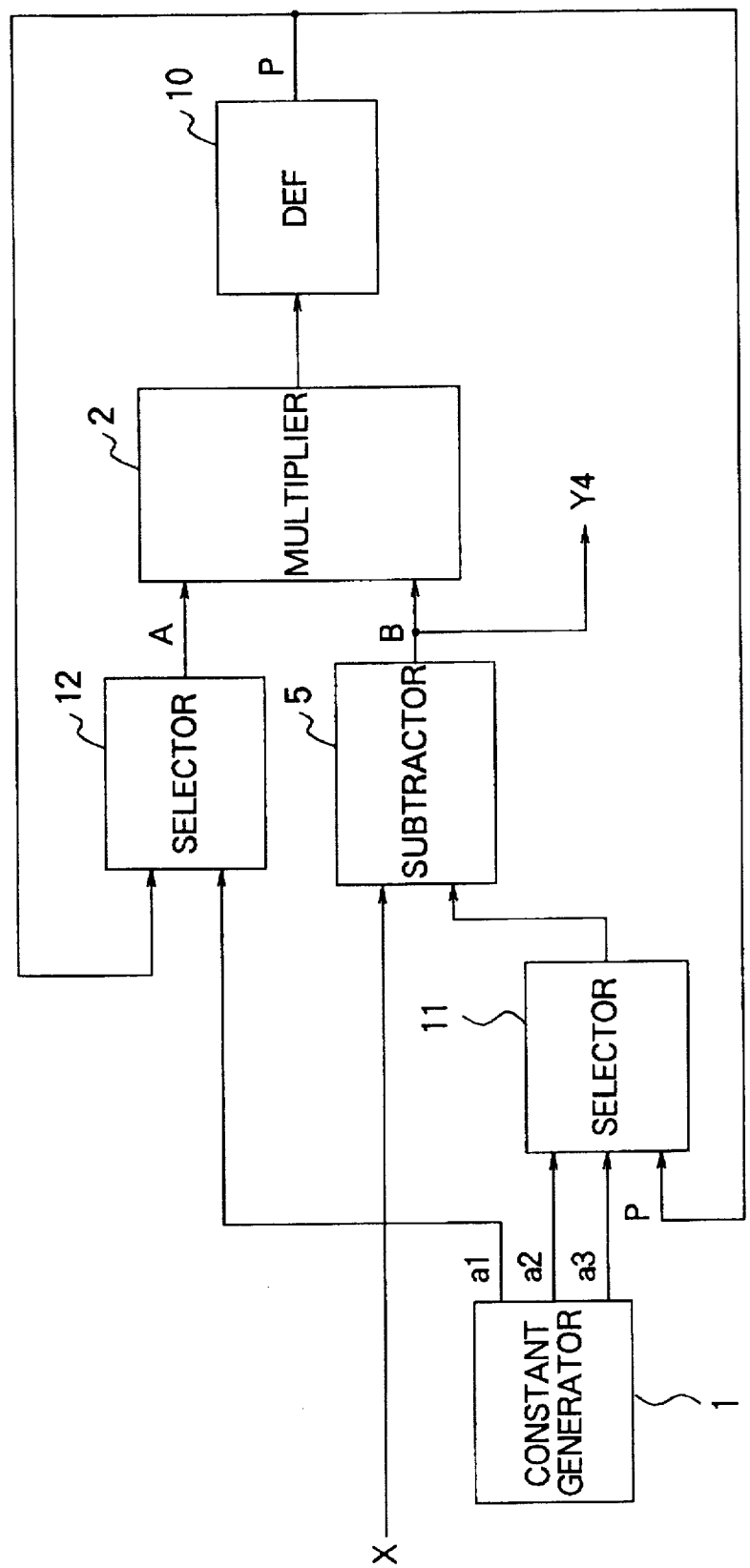
FIG. 20 is a block diagram showing the configuration of a tone conversion device of Embodiment 9 of the invention.

FIG. 20 is a block diagram showing the configuration of the tone conversion device of Embodiment 9.

According to the configuration of Embodiment 9, the functional calculation of the formula (7) of Embodiment 5 can be implemented by the use of a single multiplier. It comprises a DFF 10 for temporarily storing data, as well as circuits identical or corresponding to those denoted by identical reference numerals in the previous figures.

The image data X is supplied to the subtractor 5g. The constant generator 1 generates constants a1, a2 and a3. The constant a1 is supplied to the second selector 12, and the constants a2 and a3 are supplied to the first selector 11g. The data P stored in the DFF 10 is set to the initial state of "0". Under this condition, the subtractor 5g subtracts the output of the first selector 11g from the image data X to produce the difference B=X−P=X. The second selector 12 selectively outputs a1. That is the selected data A=a1. The first multiplier 2g outputs a product a1·X. The DFF 10 temporarily stores this product as P.

Then, the first selector 11g outputs a2, and the second selector 12 outputs the stored data P. Then, A=P. The subtractor 5g outputs b=X−a2. The product output from the first multiplier 2 is a1·X·(X−a2). This is also temporarily stored in the DFF 10.

Then, the first selector 11g outputs a3, and the second selector 12 outputs the stored data P. The output of the subtractor is B=X−a3, and the product is a1·X·(X−a2)·(X−a3). This is also temporarily stored in the DFF 10. The stored data P is output from the first selector 11g, and the data B from the subtractor 5 will then be B=X−a1·X·(X−a2)·(X−a3). If B in this formula is replaced by Y4, the result is the formula (7).

Generally, the size of the circuit of the multiplier for image processing is about several hundreds of gates. The device of Embodiment 5 shown in FIG. 11 is composed of about 2K gates. In contrast, the device of this embodiment shown in FIG. 20 is composed of about 1K gates, which is about one half. However, the circuit configuration of FIG. 20 is for performing a cyclic calculation, and the speed of processing is lower.

A configuration for implementing the formula (7) is described. The same concept can be applied to the formulae (9), (11), (12), (13) and (14).

Embodiment 10

Figure 21:
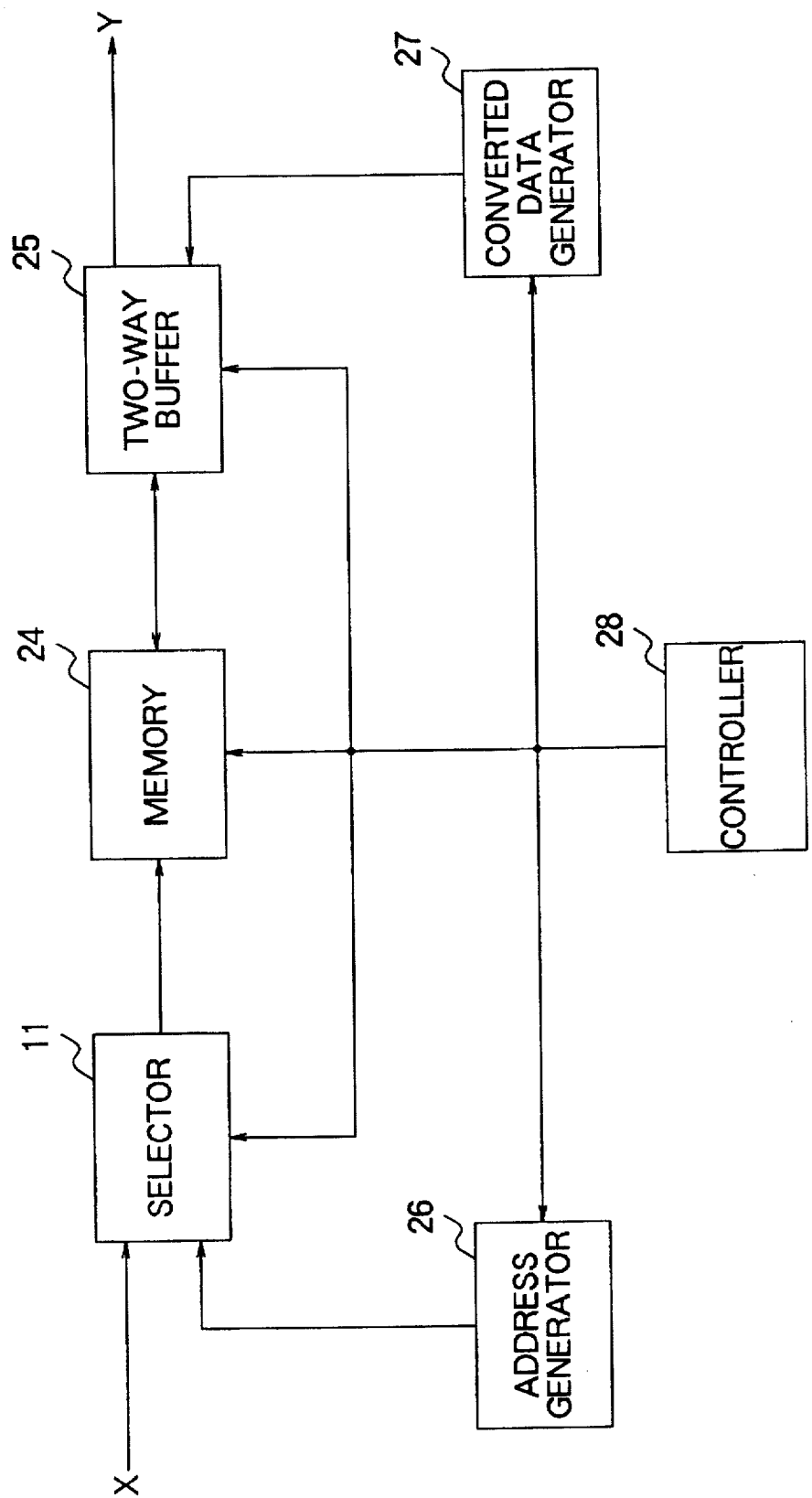
FIG. 21 is a block diagram showing the configuration of a tone conversion device of Embodiment 10 of the invention.

FIG. 21 is a block diagram showing a configuration of the tone conversion device of Embodiment 10. The tone conversion device of this embodiment is featured by the fact that it can perform the tone processing at a very high speed. The tone conversion device of this embodiment comprises a memory 24 of a fixed capacity, a two-way buffer 25, an address generator 26, a converted data generator 27, and a controller 28, as well as a first selector 11h identical or similar to the selectors in the previous figures.

The address generator 26 generates data "0". This data is output from the first selector 11h and supplied to the address terminal of the memory 24. The converted data generator 27 generates converted data Y corresponding to the image data X=0. The generated converted data Y is supplied via the two-way buffer 25 to the data terminal of the memory 24. In this state, the controller 28 applies a write pulse to the memory 24, so as to write the converted data Y in the address "0". Converted data for other addresses, address "1" to address "255" in the memory 24 are written sequentially in a similar manner. Thus, converted data for all combinations of the 8 bit inputs are stored.

The controller 28 then sets the first selector 11h in a mode for inputting the image data X, and the two-way buffer 25 in a mode for outputting the converted data Y. In this state, the image data X are sequentially input. Then, converted data Y are obtained through table conversion. The memory 24 may be formed of a very fast SRAM, and a processing at 50 MHz or higher frequency can be achieved. In comparison, the processing speed of the device of Embodiment 1 shown in FIG. 1, formed of a general-purpose LSI, is in the order of 30 MHz, at best.

The converted data generator 27 generates the converted data using the formula (1), (2), (3), or (4). Since high speed processing is not required, it may be formed of the circuit configuration of Embodiment 3 shown in FIG. 9. The address generator 26, the converted data generator 27 and the controller 28 may be implemented by software, i.e., of a programmed microcomputer.

Embodiment 11

Figure 22:
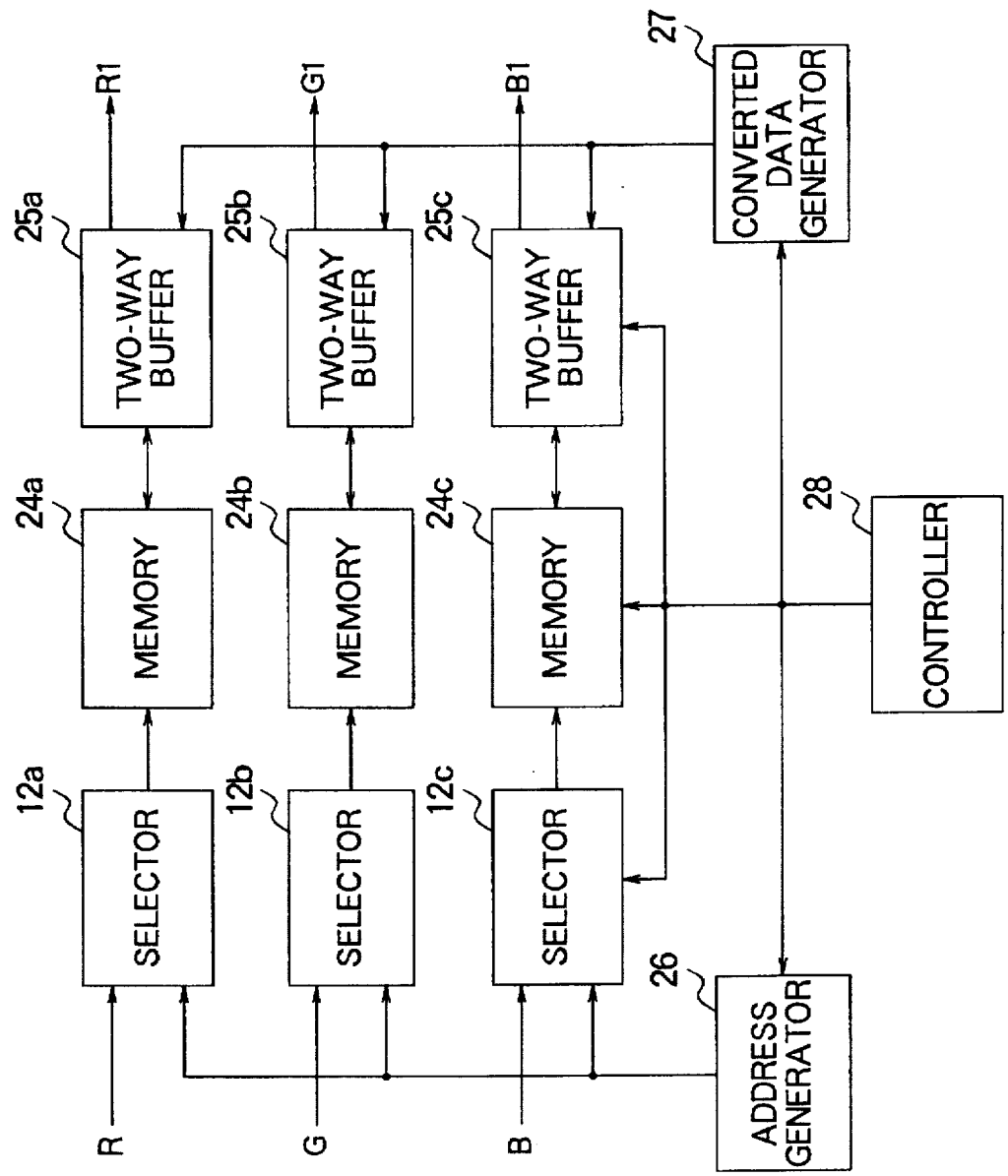
FIG. 22 is a block diagram showing the configuration of a tone conversion device of Embodiment 11 of the invention.

FIG. 22 is a block diagram showing the configuration of a tone conversion device of Embodiment 11. The device uses a memory to perform tone processing at a very high speed. The capacity of the memory is fixed although the memory is used for a variety of conversion characteristics. The tone conversion device of this embodiment includes selectors 12a to 12k, memories 24a to 24c, two-way buffers 25a to 25c, an address generator 26, a converted data generator 27, and a controller 28.

The address generator 26 first generates data "0". This data is selected by the selectors 12i to 12k, and supplied to the address terminals of the memories 24a to 24c. The converted data generator 27 generates converted data for the image data X=0, and supplies them through the two-way buffer 25a to 25C to the data terminals of the memories 24a to 24c. In this state, the controller 28 applies a write pulse to the memories 24a to 24c, so as to write the converted data at the address "0" in each of the memories 24a to 24c. Similar operations are repeated to store the converted data for each of the addresses "1" to address "255". The converted data stored in the memories correspond to respective values of the 8 bit inputs.

The controller 28 then sets the selectors 12i to 12k in a mode for inputting the image data (R, G, B), and sets the two-way buffers 25a to 25c in a mode for outputting the converted data (R1, G1, B1). In this state, when the image data are input in sequence, corresponding converted data (R1, G1, B1) are obtained through table conversion. The memories 24a to 24c may be formed of high-speed SRAM, and a real time processing up to several tens of MHz is possible.

The converted data generator 27 generate the converted data using the formulae (7) to (12). Since high-speed processing is not required, it may be formed of the circuit configuration of Embodiment 9 shown in FIG. 20. The address generator 26, the converted data generator 27 and the controller 28 may be implemented by software, i.e., a programmed microcomputer.

When the device of Embodiment 5 shown in FIG. 11 is adapted to R, G and B image data, it is formed of about 6000 gates. In contrast, an SRAM of 256 B corresponds to about 1200 gates. In Embodiment 11, since the circuit configuration of FIG. 20 is employed, the whole device can be formed of about 5000 gates. When a CPU prepared to realize additional function is used, the whole device can be formed of about 4000 gates. When the constants of the converted data generator 27 are changed, the conversion characteristics can be changed.

Embodiment 12

Figure 23:
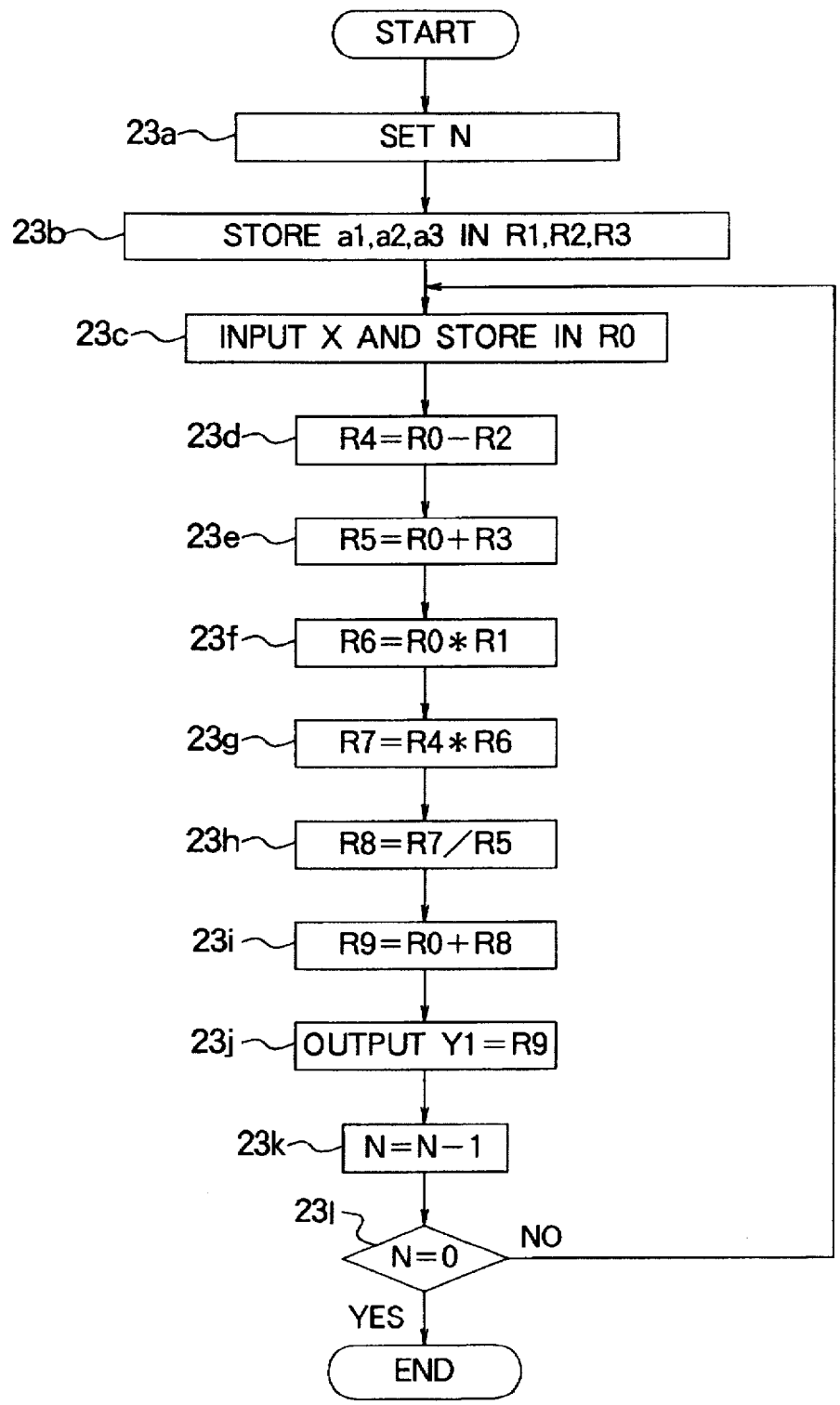
FIG. 23 is a flowchart showing the method tone conversion device of Embodiment 12 of the invention.

FIG. 23 is a flowchart showing a tone processing method of Embodiment 12. This method is for implementing the functional calculation of the formula (1) by a software (a computer program).

In the following description, as well as in the flowcharts, "Rn" (where n=0, 1, 2, 3 . . . ) denotes a register, or represents the content of (value stored in) the register.

At step 23a, the total number N of the pixels which are to be processed is input.

At step 23b, a1, a2, a3 are stored in respective registers R1, R2 and R3.

At step 23c, the image data X is input and stored in register R0.

At step 23d, the difference R0−R2 (i.e., (the content of the register R0)−(the content of the register R2)) is calculated and stored in register R4.

At step 23e, the sum R0+R3 is calculated and stored in register R5.

At step 23f, the product R0*R1 is calculated and stored in register R6.

At step 23g, the product R4*R6 is calculated and stored in register R7.

At step 23h, the quotient R7/R5 is calculated and stored in register R8.

At step 23i, the sum R0+R8 is calculated and stored in register R9.

At step 23j, the content of R9 is output as converted data Y1.

At step 23k, N is decremented by 1.

At step 231, judgement is made whether the process should be continued. If the answer is affirmative, the process is returned to step 23c. If the answer is negative, the process is stopped.

The step 23a includes the function of selecting the values of a1, a2 and a5 according to an externally supplied input.

Embodiment 13

Figure 24:
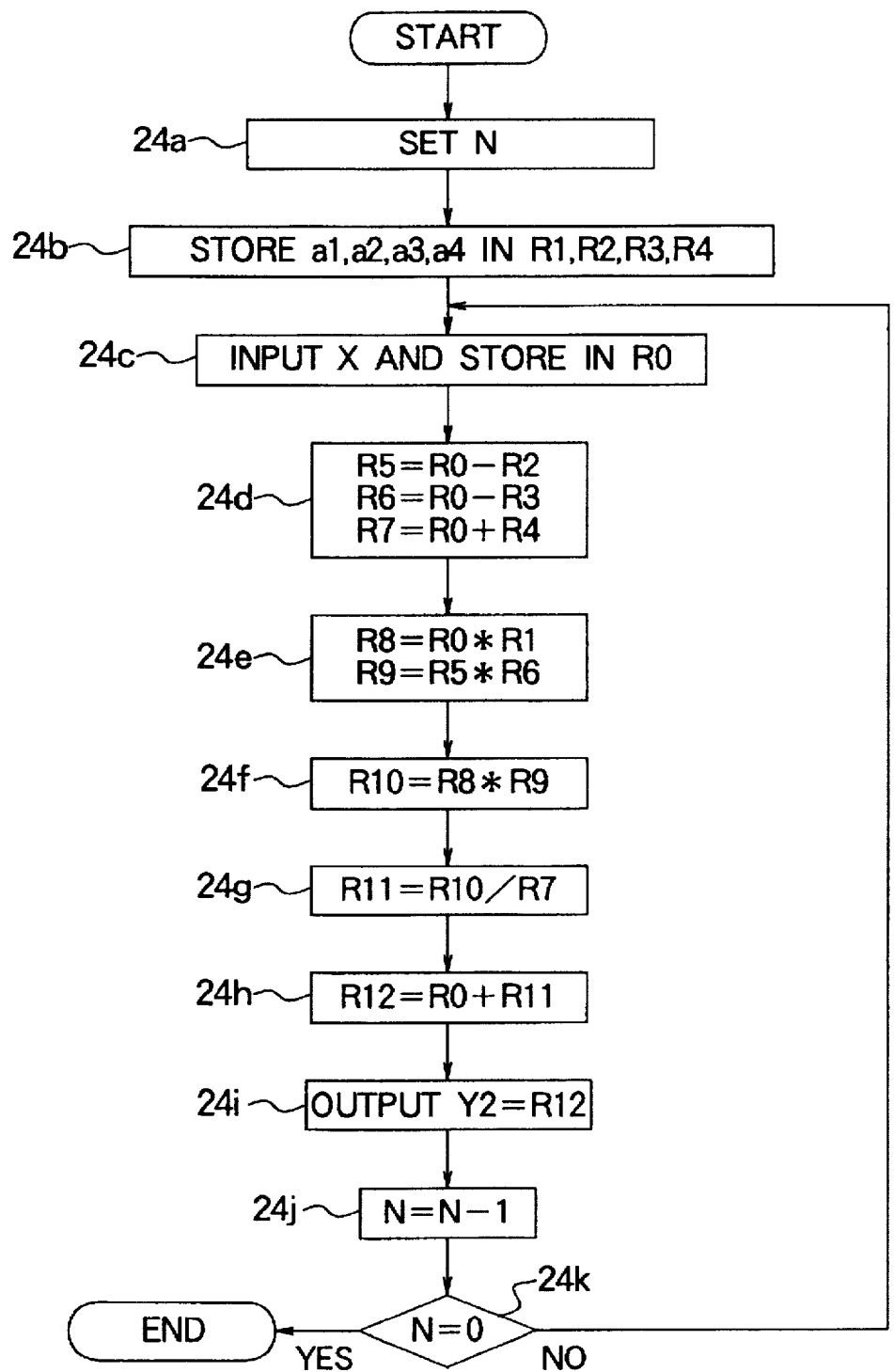
FIG. 24 is a flowchart showing the tone conversion method of Embodiment 13 of the invention.

FIG. 24 is a flowchart showing a tone processing method of Embodiment 13. This method is for implementing the functional calculation of the formula (3) by a software.

At step 24a, the total number N of the pixels which are to be processed is input.

At step 24b, a1, a2, a3 and a4 are calculated and stored in respective registers R1, R2, R3 and R4.

At step 24c, the image data X is input and stored in register R0.

At step 24d, the difference R0–R2 is calculated and stored in register R5, the difference R0–R3 is calculated and stored in register R6, and the sum R0+R4 is calculated and stored in register R7.

At step 24e, the product R0*R1 is calculated and stored in register R8, and the product R5*R6 is calculated and stored in register R9.

At step 24f, the product R8*R9 is calculated and stored in register R10.

At step 24g, the quotient R10/R7 is calculated and stored in register R11.

At step 24h, the sum R0+R11 is calculated and stored in register R12.

At step 24i, the content of R12 is output as converted data Y.

At step 24j, N is decremented by 1.

At step 24i, judgement is made whether the process should be continued. If the answer is affirmative, the process is returned to step 24c. If the answer is negative, the process is stopped.

The step 24a includes the function of selecting the values of a1, a2, a3 and a4 according to an externally supplied input.

Figure 28:
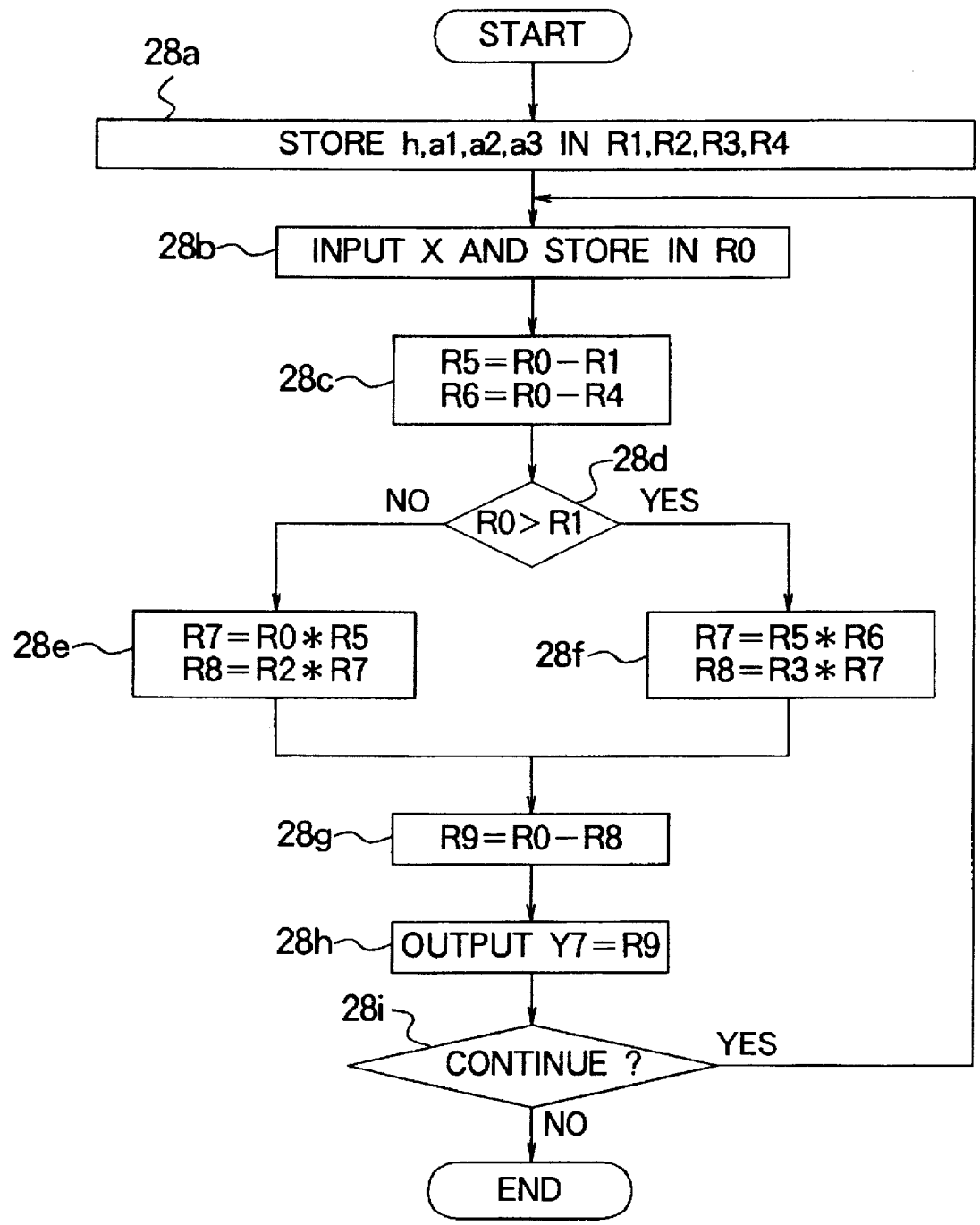
FIG. 28 is a flowchart showing the tone conversion method of Embodiment 17 of the invention.

Embodiments 12 and 13 illustrated in FIG. 28 and FIG. 24 use the formula (1) or (3). The concept explained in connection with Embodiments 12 and 13 can be applied to the formulae (2) and (5).

Embodiment 14

Figure 25:
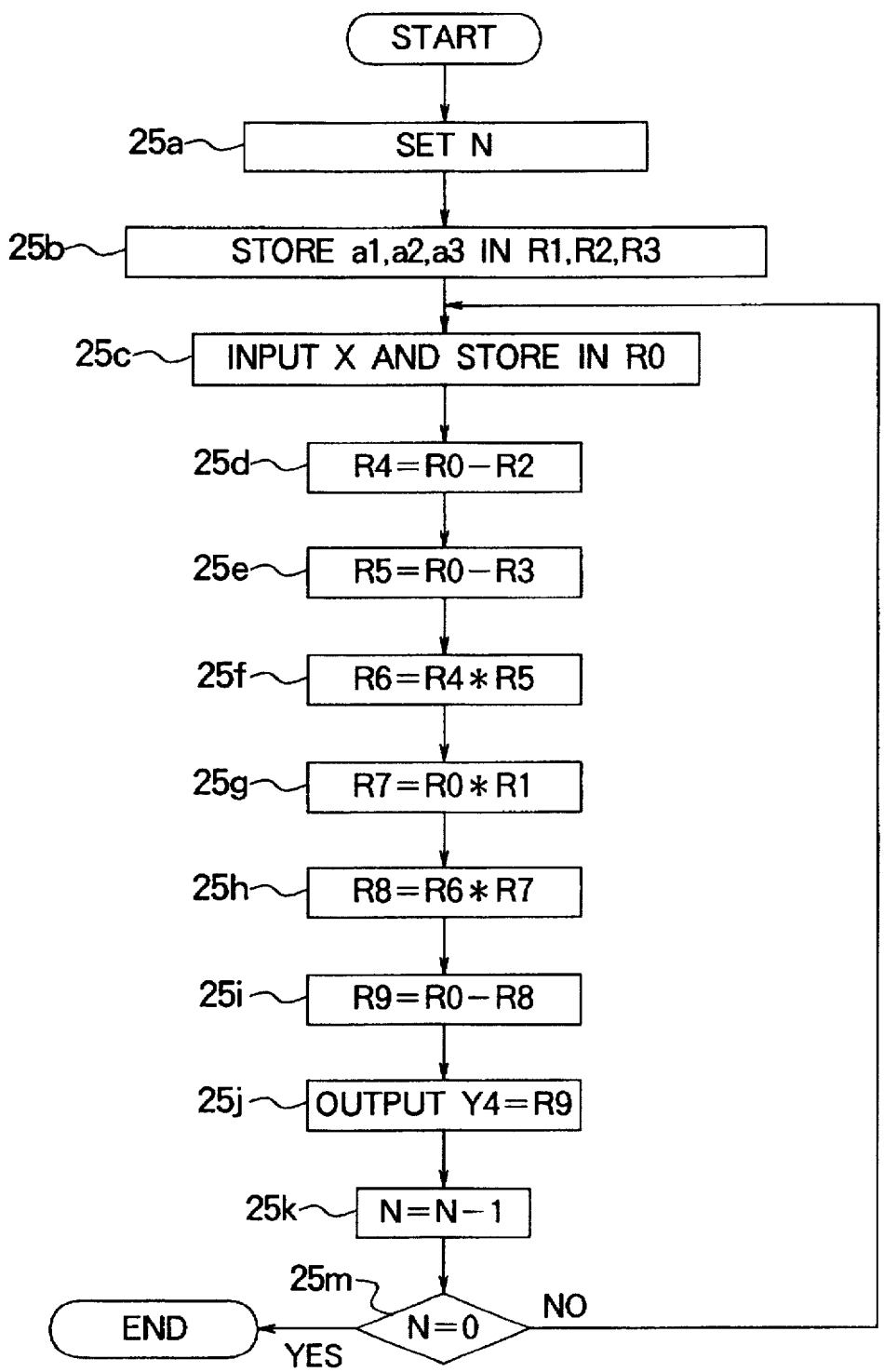
FIG. 25 is a flowchart showing the tone conversion method of Embodiment 14 of the invention.

FIG. 25 is a flowchart showing a tone processing method of Embodiment 14. This embodiment is for implementing the functional calculation of the formula (7) by means of a software.

At step 25a, the total number N of the pixels which are to be processed is input.

At step 25b, a1, a2 and a3 are stored in respective registers R1, R2 and R3.

At step 25c, the image data X is input and stored in register R0.

At step 25d, the difference R0–R2 is calculated and stored in register R4.

At step 25e, the difference R0–R3 is calculated and stored in register R5.

At step 25f, the product R4*R5 is calculated and stored in register R6.

At step 25g, the product R0*R1 is calculated and stored in register R7.

At step 25h, the product R6*R7 is calculated and stored in register R8.

At step 25i, the difference R0–R8 is calculated and stored in register R9.

At step 25j, the content of R9 is output as converted data Y4.

At step 25k, N is decremented by 1.

At step 25m, judgement is made whether the process should be continued. If the answer is affirmative, the process is returned to step 25c. If the answer is negative, the process is stopped.

Embodiment 15

Figure 26:
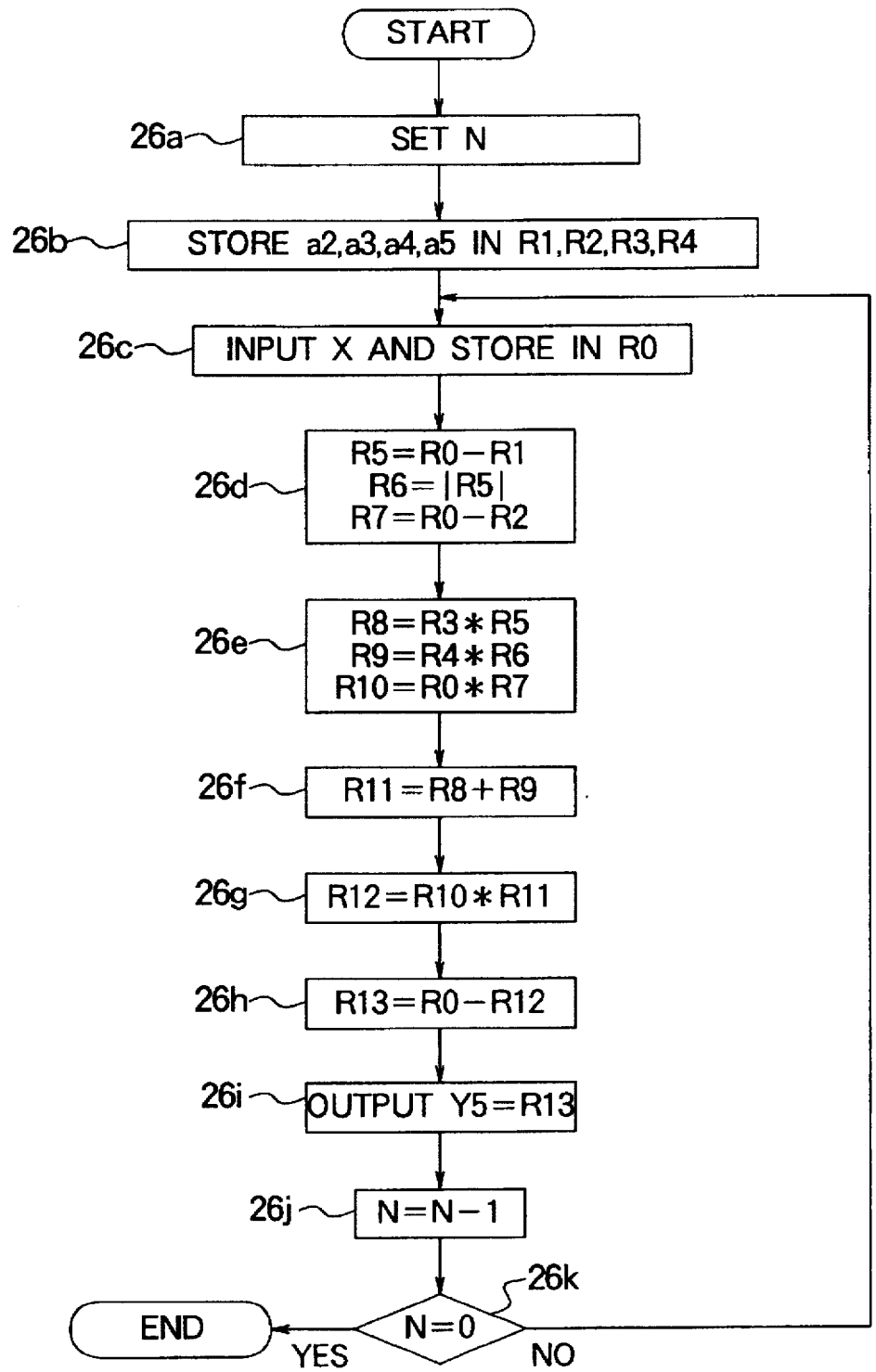
FIG. 26 is a flowchart showing the tone conversion method of Embodiment 15 of the invention.

FIG. 26 is a flowchart showing a tone processing method of Embodiment 15. This embodiment is for implementing the functional calculation of the formula (9) by means of a software.

At step 26a, the total number N of the pixels which are to be processed is input.

At step 26b, a2, a3, a4 and a5 are stored in respective registers R1, R2, R3 and R4.

At step 26c, the image data X is input and stored in register R0.

At step 26d, the difference R0–R1 is calculated and stored in register R5, the absolute value of R5 is calculated and stored in register R6, and the difference R0–R2 is calculated and stored in register R7.

At step 26e, the product R3*R5, the product R4*R6, and R0*R7 are calculated and stored in the registers R5, R9 and R10, respectively.

At step 26f, the sum R8+R9 is calculated and stored in register R11.

At step 26g, the product R10*R11 is calculated and stored in register R12.

At step 26h, the difference R0–R12 is calculated and stored in register R13.

At step 26i, the content of R13 is output as converted data Y5.

At step 26j, N is decremented by 1.

At step 26k, judgement is made whether the process should be continued. If the answer is affirmative, the process is returned to step 26c. If the answer is negative, the process is stopped.

Embodiment 16

Figure 27:
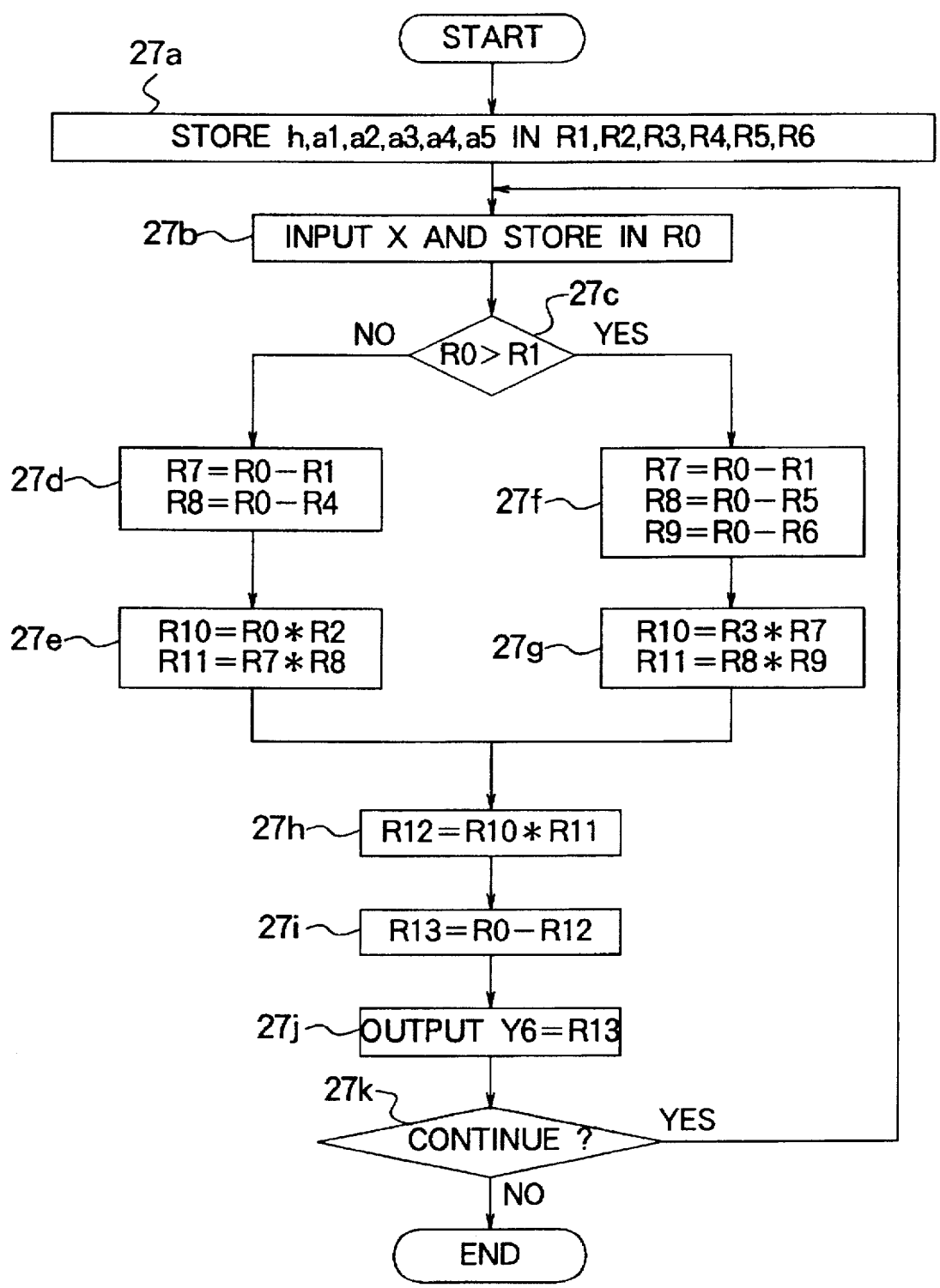
FIG. 27 is a flowchart showing the tone conversion method of Embodiment 16 of the invention.

FIG. 27 is a flowchart showing a tone processing method of Embodiment 16. This embodiment is for implementing the functional calculation of the formulae (11) and (12) by means of a software.

At step 27a, the threshold value h, and constants a1 through a5 are stored in respective registers R1 through R6.

At step 27b, the image data X is input and stored in register R0.

At step 27c, judgement is made whether R0>R1. If R0≦R1, the process proceeds to step 27d. If R0>R1, the process proceeds to step 27f.

As step 27d, the differences R0–R1, and R0–R4 are calculated and stored in registers R7 and R8, respectively.

At step 27e, the products R0*R2 and R7*R8 are calculated and stored in registers R10 and R11, respectively.

At step 27f, the differences R0–R1, R0–R5, and R0–R6 are calculated and stored in registers R7, R8 and R9, respectively.

At step 27g, the products R3*R7, and R8*R9 are calculated and stored in registers R10 and R11, respectively.

At step 27h, the product R10*R11 is calculated and stored in register R12.

At step 27i, the difference R0–R12 is calculated and stored in register R13.

At step 27j, the content of R13 is output as converted data Y6.

At step 27k, judgement is made whether the process should be continued. If the answer is affirmative, the process is returned to step 27b. If the answer is negative, the process is stopped.

Embodiment 17

FIG. 28 is a flowchart showing a tone processing method of Embodiment 17. This embodiment is for implementing the functional calculation of the formulae (13) and (14) by means of a software.

At step 28a, the threshold value h, and constants a1, a2 and a3 are stored in respective registers R1 through R4.

At step 28b, the image data X is input and stored in register R0.

At step 28c, the differences R0−R1, and R0−R4 are calculated and stored in registers R5 and R6, respectively.

At step 28d, judgement is made whether R0>R1. If R0≦R1, the process proceeds to step 28e. If R0>R1, the process proceeds to step 28f.

As step 28e, the products R0*R5, and R2*R7 are calculated and stored in registers R7 and R8, respectively.

At step 28f, the products R5*R6, and R3*R7 are calculated and stored in registers R7 and R8, respectively.

At step 28g, the difference R0−R8 is calculated and stored in register R9.

At step 28h, the content of R9 is output as converted data Y7.

At step 28i, judgement is made whether the process should be continued. If the answer is affirmative, the process is returned to step 28b. If the answer is negative, the process is stopped.

In Embodiment 12 to Embodiment 17, the order of the steps may be altered, and the number of registers may be reduced. For instance, in FIG. 23, the step 23f may be inserted between steps 23c and 23d, and the number of registers may be reduced. Also, as a modification in which some of the steps precedes a branching step, the steps 27f and 27g in FIG. 27 may be inserted between the steps 27b and 27c. The number of registers may be reduced by using the registers for multiple purposes.

Embodiment 18

Figure 29:
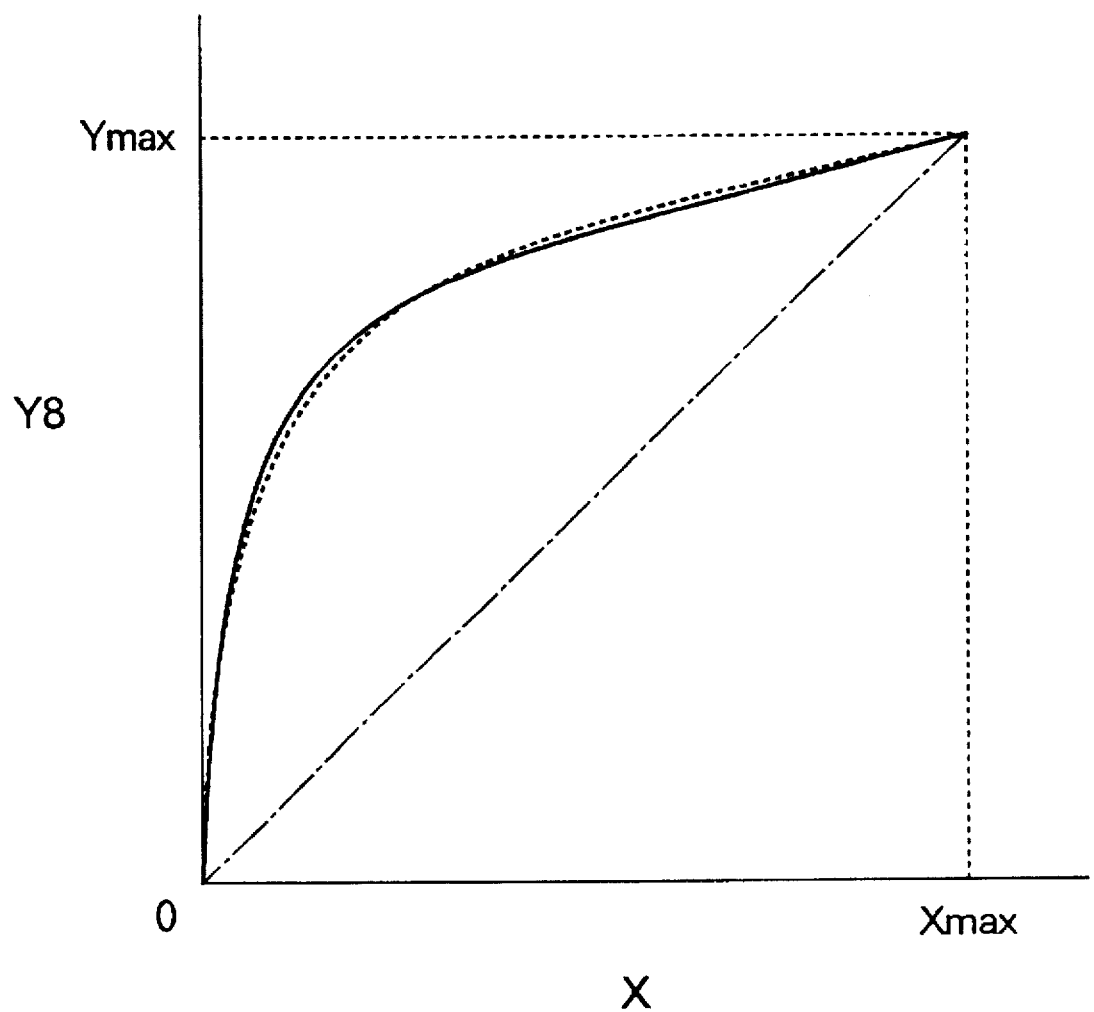
FIG. 29 is a diagram showing input-output characteristic of the tone conversion device of Embodiment 18 of the invention.

FIG. 29 illustrates an input-output characteristic of a tone conversion device of Embodiment 18. It is for providing an approximation of converted data of the formula (1) by means of logarithmic calculation.

For the logarithmic calculation, the following formula (29) is used.

$$Y8 = Y\max \cdot \{\log(X+1)/\log(X\max+1)\} \quad (29)$$

When the input data X and the output data Y are both of 8 bits, a2=Xmax=Ymax=255. For the approximation characteristic, a1=−0.79, a3=10. The solid line represents the approximation characteristic in accordance with the formula (1), and the broken line represents the theoretical value in accordance with the formula (29). This logarithmic calculation is often performed on color-separated data in scanners.

Embodiment 19

Figure 30:
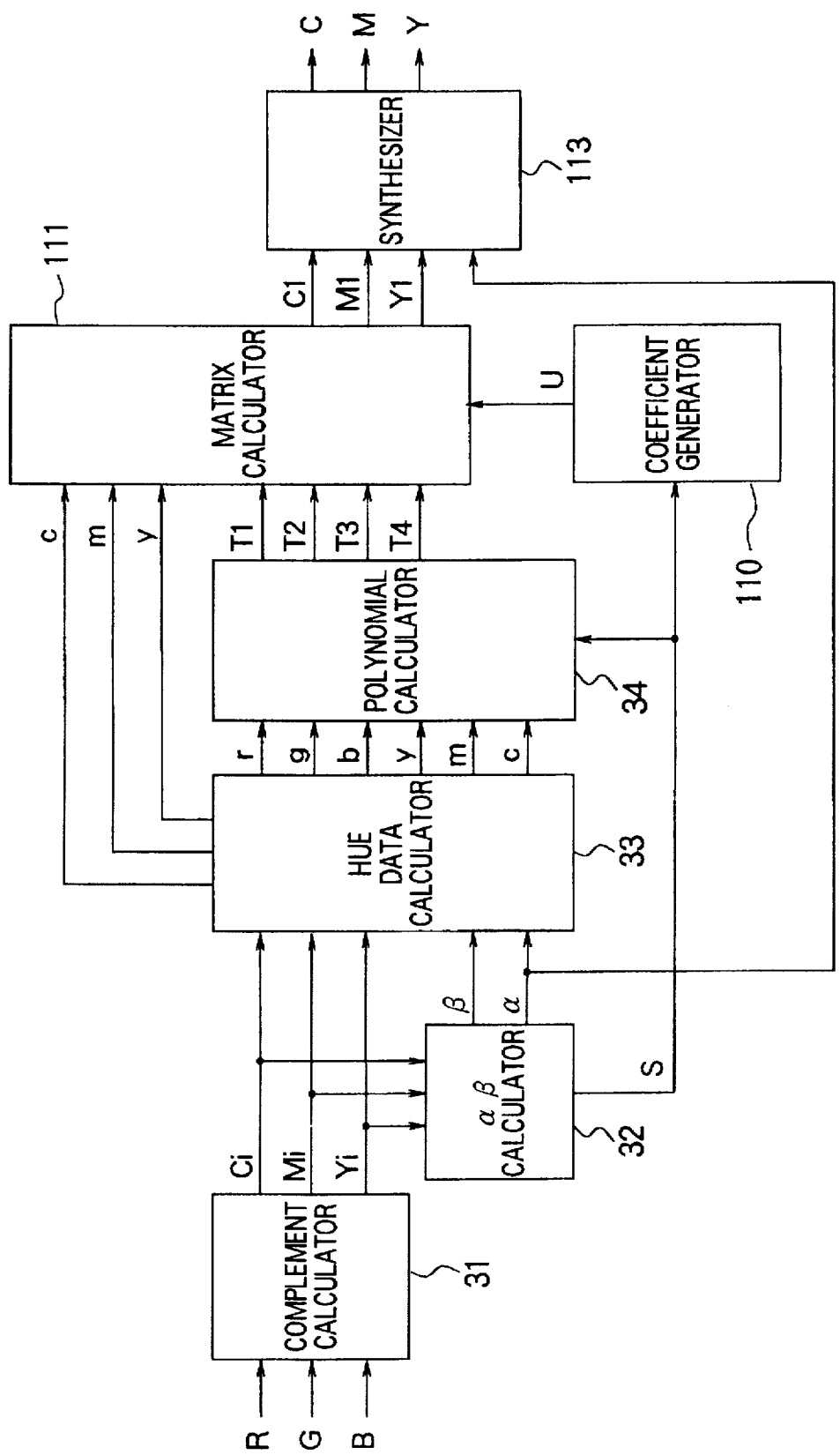
FIG. 30 is a block diagram showing the configuration of a color conversion device of Embodiment 19 of the invention.
Figure 63:
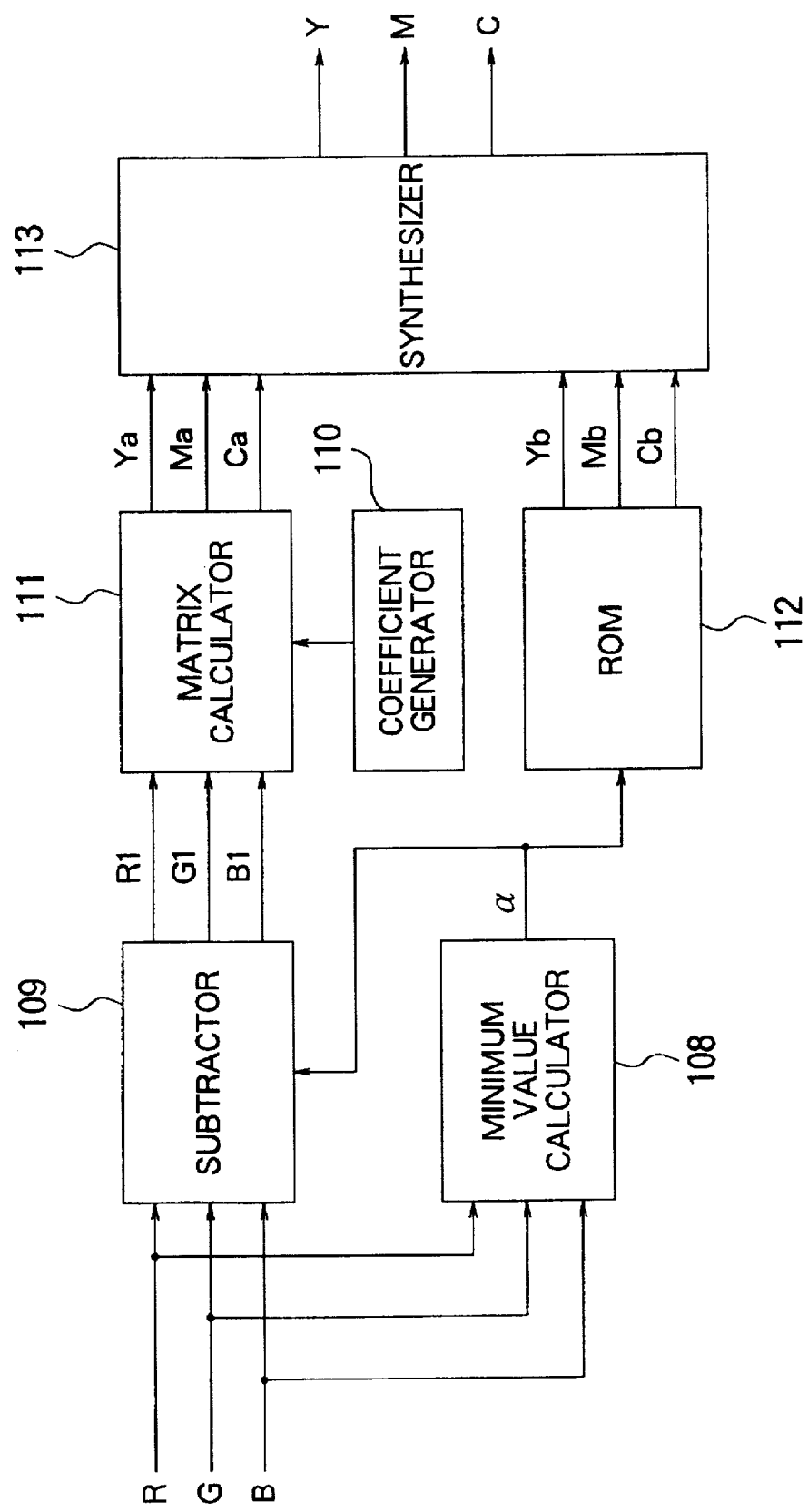
FIG. 63 is a diagram showing an example of conventional color conversion device.

FIG. 30 is a block diagram showing the configuration of a color conversion device of Embodiment 19. It can be used in place of the conventional color conversion device of FIG. 63, and identical reference numerals denote identical or corresponding circuits.

As illustrated, the color conversion device comprises a complement calculator 31, an αβ calculator 32, a hue data calculator 33, a polynomial calculator 34, a coefficient generator 110, a matrix calculator 111 and a synthesizer 113.

Figure 31:
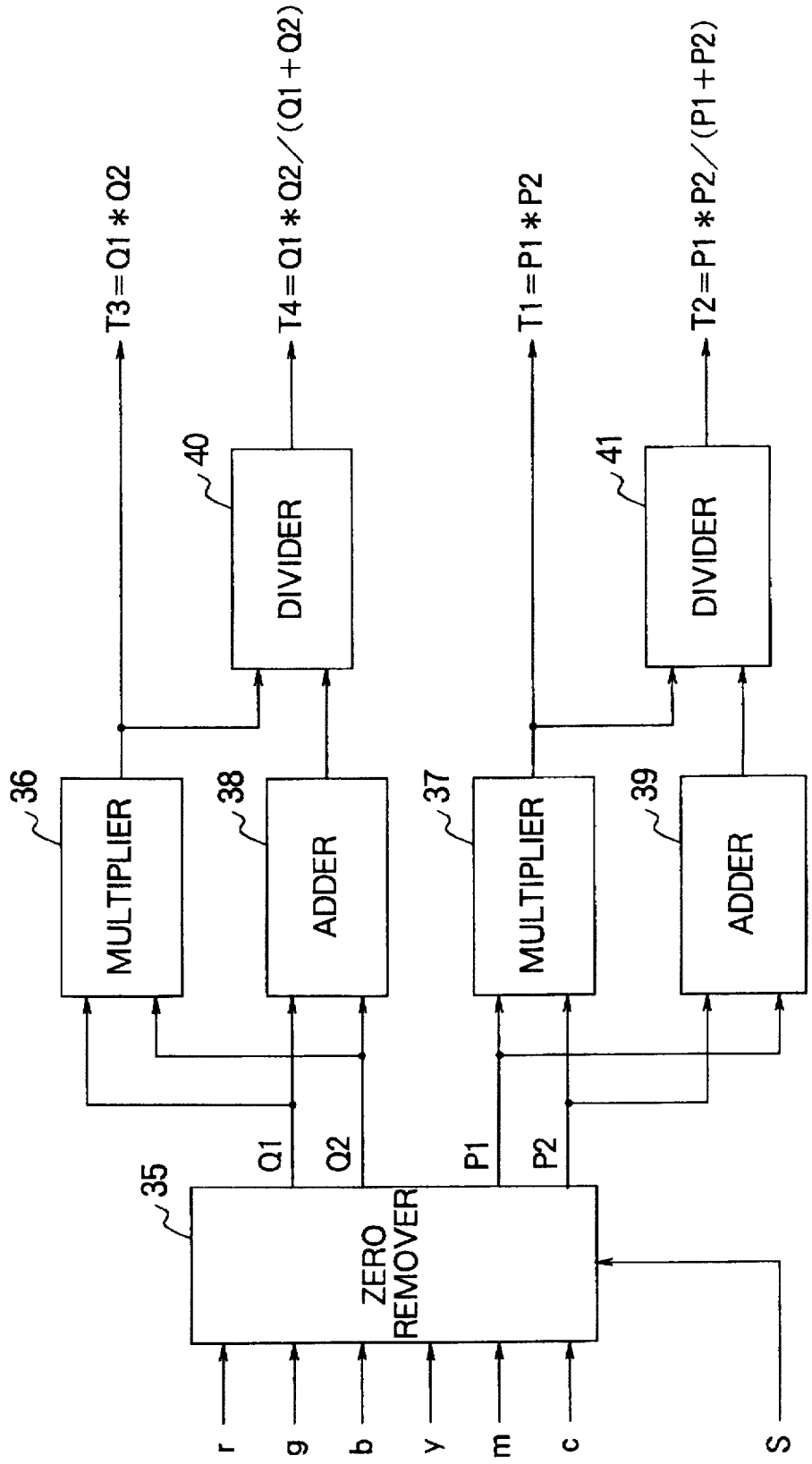
FIG. 31 is a block diagram showing an example of configuration of a polynomial calculator shown in FIG. 30.
Figure 33A:
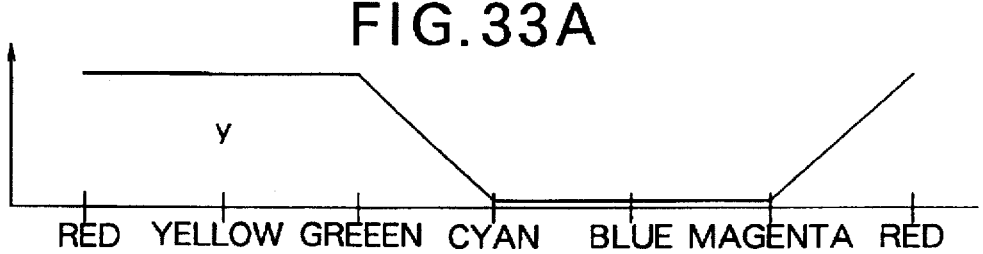
FIG. 33A to FIG. 33F are diagrams schematically illustrating the hue data used in the matrix calculation.
Figure 33B:
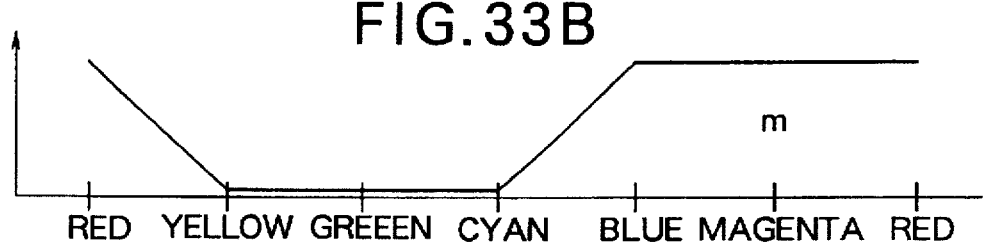
Figure 33C:
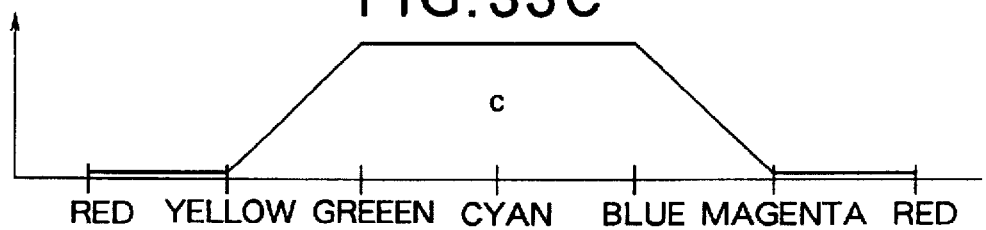
Figure 33D:
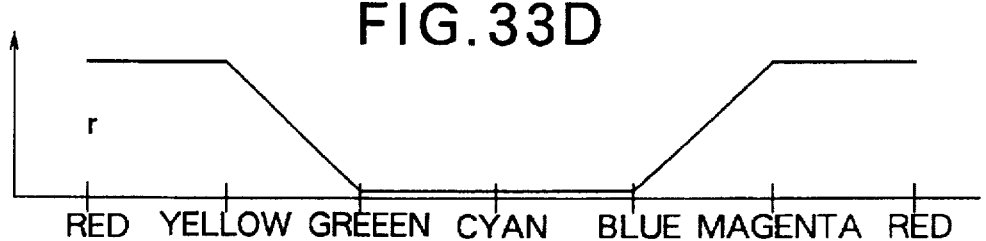
Figure 33E:
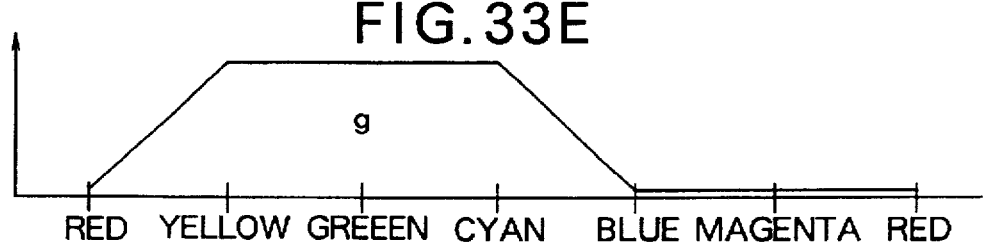
Figure 33F:
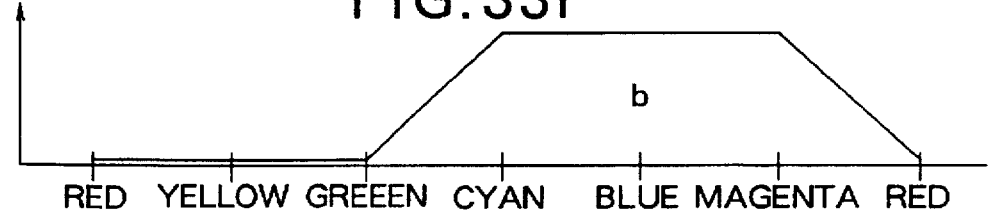
Figure 34A:
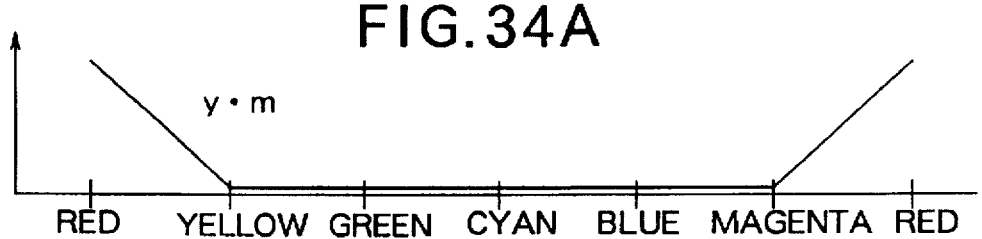
FIG. 34A to FIG. 34F are diagrams schematically illustrating the product terms used in the matrix calculation.
Figure 34B:
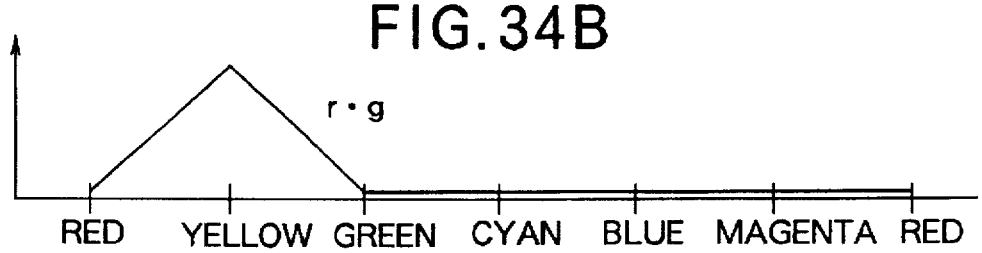
Figure 34C:
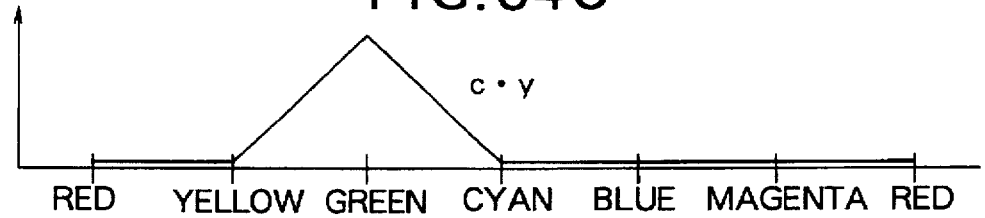
Figure 34D:
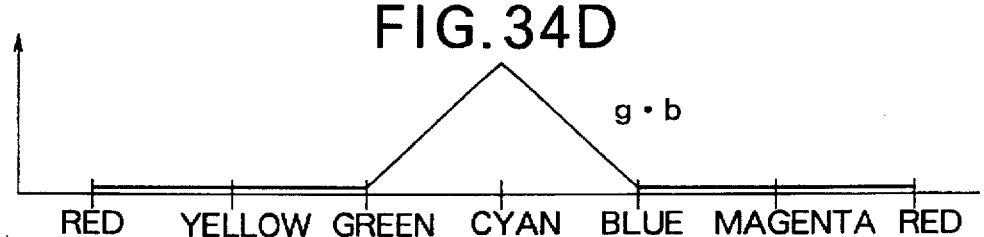
Figure 34E:
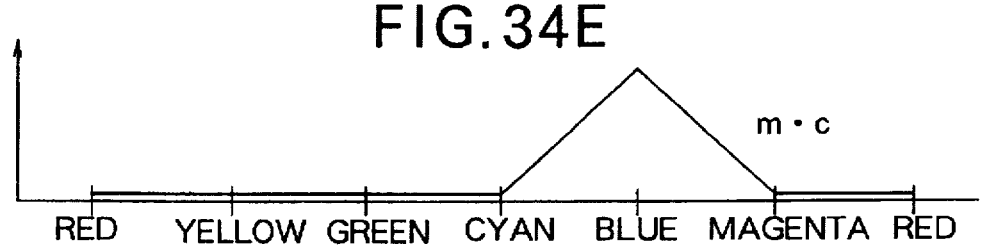
Figure 34F:
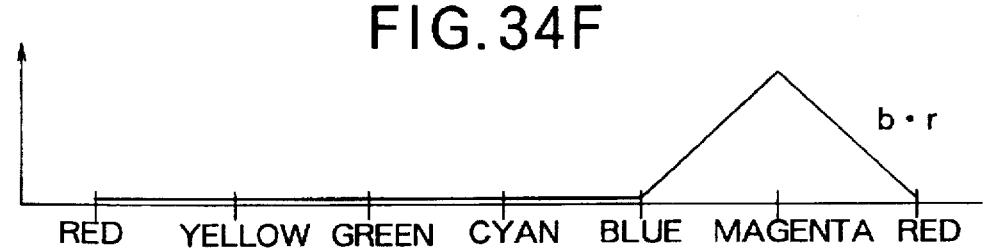

FIG. 31 is a block diagram showing an example of the polynomial calculator 34. It includes a zero remover 35, multipliers 36 and 37, adders 38 and 39, and dividers 40 and 41.

The complement calculator 31 receives the image data R, G and B, and determine 1's complements of the inputs, to produce the complementary color data Ci, Mi and Yi. The αβ calculator 32 outputs an identification code S for identifying the maximum value β and the minimum value α for each set of the data. That is, β=MAX (Ci, Mi, Yi), and α=MIN (Ci, Mi, Yi). Values a and b can be determined using comparators and selectors.

The hue data calculator 33 receives the complementary color data Ci, Mi, Yi, their maximum value β, and their minimum value α, and calculates and outputs the following differences:

$$r = \beta - Ci$$

$$g = \beta - Mi$$

$$b = \beta - Yi$$

$$y = Yi - \alpha$$

$$m = Mi - \alpha$$

$$c = Ci - \alpha$$

These differences are hue data, and at least two of them are zero.

The operation of the polynomial calculator 34 is now explained with reference to FIG. 31. The zero remover 35 receives the hue data r, g, b, y, m, c and the identification code S, and outputs two of the hue data r, g, b which are not zero, as Q1 and Q2, and two of the hue data y, m, c which are not zero, as P1 and P2. The multipliers 36 and 37 respectively calculate and output the products T3=Q1*Q2, and T1=P1*P2. The adders 38 and 39 respectively calculate and output the sums Q1+Q2, and P1+P2. The dividers 40 and 41 respectively calculate and output the quotients T4=T3/(Q1+Q2), and T2=T1/(P1+P2). The polynomial data T1, T2, T3 and T4 are the outputs of the polynomial calculator 34.

The coefficient generator 110 in FIG. 30 generates, on the basis of the information of the identification code S, matrix coefficients U(Fij) calculated with the polynomial data, and matrix coefficients U(Eij) comprising fixed coefficients. With regard to (Eij), i=1 to 3, j=1 to 3. With regard to (Fij), i=1 to 3, j=1 to 12. The matrix calculator 111 receives the hue data y, m, c, the polynomial data T1, T2, T3, T4, and coefficients U, and performs matrix calculation of the following formula, and outputs the results of the calculation as the color ink data C1, M1, Y1.

$$\begin{bmatrix} C1 \\ M1 \\ Y1 \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \end{bmatrix} \quad (30)$$

Here, with regard to (Eij), i=1 to 3, j=1 to 3. With regard to (Fij), i=1 to 3, j=1 to 12.

FIG. 32 is a block diagram showing an example of the matrix calculator. It can be formed of the calculator means which have been explained, or which have functions identical to those explained.

The matrix calculator operates in the following manner. The multipliers 36, 37, 42, 43 and 44 receive the hue data c, the polynomial data T1 to T4, and the coefficients (Eij) and (Fij), and calculate and output their products. The adders 38 and 39 receive their products, and calculate and output their sums. The adder 45 adds the outputs of the adders 38 and 39, and output the sum. The adder 46 receives the outputs of the multiplier 36 and the adder 45, and calculates and outputs their sum. The output of the adder 46 is the color ink data C1. If in the matrix calculator 111 shown in FIG. 32, the hue data c is replaced by hue data m or y, the matrix calculation for the color ink data M1 or Y1 is performed.

In the coefficient generator 110, coefficient values corresponding to the hue data c, m or y are used for the matrix coefficients U(Fij) used for calculation with the polynomial data, and the matrix coefficients U(Eij) of the fixed coefficients. That is, if three matrix calculators, each similar to the one shown in FIG. 32 are used, a high-speed matrix calculation can be achieved.

The synthesizer 113 adds the color ink data C1, M1, Y1, and achromatic data a, and outputs the printing data C, M, Y. The formula for obtaining the printing data C, M, Y is expressed by the formula (15) below:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \end{bmatrix} + \begin{bmatrix} \alpha \\ \alpha \\ \alpha \end{bmatrix} \quad (15)$$

Here, with regard to (Eij), i=i to 3, j=1 to 3. With regard to (Fij), i=1 to 3, j=1 to 12.

The terms of the formula (15) differ from the terms of the formula in the conventional matrix calculation, in that in the conventional method, the calculation method for each of the pixels, except the zero data, is used, while according to the formula (15), a general formula for the set of the pixels is used. With the formula (15), twelve data for each pixel are reduced to four effective data (the "effective data" is data other than "zero data" which is always zero). This reduction is achieved by utilizing the nature of the hue data.

The combination of the effective data varies from one pixel to another. For all the image data, all the polynomial data are effective. The number of multiplications for one pixel is smaller than if the formula (28) is used.

FIG. 33A to FIG. 33F are diagrams for illustrating the hue data used in the matrix formula, and respectively show the relationship for each of the six hues and the hue data y, m, c, r, g, b. Each of the hue data contributes to three hues, i.e. consists of components of three hues.

FIG. 34A to FIG. 34F are diagrams for illustrating the product terms used in the matrix formula. That is, FIG. 34A to FIG. 34F respectively show the relationship for the six hues and the product terms r*g, g*b, b*r, y*m, m*c, c*y. It will be seen that each of the product terms contributes to a single specific hue, i.e., consists of a component of a single hue.

For instance, assume that W is a constant. With respect to red, y=m=W, c=0, so that r=W, and g=b=0. Accordingly, y*m=W*W, and all other five terms are zero. That is, with respect to red, the term y*m alone is an effective second-order term. Similarly, only effective second-order terms for green, blue, cyan, magenta, and yellow, are c*y, m*c, g*b, b*r, and r*g.

Each of the above formulae (30) and (15) includes a single first-order fraction term effective for each of the hues. The fraction terms are as follows:

r*g/(r+g)

g*b/(g+b)

b*r/(b+r)

y*m/(y+m)

m*c/(m+c)

c*y/(c+y)

They have the nature of first-order terms. Assume that W is a constant. With respect to red, y=m=W, c=0, so that r=W, g=b=0. Then, m*y/(m+y)=W/2, and all other five terms are zero. Accordingly, with respect to red, m*y/(m+y) is the only effective first-order term. With respect to each of other hues, one fraction term only is effective. When at least one of the numerator and denominator is zero, the first-order term is zero.

Table 1 set forth below shows the relationship between the six hues and the effective calculation terms.

TABLE 1

| Hue | Effective Product Term | Effective Fraction Term |
|---|---|---|
| Red | m * y | m * y/(m + y) |
| Green | y * c | y * c/(y + c) |
| Blue | c * m | c * m/(c + m) |
| Cyan | g * b | g * b/(g + b) |
| Magenta | b * r | b * r/(b + r) |
| Yellow | r * g | r * g/(r + g) |

More specific description will now be described in connection with an actual example of application of the color conversion device of Embodiment 19.

Figure 35A:
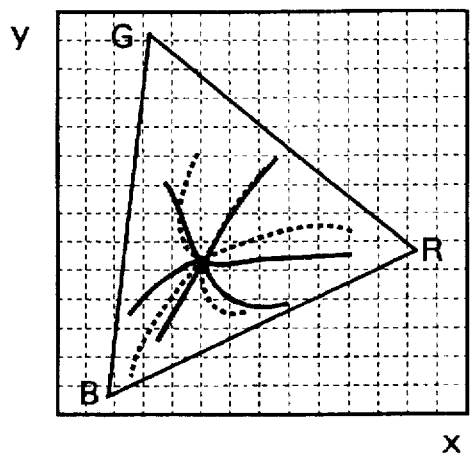
FIG. 35A to FIG. 35C are diagrams showing an x-y chromaticity diagram for explaining examples of characteristics obtained when the color conversion device of FIG. 30 is applied to sublimation dye ink.
Figure 35B:
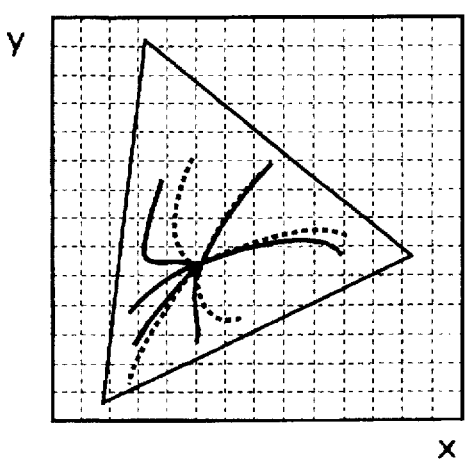
Figure 35C:
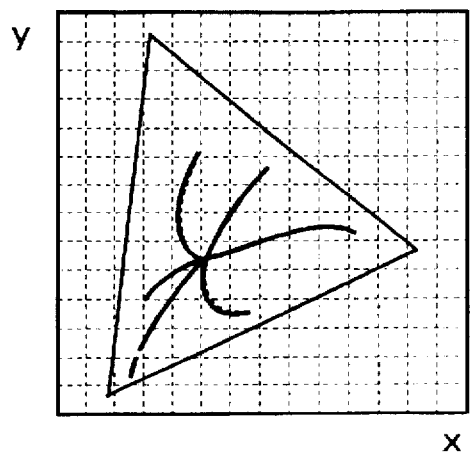

FIG. 35A to FIG. 35C are an x-y chromaticity diagram for explaining the characteristics color conversion device having been adapted to sublimation dye ink. As an example, the effects obtained when the color conversion device of Embodiment 19 is adopted for calculation of the ink data of sublimation dye used for color video printer are shown by the x-y chromaticity diagram. In the figures, broken lines represent the target characteristics, while the solid lines represent the results of the measurement on the print samples.

FIG. 35A is an x-y chromaticity diagram obtained when the matrix coefficients (Eij) are set as given by the following formula (31), and the matrix coefficients (Fij) are all set to zero. Such a condition corresponds to a situation where color conversion is not effected.

$$(Eij) = \begin{bmatrix} 1 & 0 & 0 \\ 0 & 1 & 0 \\ 0 & 0 & 1 \end{bmatrix} \quad (31)$$

FIG. 35B is an x-y chromaticity diagram obtained when the matrix coefficients (Fij) are set as given by the following table.

TABLE 2

| j | i | | |
|---|---|---|---|
| | 1 | 2 | 3 |
| 1 | 0 | 0 | 0 |
| 2 | 0 | 0 | 0 |
| 3 | 0 | 0 | 0 |

TABLE 2-continued

| j | i | | |
|---|---|---|---|
|  | 1 | 2 | 3 |
| 4 | 0 | 0 | 0 |
| 5 | 0 | 0 | 0 |
| 6 | 0 | 0 | 0 |
| 7 | 0 | 0.32 | 0.1 |
| 8 | 0.3 | 0 | 1.24 |
| 9 | 0.3 | 0 | 0 |
| 10 | −0.5 | 0 | 0 |
| 11 | 0 | 0 | 0 |
| 12 | 0 | 0 | −0.1 |

Since all the coefficients for the product terms are set to zero, the compensation is effected only by the fraction terms. The fraction terms have the function of rotating the hue on the chromaticity diagram, and compensates the low-saturation part (central part). In FIG. 35B, the error (the difference between the solid line (results of the measurement) and the broken line (target characteristic) is small in the low-saturation part, and is increased at the middle saturation and high-saturation parts.

The x-y chromaticity diagram of FIG. 35C is obtained when the matrix coefficients (Fij) are set as given by the following Table 3. That is, all the product terms and fraction terms are used for compensation.

TABLE 3

| j | i | | |
|---|---|---|---|
|  | 1 | 2 | 3 |
| 1 | 0 | 0.0003 | 0 |
| 2 | −0.0006 | 0 | −0.0035 |
| 3 | 0 | −0.0012 | 0 |
| 4 | 0 | 0 | 0 |
| 5 | 0 | −0.0015 | −0.0015 |
| 6 | 0 | 0 | −0.0008 |
| 7 | 0 | −0.32 | 0.1 |
| 8 | 0.3 | 0 | 1.24 |
| 9 | 0.3 | 0 | 0 |
| 10 | −0.5 | 0 | 0 |
| 11 | 0 | 0.3 | 2 |
| 12 | 0 | 0 | −0.1 |

The product terms have the function of compensating the distortion of the characteristic on the x-y chromaticity diagram, to thereby compensate the errors at the middle- and high-saturation parts. In FIG. 35C, the errors are minimized for all the six hues. Thus, the formulae (30) and (15) can compensate the hues independently. Since the formulae (30) and (15) include second-order terms, the non-linearity of the printing can also be compensated.

Embodiment 20

Figure 36:
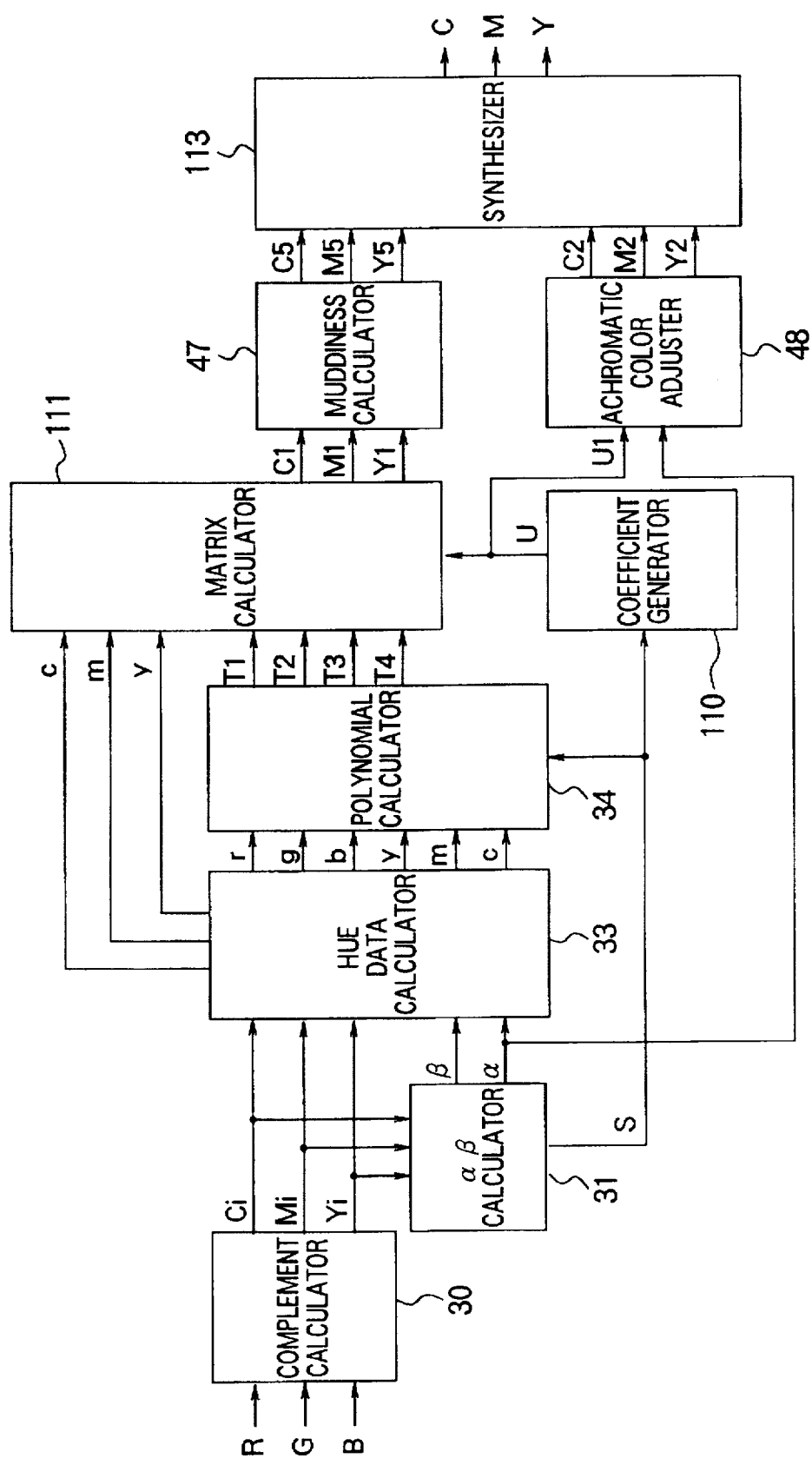
FIG. 36 is a block diagram showing the configuration of a color conversion device of Embodiment 20 of the invention.

FIG. 36 is a block diagram showing the configuration of a color conversion device of Embodiment 20. It is similar to the color conversion device of Embodiment 19 shown in FIG. 30, but is additionally provided with a muddiness calculator 47 for removing the muddiness components (achromatic component contained in the color ink data), and an achromatic color adjuster 48 for performing fine adjustment of the ink data of the achromatic component.

Figure 37:
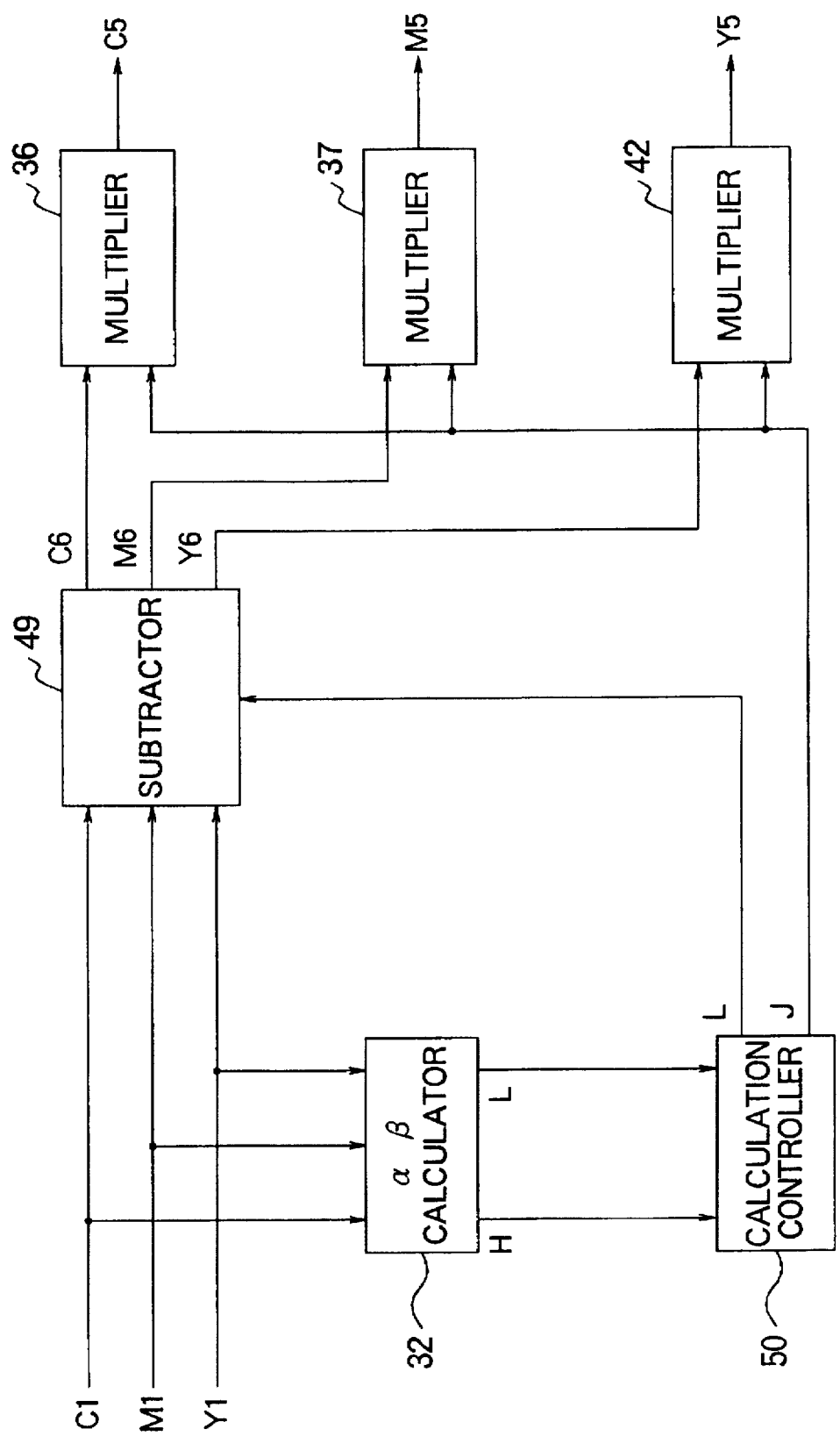
FIG. 37 is a block diagram showing an example of configuration of a muddiness calculator shown in FIG. 36.

FIG. 37 is a block diagram showing an example of the muddiness calculator 47 in FIG. 36. The muddiness calculator includes an α, β calculator 132, subtractor 49, multiplier, 136–142, and a calculation controller 50.

The color conversion device of Embodiment 20 operates as follows. The color ink data C1, M1, Y1 obtained by the calculation of the formula (30) are input to the a αβ calculator 132 of the muddiness calculator 47 in FIG. 37. The maximum value H and the minimum value L of the color ink data C1, M1, Y1 are extracted. The calculation controller 50 receives the maximum and minimum values, and when the minimum value L is positive (L>0), the value of L is unchanged, and a multiplication coefficient J=H/(H−L) is calculated and output. When L is zero or negative (L≦0), L is set to 0, J is set to 1, and these values of L and J are output.

The subtractor 49 receives the color ink data C1, M1, Y1, and the minimum value L with the above condition, and calculates and outputs the differences C6=C1−L, M6=M1−L, Y6=Y1−L. The multipliers 136, 137 and 142 receive the differences C6, M6, Y6, and the multiplication coefficient J, and calculate and output their products, as muddiness-removed data C5, M5, Y5.

The general formula for the muddiness calculation is as follows:

$$\left.\begin{array}{l}\text{When } L > 0 \\ C5 = (C1-L)*H/(H-L) \\ M5 = (M1-L)*H/(H-L) \\ Y5 = (Y1-L)*H/(H-L) \\ \text{When } L \leq 0 \\ C5 = C1 \\ M5 = M1 \\ Y5 = Y1 \end{array}\right\} \quad (32)$$

If discontinuity between pixels is permitted, it is possible to set the multiplication coefficient J to 1 (without regard to the value of L). In this case, the differences C6, M6, Y6 output from the subtractor 49 are output as the muddiness-removed data C5, M5, Y5. As a result, the three multipliers 136, 137 and 142 may be eliminated, and yet the unnecessary muddiness components can be removed.

The function for fine adjustment of the ink data of the achromatic components will now be described. The achromatic color adjuster 48 uses the minimum value α which is the achromatic data, and constants U1 (d1, d2, d3, d4, d5, d6), and performs the calculation of the following formula (33)

$$\left.\begin{array}{l}C2 = (d1 + d4*\alpha)*\alpha \\ M2 = (d2 + d5*\alpha)*\alpha \\ Y2 = (d3 + d6*\alpha)*\alpha \end{array}\right\} \quad (33)$$

The results of the calculation are output as the achromatic ink data C2, M2, Y2 to the synthesizer 113.

Figure 38:
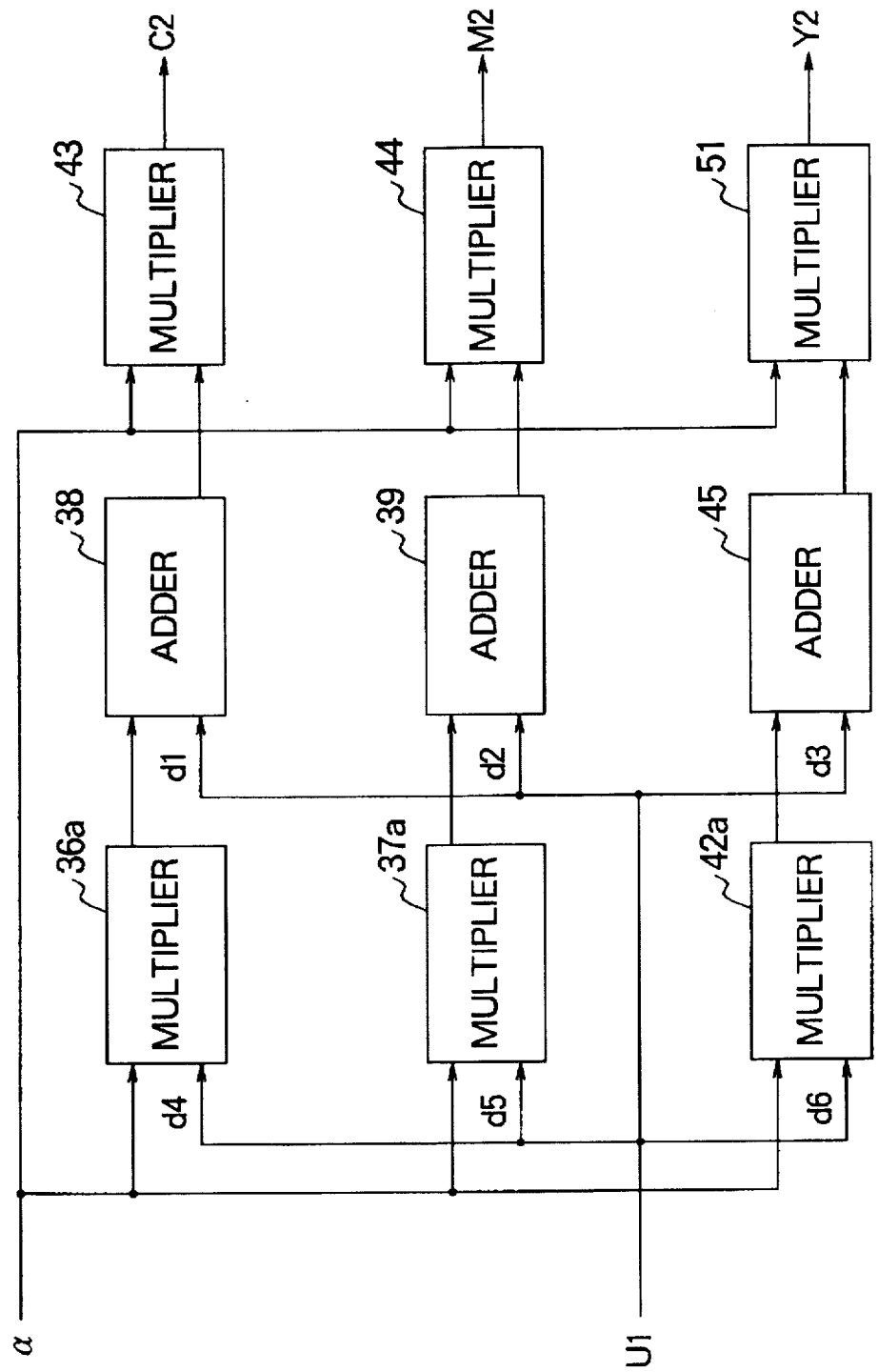
FIG. 38 is a block diagram showing an example of configuration of an achromatic color calculator shown in FIG. 36.

FIG. 38 is a block diagram showing an example of the achromatic color adjuster 48 in FIG. 36. The constants U1 input to the achromatic color adjuster 48 for the purpose of performing the calculation of the formula (33) are generated by the coefficient generator 110. The multipliers 152, 154, and 15b calculate and output the products d4*α, d5*α, and d6*α, respectively. The adders 38, 39, and 45 calculate and output the sums d4*α+d1, d5*α+d2, and d6*aα+d3, respectively. The multipliers 164, 166 and 168 perform the calculation of the formula (33), and output the results of the calculation. In this way, the second-order fine adjustment is achieved. When d4=d5=d6=0, the achromatic ink data C2, M2, Y2 are all of a first-order function, and the configuration of the achromatic color adjuster 48 can be simplified.

By this fine adjustment, the standard black, reddish black, bluish black, or the like can be selected for the printing. By varying the constants a little, a printing image which suits the preference of the user can be output.

In the color conversion device of Embodiment 20 shown in FIG. 36, the sums C=C5+C2, M=M5+M2, Y=Y5+Y2 are output from the synthesizer 170 as the printing data C, M, Y. The muddiness removing function and the fine adjustment function are independent of each other. When the function of the former alone is to be utilized, the printing data C, M, Y are given by C=C5+α, M=M5+α, Y=Y5+α. When the function of the fine adjustment alone is utilized, c=C1+c2, M=M1+M2, Y=Y1+Y2.

Embodiment 21

Figure 39:
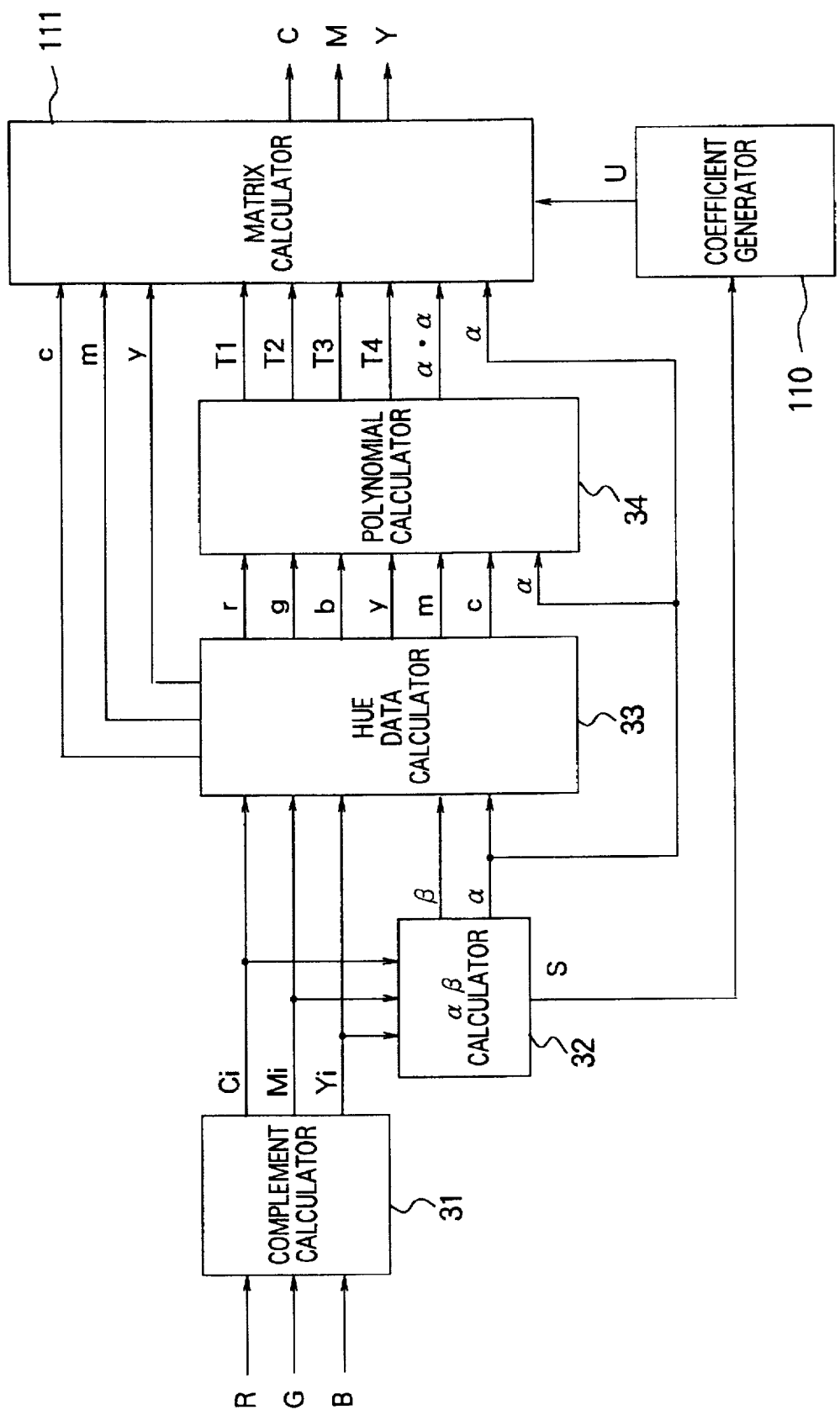
FIG. 39 is a block diagram showing the configuration of a color conversion device of Embodiment 21 of the invention.

FIG. 39 is a block diagram showing the configuration of a color conversion device of Embodiment 21. It is similar to the color conversion device of FIG. 30, but the synthesizer 113 is removed, and the functions of the polynomial calculator 172 and the matrix calculator 174 are expanded as compared to polynomial calculator 34 and matrix calculator 174. This will be later explained in detail.

This color conversion device is for implementing the functional calculation of the following formula (18).

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(c+m) \\ m^*y/(m+y) \\ y^*c/(y+c) \\ r^*g/(r+g) \\ g^*b/(g+b) \\ b^*r/(b+r) \\ \alpha \\ \alpha^*\alpha \end{bmatrix} \quad (18)$$

Here, with regard to (Eij), i=1 to 3, j=1 to 3. With regard to (Fij), i=1 to 3, j=1 to 12.

The formula (18) is to combine the functions of the formula (30) of the color conversion device of Embodiment 19 shown in FIG. 30 and the formula (33) of Embodiment 20 shown in FIG. 36.

To implement the calculation, one multiplier is added to the polynomial calculator 34 of Embodiment 19 shown in FIG. 31 to calculate and output a product α*αin polynomial calculator 172, and two multipliers and two adders are added to the matrix calculator 111 of Embodiment 19 shown in FIG. 32 to calculate a linear term d1*α, to calculate square term d4*α*α, and to add all the data in matrix calculator 174.

By the formula (18), the sum of compensated (retouched) color ink data and fine-adjusted achromatic ink data can be output. Incidentally, it is not possible to incorporate the muddiness removing function in the color conversion device of Embodiment 21. When the muddiness removing function is desired, the color conversion device of FIG. 20 shown in FIG. 36 should be used.

Color conversion for obtaining 3-ink printing data from image data has been described. Conversion into 4-ink printing data including black (hereinafter denoted by "K"), in addition to cyan, magenta and yellow, will now be described.

Embodiment 22

Figure 40:
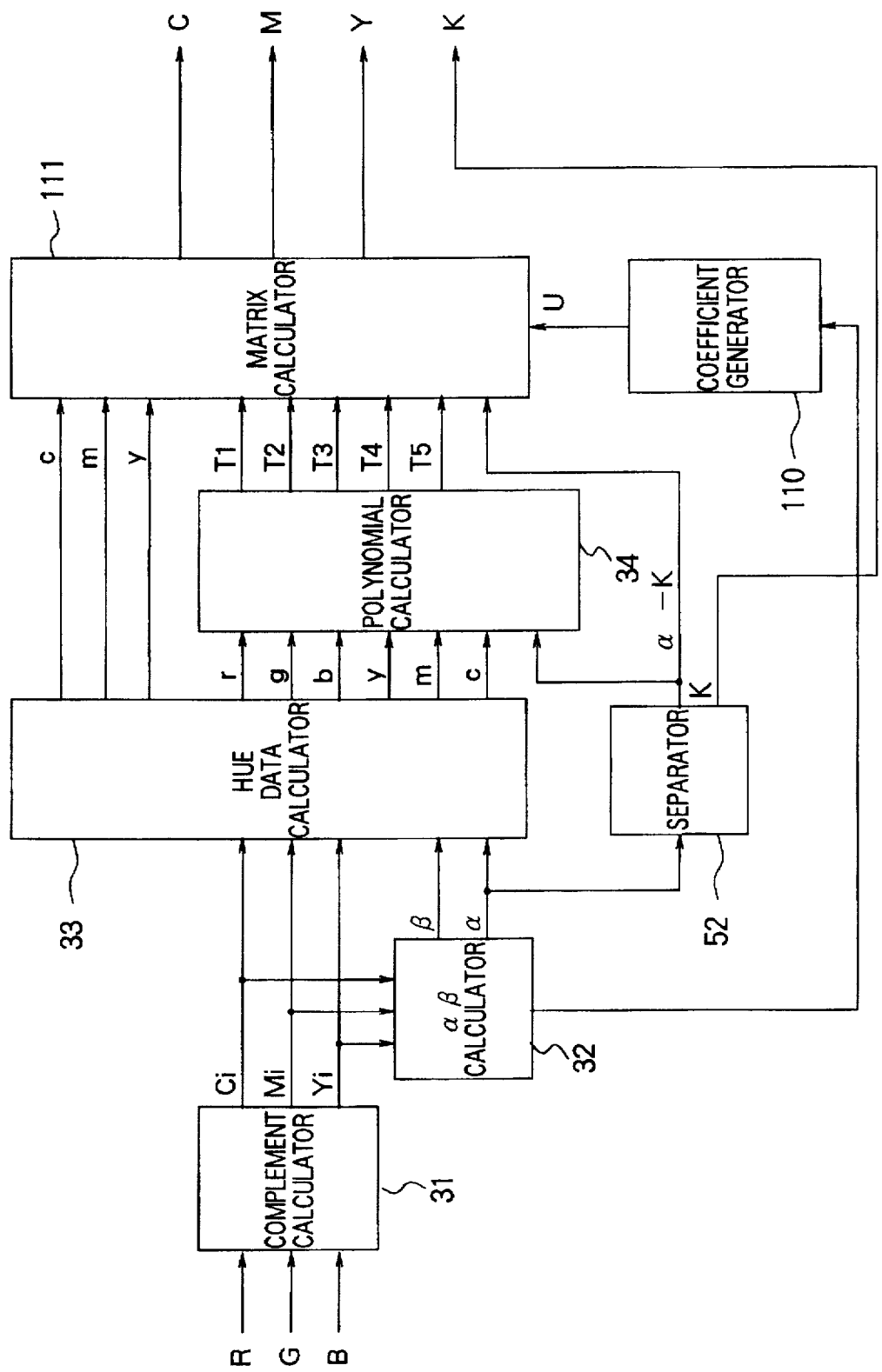
FIG. 40 is a block diagram showing the configuration of a color conversion device of Embodiment 22 of the invention.

FIG. 40 is a block diagram showing the configuration of a color conversion device of Embodiment 22. It includes a separator 52, in addition to the circuits which are denoted by reference numerals used to denote identical or corresponding circuits in FIG. 30.

The features of this color conversion device are as follows: The a αβ calculator 32 determines the minimum value α of the complementary data Ci, Mi, Yi generated from the image data R, G, B, in the same way as in the three-color conversion. The separator 52 divides the minimum value α into black printing data K, and remainder data (α–K). The printing data K is directly output and is used for printing with black ink. The remainder data (α–K) is equivalent to the achromatic data, and is used for black printing formed by synthesizing the inks of three colors Y, M, C, and is input to the polynomial calculator 176 and the matrix calculator 178. The polynomial calculator 176 calculates and outputs the product T5=(α–K)*(α–K). The matrix calculator 178 uses T5 and (α–K), and determines the printing data C, M, Y in accordance with the following formula (24). The data C, M, Y as well as the data K are output as the printing data.

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(c+m) \\ m^*y/(m+y) \\ y^*c/(y+c) \\ r^*g/(r+g) \\ g^*b/(g+b) \\ b^*r/(b+r) \\ (\alpha - K) \\ (\alpha - K)^*(\alpha - K) \end{bmatrix} \quad (24)$$

Here, with regard to (Eij), i=1 to 3, j=1 to 3. With regard to (Fij), i=1 to 3, j=1 to 14.

It is possible to use a configuration obtained by modifying the color conversion device of Embodiment 19 shown in FIG. 30. In such a modification, the following formula (21) is used.

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(c+m) \\ m^*y/(m+y) \\ y^*c/(y+c) \\ r^*g/(r+g) \\ g^*b/(g+b) \\ b^*r/(b+r) \end{bmatrix} + \begin{bmatrix} \alpha - K \\ \alpha - K \\ \alpha - K \end{bmatrix} \quad (21)$$

Here, with regard to (Eij), i=1 to 3, j=1 to 3. With regard to (Fij), i=1 to 3, j=1 to 12.

Next, a method for separating or dividing the minimum value α using a functional calculation will be described.

A general formula for dividing a second-order function using the minimum value α, printing data K, and constants n, p can be expressed as follows:

$$K = \alpha - n^*\alpha^*(p - \alpha)$$

The constant n determines the maximum deviation from the linear division, and p is equal to the maximum value of the input data. That is, the amount of deviation given by the second term in the right side is zero when α=0, and when α=p.

A general formula for dividing a third-order function using the minimum value α, the ink data K, and constants n, p, q can be expressed as follows:

$$K = \alpha - n*\alpha*(p-\alpha)*(\alpha+p)$$

Figure 41:
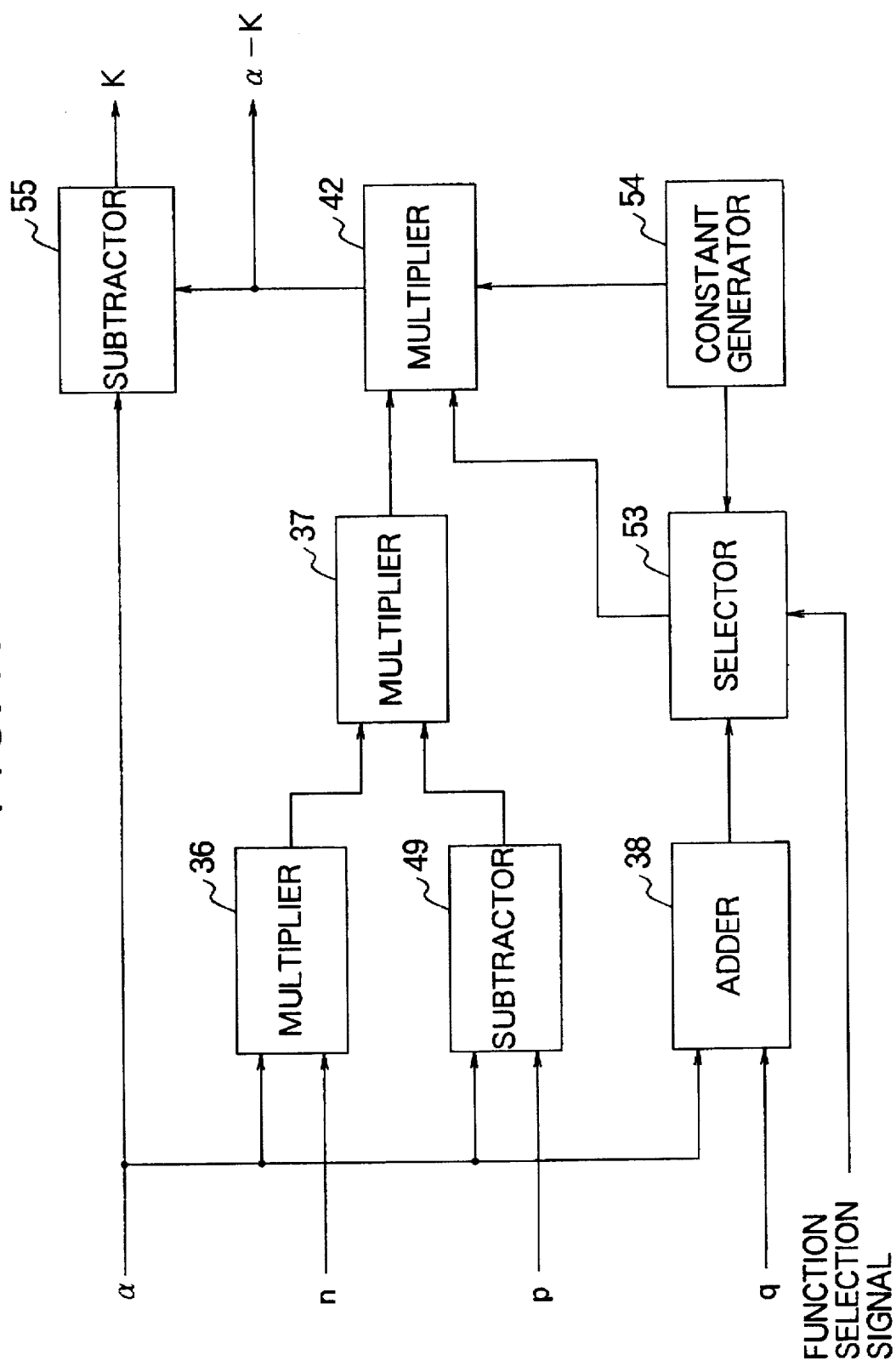
FIG. 41 is a block diagram showing an example of configuration of a separator in FIG. 40.

FIG. 41 is a block diagram showing the configuration of an example of the separator 52 in FIG. 40. It comprises multipliers 180, 182, 186, an adder 184, subtractors 188, 200, a selector 190, and a constant generator 192.

The separator 52 operates in the following manner.

The multiplier 180 calculates and outputs the product n*α. The subtractor 188 calculates and outputs the difference (p−α). The adder 184 calculates and outputs the sum (α+q). The multiplier 182 calculates and outputs the product n*α*(p−α). The selector 190 receives the sum α+q, and the value output by the constant generator 54 (=1), and selectively outputs one of them according to a function selection signal.

When the data output from the selector 190 is the sum α+q, the output of the multiplier 186 will be the product n*α*(p−α)*(a+q). When he output of the selector 190 is a value "1", the output of the multiplier 42 will be (α−K). The output of the subtractor 200 will then be K. The printing data K and the remainder data (α−K) are obtained in this way.

Figure 42A:
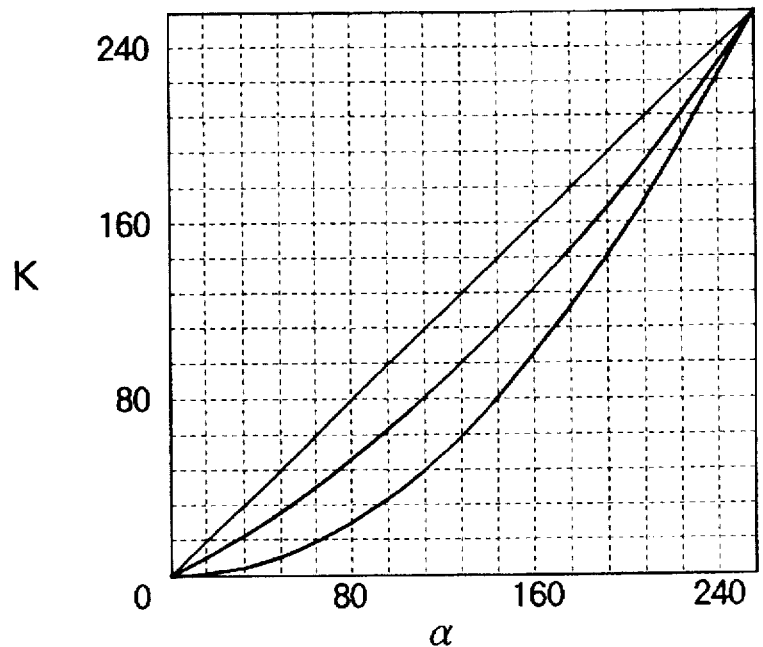
FIG. 42A and FIG. 42B are diagrams showing examples of characteristics obtained when the color conversion device of FIG. 40 is used for separating the achromatic data by means of a functional formula.
Figure 42B:
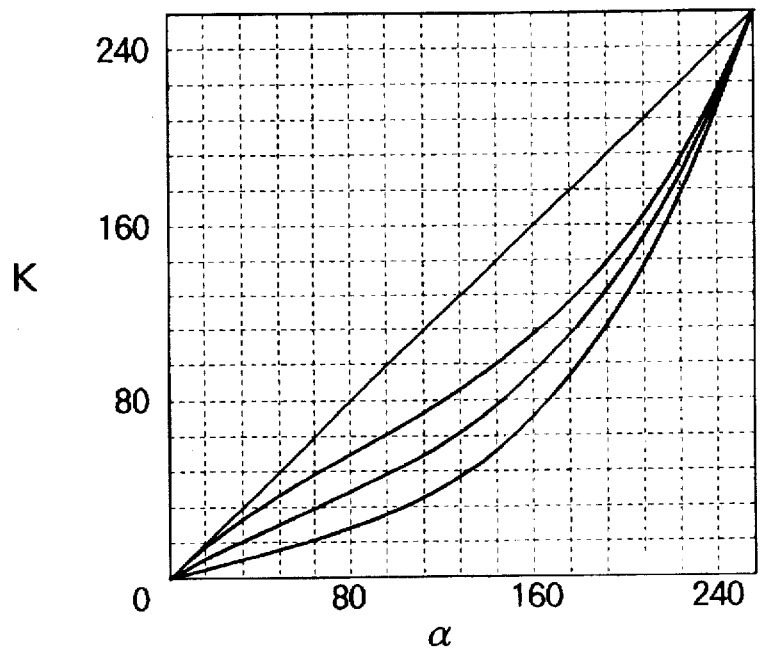

FIG. 42A and FIG. 42B are diagrams showing the characteristics of the results of the division, by means of the functional formula, of the achromatic data used in the color conversion device of FIG. 40. The function selection signal input from the outside to the selector 190 is used for selection of a second-order function or a third-order function. In the case of FIG. 42A, the second-order function is monotonous, while in the case of FIG. 42B, the third-order function can realize complicated division characteristics.

The separator 52 can also be realized by storing, in a memory, printing data K obtained by functional calculation by means of a computer or the like, obtaining K by conversion from the minimum value α using of a conversion table, and outputting the difference between the minimum value and K. According to this configuration, the size of the hardware can be reduced. For instance, it can be formed of about 500 gates, whereas the separator of FIG. 41 is formed of about 2000 gates. That is, when the number of types of division characteristics is less than 3, use of the conversion table is advantageous. Also, complicated division characteristics which cannot be realized by the second-order or third-order function can be realized by the use of a conversion table.

Embodiment 23

Figure 43:
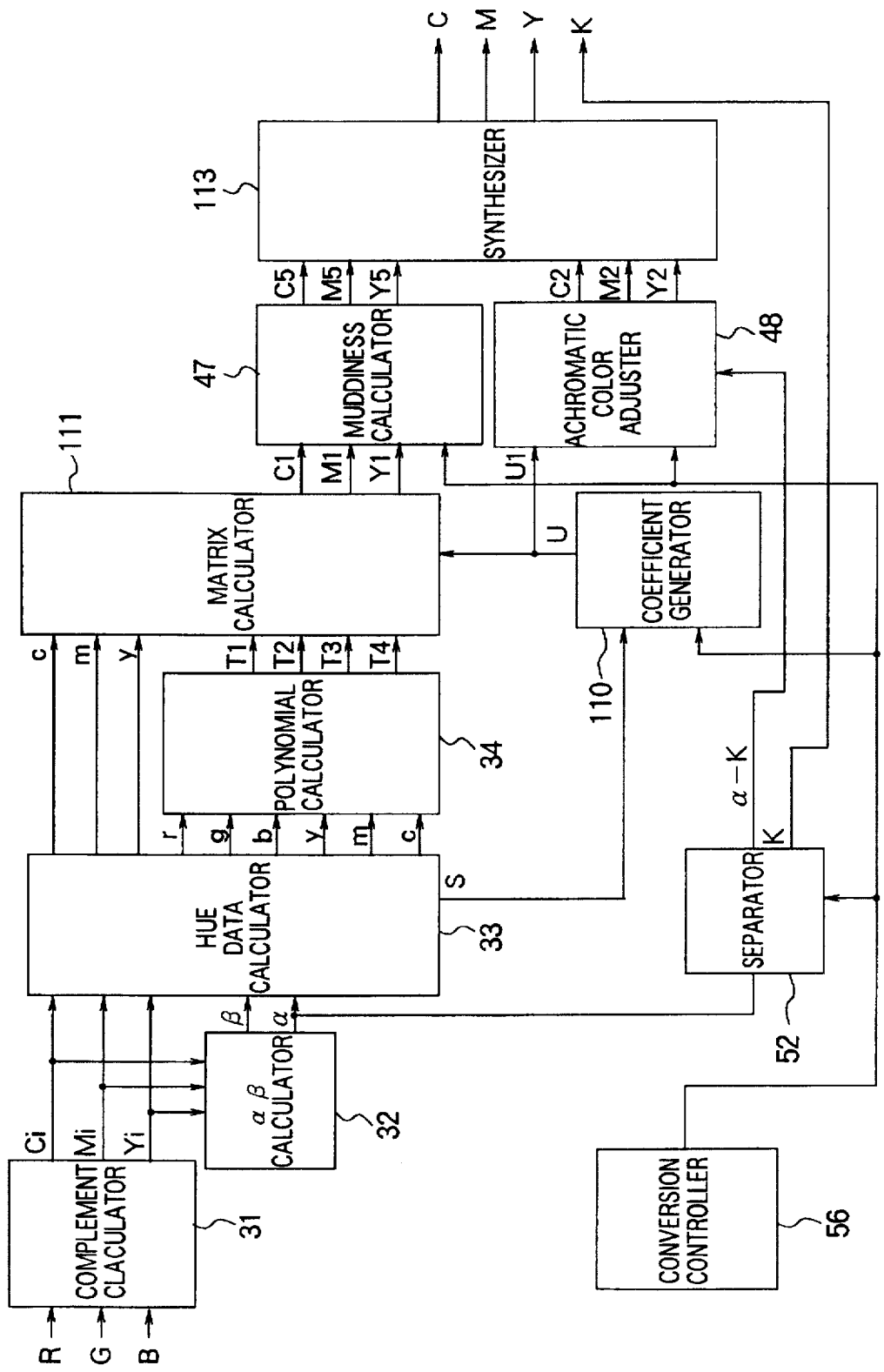
FIG. 43 is a block diagram showing the configuration of a color conversion device of Embodiment 23 of the invention.

FIG. 43 is a block diagram showing the configuration of a color conversion device of Embodiment 23. It is similar to the color conversion device of FIG. 36, but is additionally provided with a conversion controller 56, and a separator 52a. Additionally, the separator 52a, the coefficient generator 110a, the muddiness calculator 47a and achromatic color adjuster 48a differ from the separator 52, the coefficient generator 110, the muddiness calculator 47 and the achromatic color adjuster, respectively, in that conversion controller 56 controls their operating state as described below. The conversion controller 56 is coupled to the separator 52a, the coefficient generator 110a, the muddiness calculator 47a, and the achromatic color adjuster 48a, for providing required data to the respective circuits.

The color conversion device of this embodiment is provided with a function of freely selecting a processing mode of the color conversion. The selection of the processing mode can be made with regard to the following aspects (A) to (F):

(A) Choice between a three-color conversion and four-color conversion;

(B) Choice between use or non-use of muddiness removal function;

(C) Choice between use or non-use of achromatic component fine adjustment function;

(D) Choice of the type of fine adjustment used;

(E) Choice of the division function, and setting of corresponding constants; and (F) Selection of an ink set and the setting of the matrix coefficients.

The choices with regard to the aspects (A) to (F) can be made in the following manner.

(A) When the black printing data K, which is output from the separator 52a is treated as being zero, a three-color conversion is effected. Otherwise, a four-color conversion is effected.

(B) When the outputs L and J of the calculation controller 50 using the muddiness calculator (FIG. 37) of Embodiment 20 are set such that L=0, J=1, the muddiness removal function is not used.

(C) When the coefficients output from the coefficient generator 110a are set such that d1 to d3=1, d4 to d6=0, the function of the fine adjustment is not used.

(D) This can be achieved by selectively setting the coefficients output from the coefficient generator 110a to the coefficients for the standard black, the coefficients for the reddish black, or the coefficients of the bluish black.

(E) One of the functions can be selected by the function selection signal supplied to the separator 52a. It is also possible to realize the selection by writing, in advance, the table conversion data of a desired characteristic in a memory. The choice with regard to (A) can also be enabled in this manner.

(F) The selection from a plurality of inks can be achieved by identifying, by means of an ink identifier in the conversion controller 56, the set of ink used, and causes the coefficient generator to set the coefficients (Eij), (Fij) corresponding to the ink set having been identified.

The identification of ink can be made by optically or magnetically reading the identification code provided on the ink ribbon cartridge, or by manually inputting the identification information using a man-machine interface (such as keys).

In this way, by adding the conversion controller 56, a variety of characteristic or a desired characteristic can be realized, and the flexibility in color conversion can be substantially improved. The conversion controller 56 may be formed of a general-purpose 8-bit CPU, and the increase in cost is not substantial.

Embodiment 24

Figure 44:
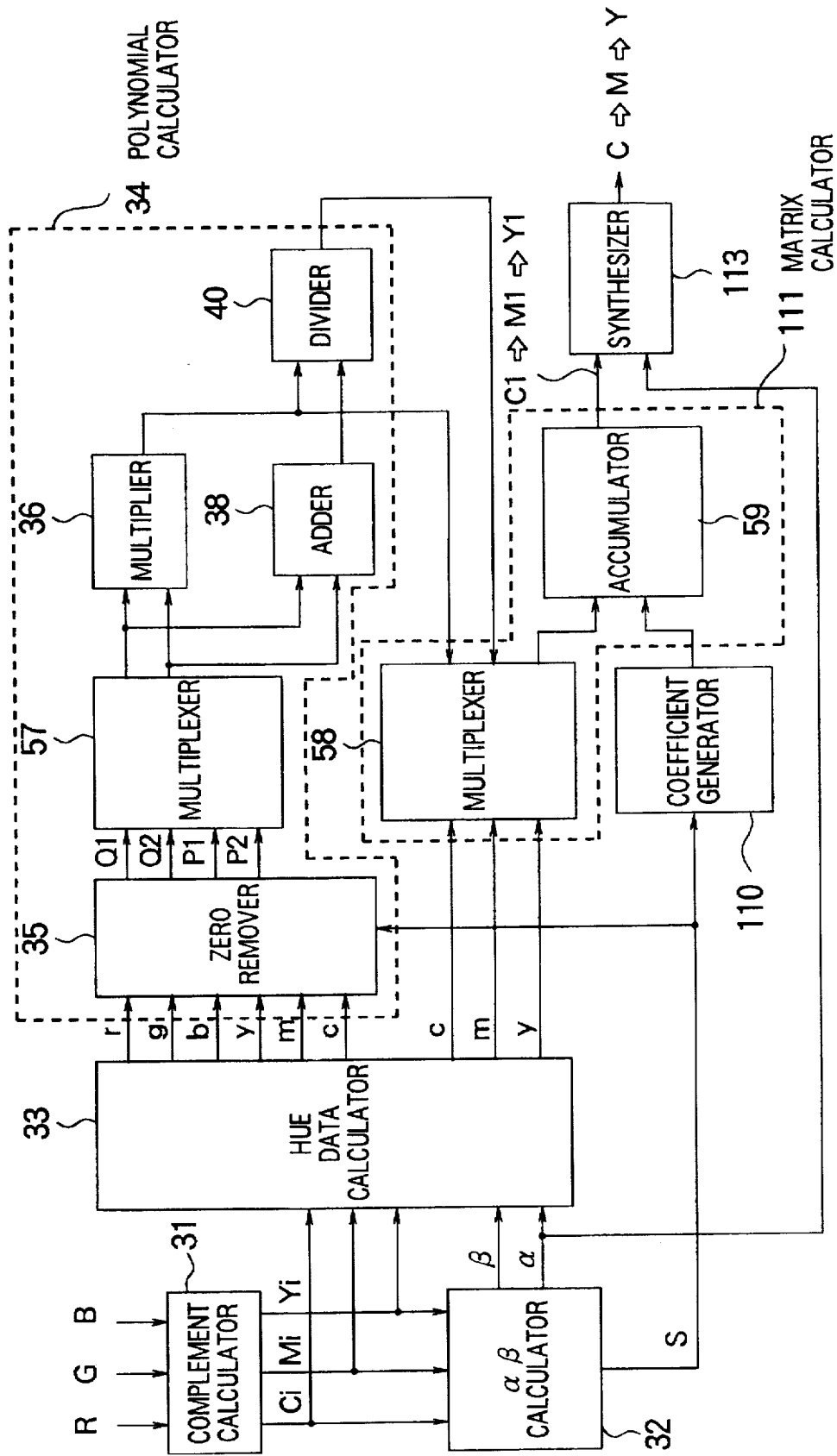
FIG. 44 is a block diagram showing the configuration of a color conversion device of Embodiment 24 of the invention.

FIG. 44 is a block diagram showing the configuration of a color conversion device of Embodiment 24. It is similar to the color conversion device of Embodiment 19 shown in FIG. 30, but the sizes of the polynomial calculator 212 and the matrix calculator 208 compared to polynomial calculator 34 and matrix calculator 111 have been reduced. The circuits identical or corresponding to those in FIG. 30 and FIG. 31 are denoted by identical reference numeral. The device of FIG. 44 is additionally provided with a first multiplexer 57, a second multiplexer 58, and an accumulator 59. In FIG. 44, the zero remover 35, the multiplier 202, the adder 204, the divider 206 and the first multiplexer 57 in combination form a polynomial calculator 212, and the second multiplier 58 and the accumulator 59 in combination form a matrix calculator 208.

The input image data are divided into six hue data, a achromatic data, and an identification code S, as in FIG. 30. The zero remover 35 outputs effective data Q1, Q2, P1, P2. The first multiplexer 57 time-division multiplexes P1 and P2, or Q1 and Q2. The multiplier 202 calculates and outputs P1*P2, or Q1*Q2. The adder 204 calculates and outputs P1+P2, or Q1+Q2. The divider 206 calculates and outputs P1*P2/(P1+P2), or Q1*Q2/(Q1+Q2). The second multiplexer 58 receives the hue data c, m and y, the product P1*P2 or Q1*Q2, and the fraction data from the divider 206, and time-division multiplexes them.

FIG. 45A to FIG. 45D explain the time-division multiplexing in the color conversion device of FIG. 44. FIG. 45A to FIG. 45C are examples for the calculation of the color ink data C1, M1, Y1. FIG. 45D is an example of multiplexing the coefficients.

The first multiplexer 57 is switched at the point Z in the drawings such that the calculation is executed smoothly (without error from the value obtained by the formula). The accumulator 59 performs the functional calculation of the formula (30) in Embodiment 19, to obtain the color ink data C1. By means of similar calculations, the color ink data M1 and Y1 are obtained in turn. The synthesizer 210 successively outputs the printing data C=C1+α, M=M1+α, Y=Y1+α.

If the above arrangement is modified such that the second multiplexer 58 receives the achromatic data, and the coefficient generator 110 provides the corresponding multiplication coefficient=1, then the synthesizer 210 can be eliminated.

By using the multiplier for time-division multiplexing, the size of the circuit is much smaller than the color conversion device of FIG. 19. For instance, if a multiplier is formed of about 500 gates, a divider is formed of about 600 gates, the color conversion device of Embodiment 19 shown in FIG. 30 is formed of about 10,000 gates or more, while the color conversion device of Embodiment 24 shown in FIG. 44 can be formed of about 3000 gates or less. In a color conversion device employing the YMC plane-sequential printing-method, such as in a color video printer, the configuration of Embodiment 24 (FIG. 44) is suitable.

The formula which may be used for the color conversion is not limited to the formulae (30) and (15) in Embodiment 19, but other formulae may also be used. For instance, the fraction terms in the formula (30) may be replaced by the fraction terms in the following Table 4.

TABLE 4

| Hue | Effective Fraction Term |
|---|---|
| Red | m * y/(r + c) |
| Green | y * c/(r + c) |
| Blue | c * m/(r + c) |
| Cyan | g * b/(r + c) |
| Magenta | b * r/(r + c) |
| Yellow | r * g/(r + c) |

When the denominator of the fraction term in Table 4 is altered to (g+m) or (b+y), formulae equivalent to the formula (30) in Embodiment 19 can be obtained.

When the fraction terms of the formula (30) in Embodiment 19 are replaced by the fraction terms in Table 4, the following formula (34) is obtained.

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(r+c) \\ m^*y/(r+c) \\ y^*c/(r+c) \\ r^*g/(r+c) \\ g^*b/(r+c) \\ b^*r/(r+c) \end{bmatrix} \quad (34)$$

Here, with regard to (Eij), i=1 to 3, j=1 to 3. With regard to (Fij), i=1 to 3, j=1 to 12.

Since (r+c) may be replaced by (g+m) or (b+y), the formula (34) may be generalized as:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/\sigma \\ m^*y/\sigma \\ y^*c/\sigma \\ r^*g/\sigma \\ g^*b/\sigma \\ b^*r/\sigma \end{bmatrix} \quad (34A)$$

where σ=(r+c), (g+m) or (b+y). With regard to (Eij), i=1 to 3, j=1 to 3. With regard to (Fij), i=1 to 3, j=1 to 12.

The formula for obtaining the printing data will be as follows:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(r+c) \\ m^*y/(r+c) \\ y^*c/(r+c) \\ r^*g/(r+c) \\ g^*b/(r+c) \\ b^*r/(r+c) \end{bmatrix} + \begin{bmatrix} \alpha \\ \alpha \\ \alpha \end{bmatrix} \quad (17)$$

Here, with regard to (Ejj), i=1 to 3, j=1 to 3. With regard to (Fij), i=1 to 3, j=1 to 12.

Since (r+c) may be replaced by (g+m) or (b+y), the formula (17) may be generalized as:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/\sigma \\ m^*y/\sigma \\ y^*c/\sigma \\ r^*g/\sigma \\ g^*b/\sigma \\ b^*r/\sigma \end{bmatrix} + \begin{bmatrix} \alpha \\ \alpha \\ \alpha \end{bmatrix} \quad (17A)$$

where σ=(r+c), (g+in) or (b+y). Here, with regard to (Eij), i=1 to 3, j=1 to 3. With regard to (Fij), i=1 to 3, j=1 to 12.

In place of the fraction terms of the formula (30), square roots of the product terms may be used. The formula will then be as follows:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ (c^*m)^{1/2} \\ (m^*y)^{1/2} \\ (y^*c)^{1/2} \\ (r^*g)^{1/2} \\ (g^*b)^{1/2} \\ (b^*r)^{1/2} \end{bmatrix} \quad (35)$$

Here, with regard to (Eij), i=1 to 3, j=1 to 3. With regard to (Fij), i=1 to 3, j=1 to 12.

The formula for determining the printing data is as follows:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ (c^*m)^{1/2} \\ (m^*y)^{1/2} \\ (y^*c)^{1/2} \\ (r^*g)^{1/2} \\ (g^*b)^{1/2} \\ (b^*r)^{1/2} \end{bmatrix} + \begin{bmatrix} \alpha \\ \alpha \\ \alpha \end{bmatrix} \quad (16)$$

Here, with regard to (Eij), i=1 to 3, j=1 to 3. With regard to (Fij), i=1 to 3, j=1 to 12.

Figure 46A:
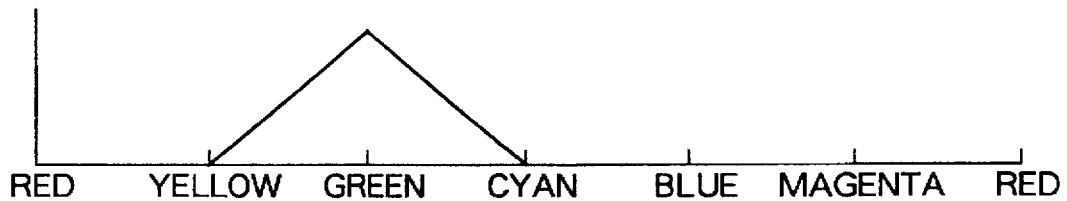
FIG. 46A to FIG. 46C are diagrams for explaining differences of the terms in the matrix calculation in the color conversion device of FIG. 44.
Figure 46B:
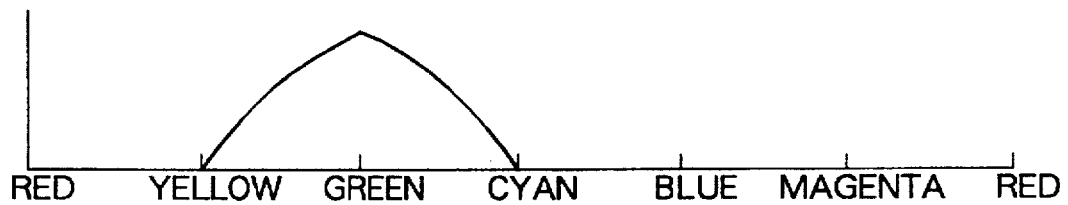
Figure 46C:
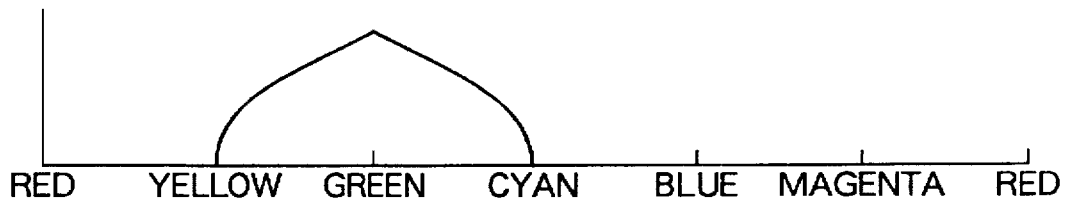
Figure 48A:
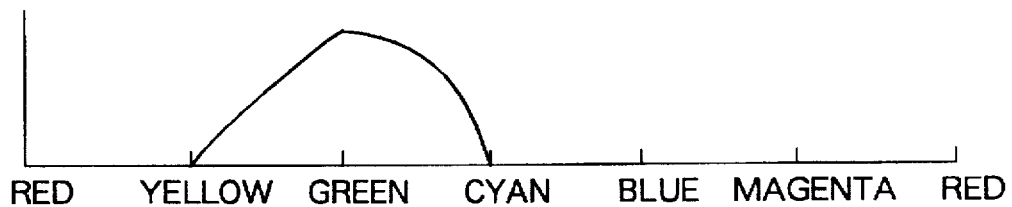
FIG. 48A to FIG. 48E are diagrams for explaining differences of the terms in the matrix calculation in the color conversion device of FIG. 47.

FIG. 48A to FIG. 46C are diagrams for explaining the differences of the terms in the formula of the matrix calculation performed by the color conversion device of FIG. 44.

FIG. 46A shows the magnitude of the data y*c/(r+c) for each hue. It will be seen that it continuously varies in the region of yellow to green, and in the region of green to cyan. FIG. 46B shows the magnitude of the data y*c/(y+c). Compared with FIG. 4BA, the data has a larger magnitude in the region of yellow to green and in the region of green to cyan. That is, y*c/(y+c) has a larger effect than y*c/(r+c) on the regions of yellow to green and green to cyan.

FIG. 46C shows the magnitude of the size of the (y*c$^{1/2}$. The data has an even greater magnitude in the region of yellow to green, and the region of green to cyan, and the effects on the color conversion are greater. The terms in the formula should therefore be selected according to the color conversion characteristic desired.

If the fraction terms of the formula (18) in Embodiment 21 are replaced by the fraction terms of Table 4, then the formula for obtaining the printing data will be as follows:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(r+c) \\ m^*y/(r+c) \\ y^*c/(r+c) \\ r^*g/(r+c) \\ g^*b/(r+c) \\ b^*r/(r+c) \\ \alpha \\ \alpha^*\alpha \end{bmatrix} \quad (20)$$

Here, with regard to (Eij), i=1 to 3, j=1 to 3. With regard to (Fij), i=1 to 3, j=1 to 14.

Since (r+c) may be replaced by (g+m) or (b+y), the formula (20) may be generalized as:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/\sigma \\ m^*y/\sigma \\ y^*c/\sigma \\ r^*g/\sigma \\ g^*b/\sigma \\ b^*r/\sigma \\ \alpha \\ \alpha^*\alpha \end{bmatrix} \quad (20A)$$

where σ=(r+c), (g+m) or (b+y). With regard to (Eij), i=1 to 3, j=1 to 3. With regard to (Fij), i=1 to 3, j=1 to 14.

When the fraction terms of the formula (24) in Embodiment 22 may be replaced by fraction terms in Table 4, the formula for determining the printing data will be as follows:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(r+c) \\ m^*y/(r+c) \\ y^*c/(r+c) \\ r^*g/(r+c) \\ g^*b/(r+c) \\ b^*r/(r+c) \\ (\alpha-K) \\ (\alpha-K)^*(\alpha-K) \end{bmatrix} \quad (26)$$

Here, with regard to (Eij), i=1 to 3, j=1 to 3. With regard to (Fij), i=1 to 3, j=1 to 14.

Since (r+c) may be replaced by (g+m) or (b+y), the Formula (26) may be generalized as:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/\sigma \\ m^*y/\sigma \\ y^*c/\sigma \\ r^*g/\sigma \\ g^*b/\sigma \\ b^*r/\sigma \\ (\alpha-K) \\ (\alpha-K)^*(\alpha-K) \end{bmatrix} \quad (26A)$$

where σ=(r+c), (g+m) or (b+y). With regard to (Eij), i=1 to 3, j=1 to 3. With regard to (Fij), i=1 to 3, j=1 to 14.

In place of the fraction terms of the Formula (21) in Embodiment 22, the fraction terms in Table 4 may be used. Then, the formula for obtaining the printing data will be as follows:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/(r+c) \\ m^*y/(r+c) \\ y^*c/(r+c) \\ r^*g/(r+c) \\ g^*b/(r+c) \\ b^*r/(r+c) \end{bmatrix} + \begin{bmatrix} \alpha-K \\ \alpha-K \\ \alpha-K \end{bmatrix} \quad (23)$$

Here, with regard to (Eij), i=1 to 3, j=1 to 3. With regard to (Fij), i=1 to 3, j=1 to 12.

Since (r+c) may be replaced by (g+m) or (b+y), the formula (23) may be generalized as:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ c^*m/\sigma \\ m^*y/\sigma \\ y^*c/\sigma \\ r^*g/\sigma \\ g^*b/\sigma \\ b^*r/\sigma \end{bmatrix} + \begin{bmatrix} \alpha-K \\ \alpha-K \\ \alpha-K \end{bmatrix} \quad (23A)$$

where σ=(r+c), (g+m) or (b+y). With regard to (Eij), i=1 to 3, j=1 to 3. With regard to (Fij), i=1 to 3, j=1 to 12.

In place of the fraction terms in the formula (18) of Embodiment 21, a square root of the product terms may be used. Then, the formula for obtaining the printing data will be as follows:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ (c^*m)^{1/2} \\ (m^*y)^{1/2} \\ (y^*c)^{1/2} \\ (r^*g)^{1/2} \\ (g^*b)^{1/2} \\ (b^*r)^{1/2} \\ \alpha \\ \alpha^*\alpha \end{bmatrix} \quad (19)$$

Here, with regard to (Eij), i=1 to 3, j=1 to 3. With regard to (Fij), i=1 to 3, j=1 to 14.

In place of the fraction terms of the formula (24) in Embodiment 22, a square root of the product terms may be used. Then, the formula for obtaining the printing data will be as follows:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ (c^*m)^{1/2} \\ (m^*y)^{1/2} \\ (y^*c)^{1/2} \\ (r^*g)^{1/2} \\ (g^*b)^{1/2} \\ (b^*r)^{1/2} \\ (\alpha-K) \\ (\alpha-K)^*(\alpha-K) \end{bmatrix} \quad (25)$$

Here, with regard to (Eij), i=1 to 3, j=1 to 3. With regard to (Fij), i=1 to 3, j=1 to 14.

In place of the fraction terms of the formula (21) in Embodiment 22, a square root of the product terms may be used. Then, the formula for obtaining the printing data will be as follows:

$$\begin{bmatrix} C \\ M \\ Y \end{bmatrix} = (Eij) \begin{bmatrix} c \\ m \\ y \end{bmatrix} + (Fij) \begin{bmatrix} c^*m \\ m^*y \\ y^*c \\ r^*g \\ g^*b \\ b^*r \\ (c^*m)^{1/2} \\ (m^*y)^{1/2} \\ (y^*c)^{1/2} \\ (r^*g)^{1/2} \\ (g^*b)^{1/2} \\ (b^*r)^{1/2} \end{bmatrix} + \begin{bmatrix} \alpha - K \\ \alpha - K \\ \alpha - K \end{bmatrix} \quad (22)$$

Here, with regard to (Eij), i=1 to 3, j=1 to 3. With regard to (Fij), i=1 to 3, j=1 to 12.

Embodiment 25

Figure 47:
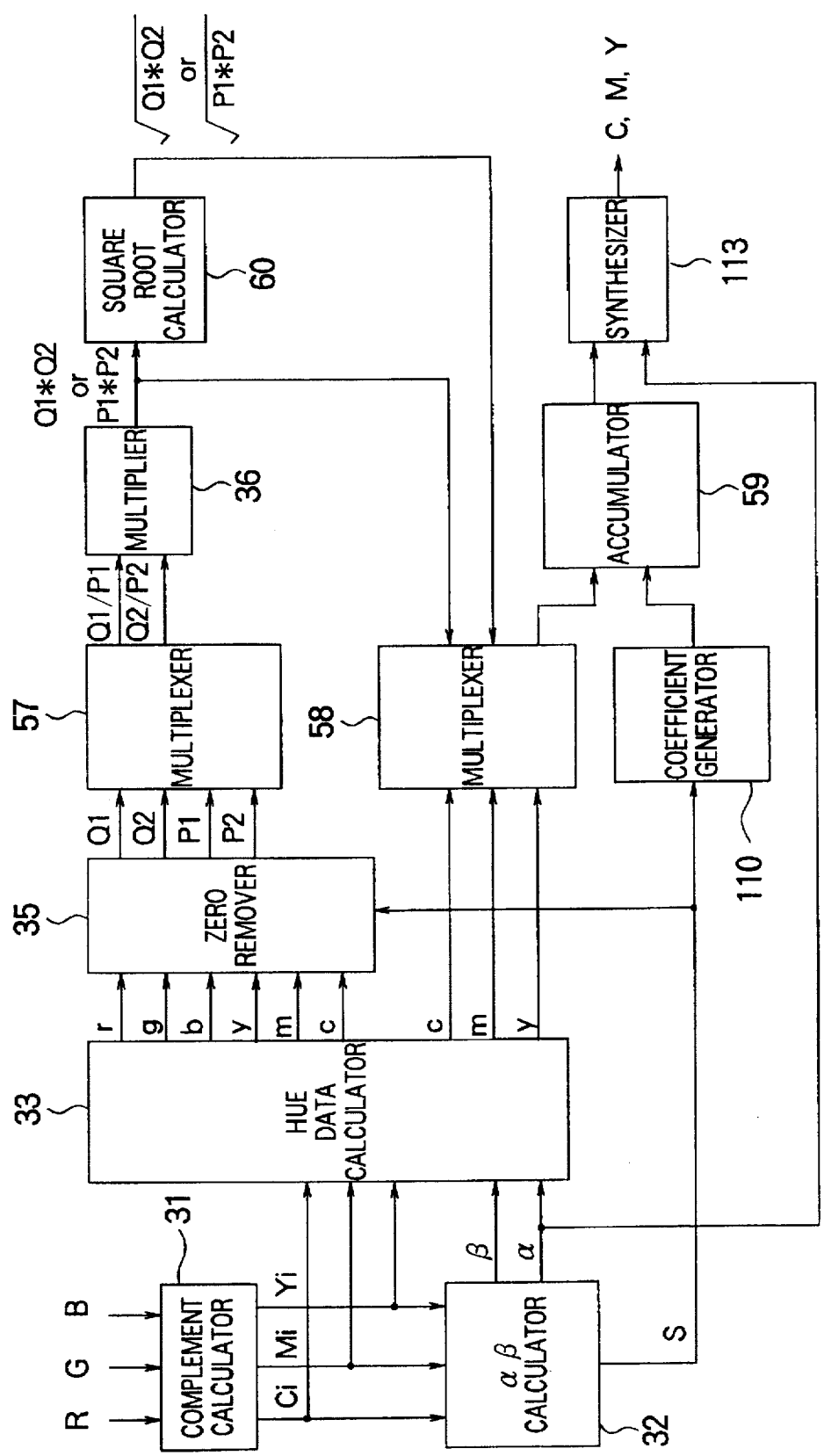
FIG. 47 is a block diagram showing the configuration of a color conversion device of Embodiment 25 of the invention.

FIG. 47 is a block diagram showing the configuration of a color conversion device of Embodiment 25. Reference numerals identical to those in FIG. 44 denote identical or corresponding circuits. Reference numeral 60 denotes a square root calculator. The illustrated color conversion device is for performing time-division calculation of the formula (33) in Embodiment 20.

The output of the square root calculator, $(Q1^*Q2)^{1/2}$ or $(P1^*P2)^{1/2}$ is used in place of the fraction term in Embodiment 24 shown in FIG. 44. The rest is identical to Embodiment 24.

In place of the fraction terms of the formula (15) in Embodiment 19, the terms in the following Table 5 may be used.

TABLE 5

| Hue | Effective Fraction Term |
| --- | --- |
| Red | m * y/(s1 * m + t1 * y) |
| Green | y * c/(s2 * y + t2 * c) |
| Blue | c * m/(s3 * c + t3 * m) |
| Cyan | g * b/(s4 * g + t4 * b) |
| Magenta | b * r/(s5 * b + t5 * r) |
| Yellow | r * g/(s6 * r + t6 * g) |

FIG. 48A to FIG. 48E show the differences of the calculation terms of the matrix formula in the color conversion device of FIG. 47.

Figure 48B:
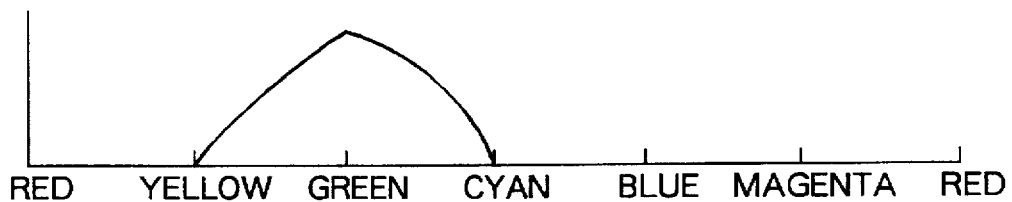
Figure 48C:
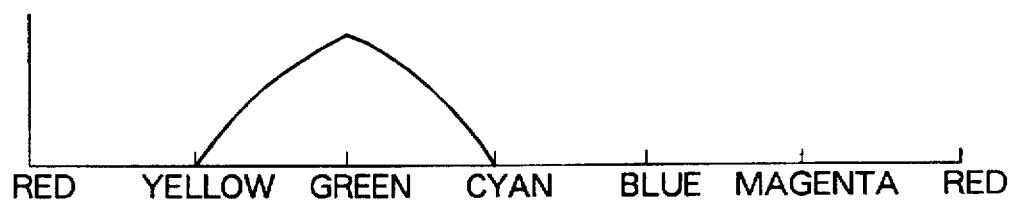
Figure 48D:
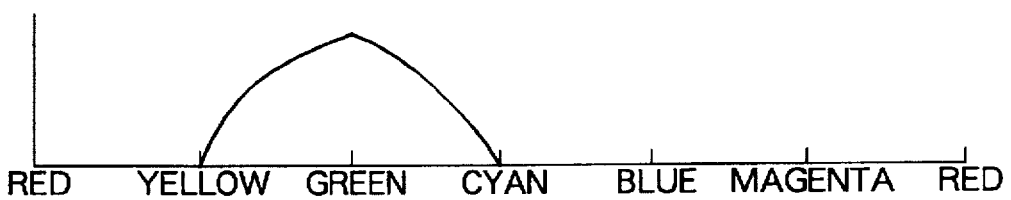
Figure 48E:
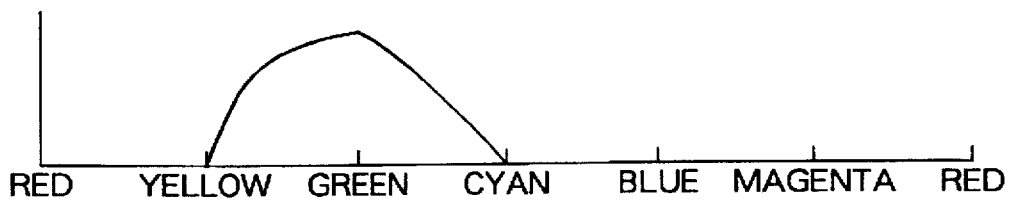
Figure 49:
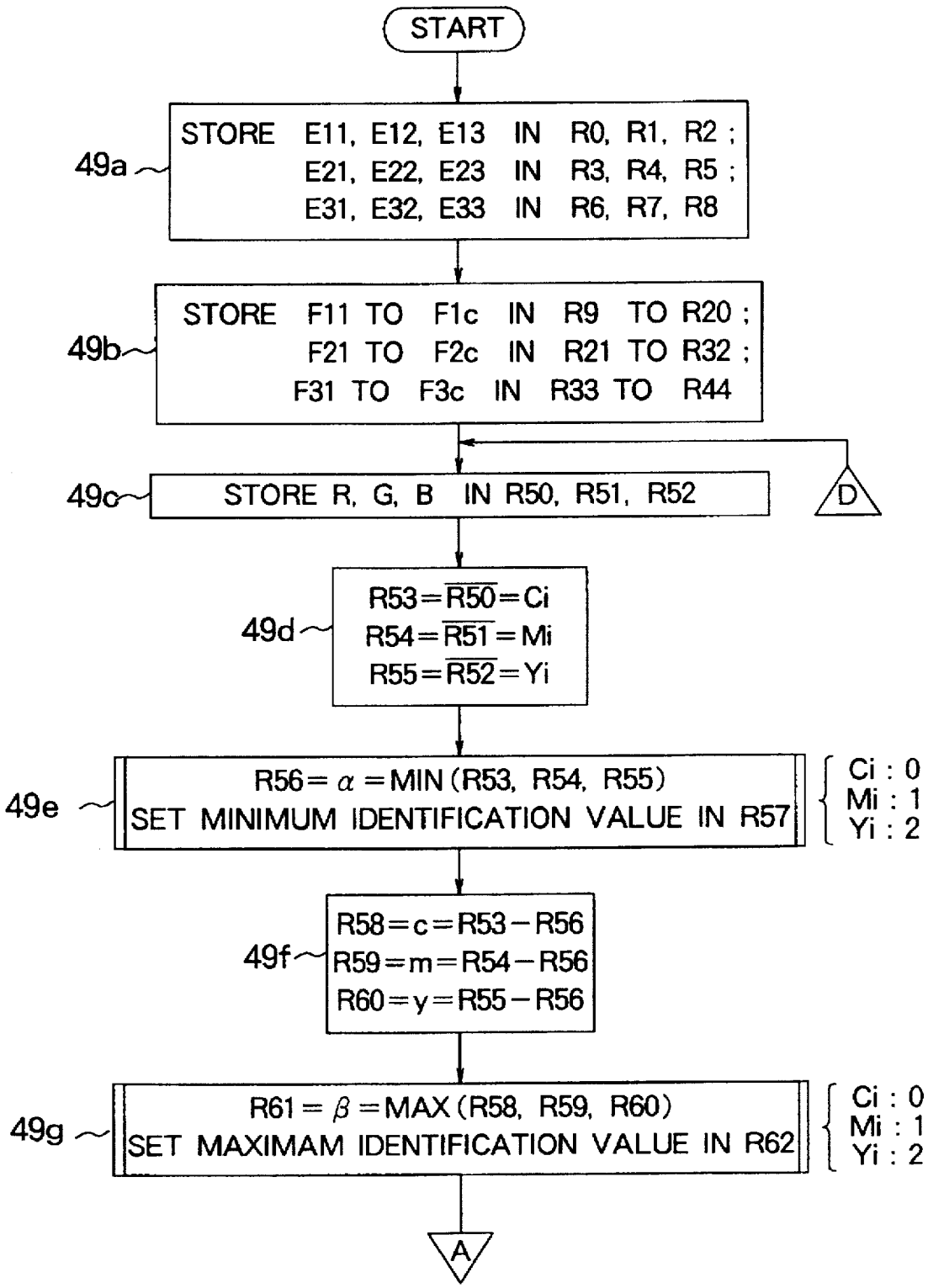
FIG. 49 to FIG. 52 are flowcharts showing a color conversion method of Embodiment 26 of the invention.

The fraction terms in Table 5 have the following effects, depending on the ratio between variables s and t. For example, the effects of the fraction terms y*c/(s2*y+t2*c) in the green hue are different in the region of yellow to green and the region of green to cyan, depending on the ratio between s2 and t2. FIG. 48A shows the case where s2/t2=4/1. FIG. 48B shows the case where s2/t2=2/1. FIG. 48C shows the case where s2/t2=1/1. FIG. 48D show the case where s2/t2=1/2. FIG. 48E shows the case where s2/t2=1/4.

The same is true for other five hues. The color conversion for implementing this functional formula can be realized on the basis of the color conversion device of Embodiment 19 shown in FIG. 30, and the color conversion device of Embodiment 24 shown in FIG. 44.

The calculation used by the muddiness calculator 47 may be any as long as subtraction is made such that at least one of the color compensation data is made to be "zero" using a minimum value H of the color compensation data and when the minimum value H is a positive value. For instance, where H>0, practically satisfactory results are obtained when the minimum value L is subtracted from the color compensation data which are not equal to the maximum value H.

Embodiment 26

FIG. 49 to FIG. 52 are flowcharts showing a color conversion method of Embodiment 26. This color conversion program is for implementing the color conversion of the formula (15) by means of software. At step 49a in FIG. 49, coefficients (Eij) are set in the register R0 to R8 built in a CPU.

At step 49b, coefficients (Fij) are set in registers R9 to R44. The suffixes "1" and "c" in the legends of the step 49b, such as in (F11) and (F1c) represent "1" and "c" in hexadecimal notation, which are respectively equivalent to "1" and "12" in decimal notation.

At step 49c, image data R, G, B of one pixel are stored in registers R50, R51, R52.

At step 49d, processing for determining 1's complement of the image data R, G, B are performed, and the results of the processing are stored as complementary data in the registers R53, R54, R55.

At step 49e, the minimum value α of the complementary data is determined, and stored in register R56, and the minimum value is identified, and a value "0", "1" or "2" is set in register R57. The details of these operations will be later described with reference to FIG. 53.

At step 49f, the hue data c, m, y are determined, and stored in registers R58, R59, R60.

At step 49g, the maximum value β is determined, and stored in register R61. A value "0", "1" or "2" for identifying the maximum value is set in the register R62. The details of these operations will be later described with reference to FIG. 54.

Figure 50:
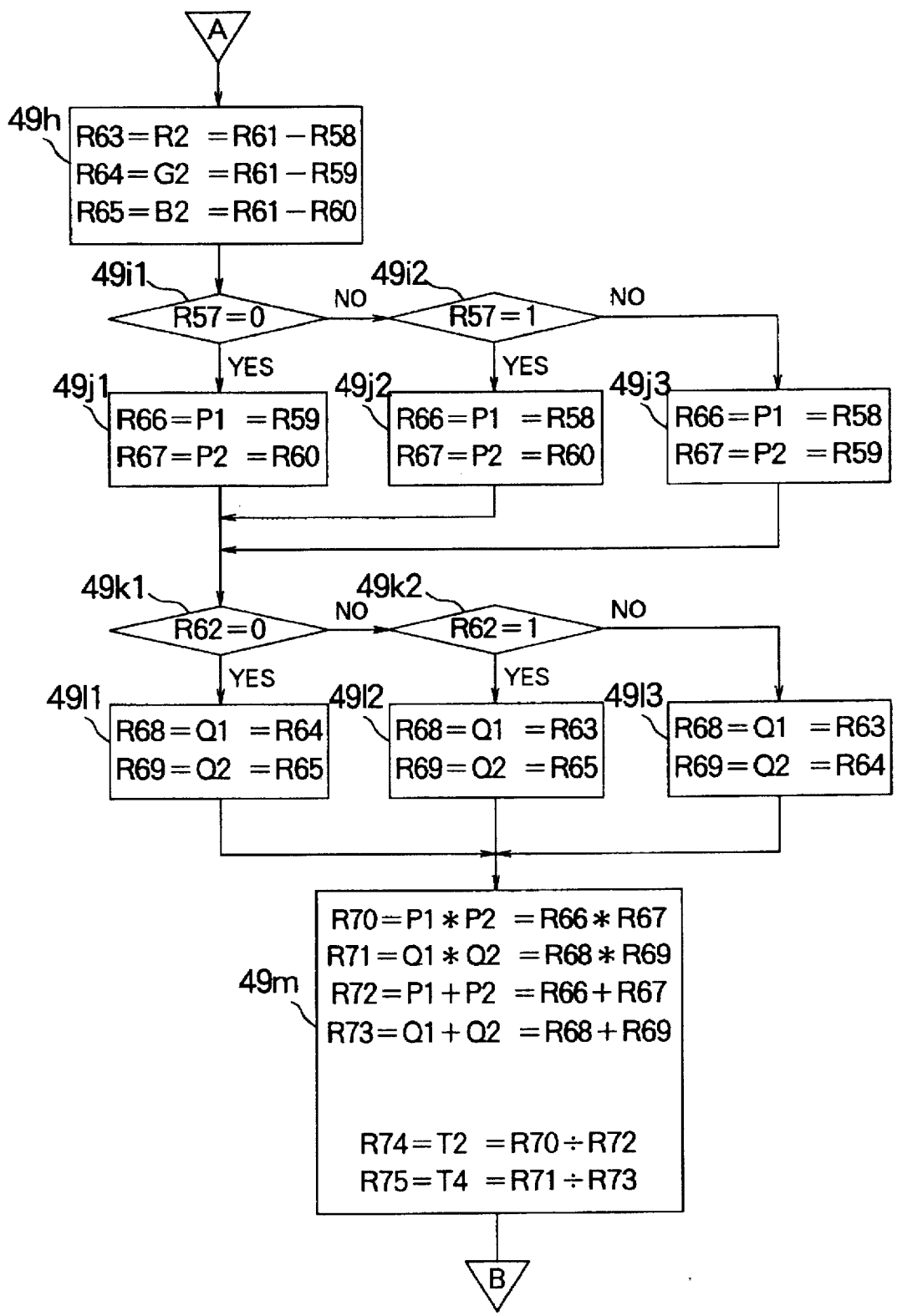

At step 49h in FIG. 50, hue data r, g, b are determined, and stored in registers R63, R64, R65.

At steps 49i1 and 49i2, branching decisions are made in accordance with the value of the content of register R57.

At steps 49j1 to 49j3, two of the hue data c, m, y which are not zero are stored as data P1 and P2 in registers R66 and R67.

At steps 49k1 and 49k2, branching decisions are made in accordance with the value of the content of the register R62.

At steps 4911 to 4913, two of the hue data r, g, b which are not zero are stored as data Q1 and Q2 in registers R68 and R69.

At step 49m, the product P1*P2, the product Q1*Q2, the sum P1+P2, and the sum Q1+Q2 are calculated and stored in the registers R70 to R73. Quotients T2 and T4 are calculated from these products and sums, in accordance with T2=(P1*P2)/(P1+P2), and T4=(Q1*Q2)/(Q1+Q2), and are stored in the registers R74 and R75.

Figure 51:
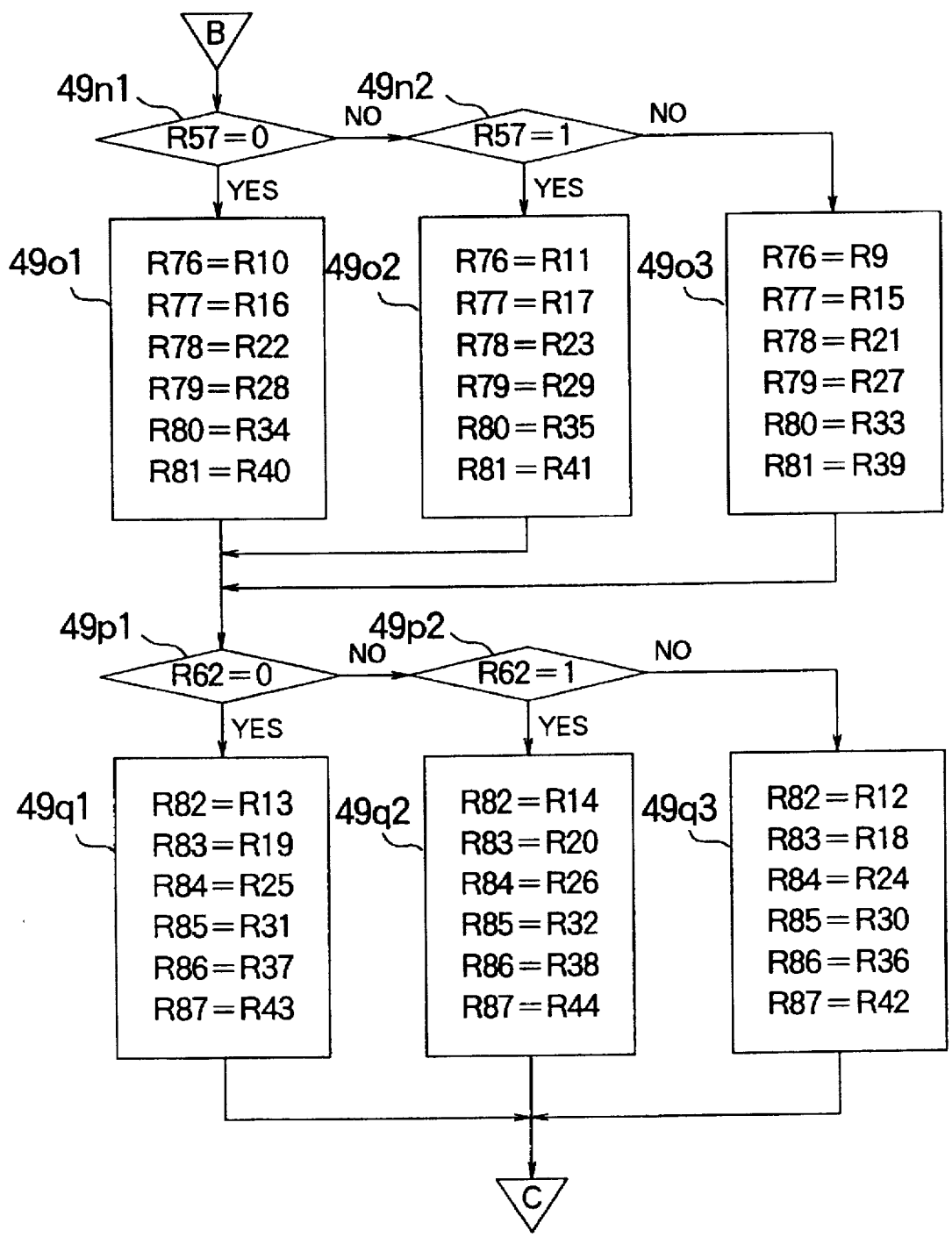

At steps 49n1, 49n2 in FIG. 51, branching decisions are made in accordance with the minimum value identification value.

At steps 49o1 to 49o3, the coefficients (Fij) which correspond to the respective conditions are stored in the registers R76 to R81. The coefficients which are actually used are selected according to the hue data.

At steps 49p1, 49p2, branching decisions are made in accordance with the maximum value identification value.

At step 49q1 to q3, the coefficients (Fij) corresponding to the respective conditions are stored in the registers R82 and R87. The coefficients which are actually used are selected according to the hue data.

Figure 52:
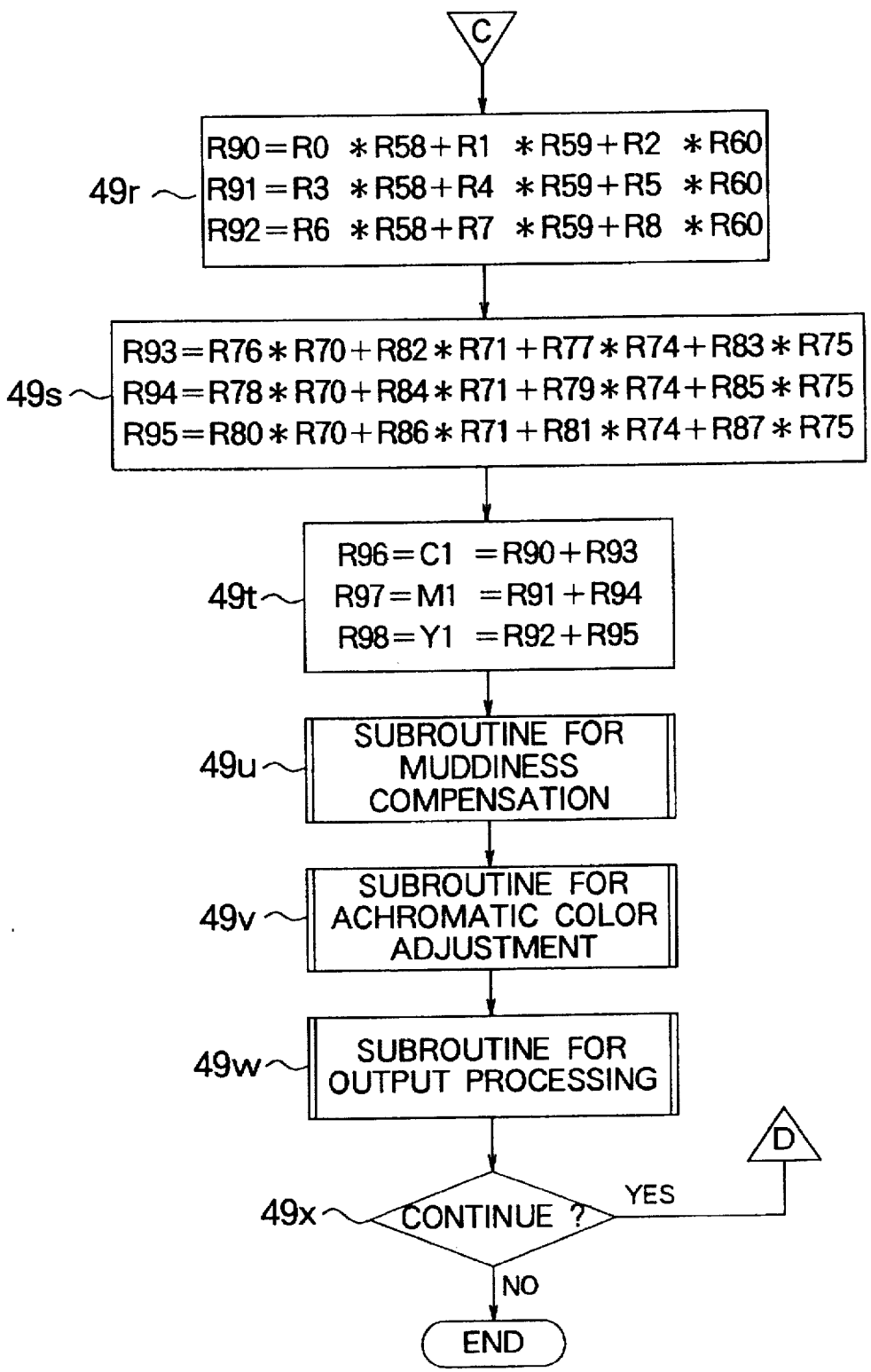

At step 49r in FIG. 52, a matrix calculation is performed on the coefficients (Eij), the hue data c, m, y, and the results of the calculation are stored in the registers R90, R91, R92.

At step 49s, a matrix calculation is performed on the coefficients (Fij), the product terms and the fraction terms, and the results of the calculation are stored in the registers R93, R94 and R95.

At step 49t, the results of the calculation at the step 49r, and the results of the calculation at the step 49s are added, and the sums are stored in the registers R96, R97, and R98 as the color ink data C1, M1, Y1.

At step 49u, muddiness compensation of the color ink data C1, M1, Y1 is performed. Its details will later be described with reference to FIG. 55.

At step 49v, adjustment of the achromatic components are made. Its details will later be described with reference to FIG. 56.

At step 49w, a final ink data outputting processing is performed. Its details will later be described with reference to FIG. 57.

At step 49x, judgement is made on whether the process is to be continued. If it is to be continued, the process is returned to step 49c in FIG. 49. If it is not to be continued, the process is stopped.

FIG. 53 to FIG. 57 are flowcharts showing the subroutines for executing the color conversion method of Embodiment 26.

Figure 53:
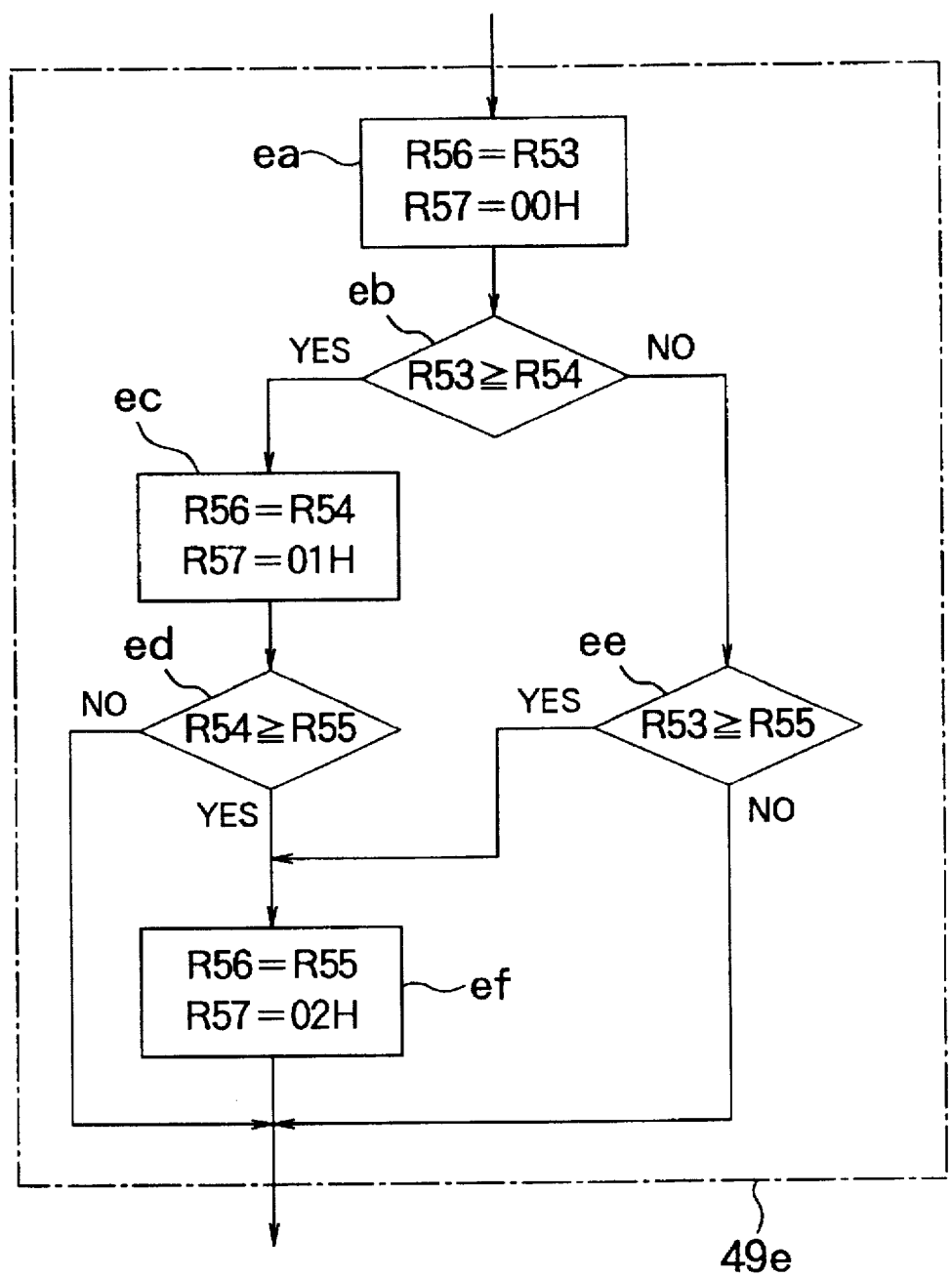
FIG. 53 to FIG. 57 are flowcharts showing subroutines for implementing the color conversion of Embodiment 26.

FIG. 53 shows a subroutine for setting the minimum identification value, in which the minimum value is stored in the register R56, and the identification value is set in the register R57.

At step ca, complementary color data of cyan is stored in the register R56, and a value (00H) is stored in the register R57.

At step eb, the complementary color data of cyan stored in the register R56 is compared with another complementary color data of magenta. If the former is equal to or greater than the latter, the process proceeds to a step ec. Otherwise, the process proceeds to a step ee.

At step ec, the above-mentioned another data (of magenta) is stored in the register R56, and a value (01H) is stored in the register R57.

At step ed, the complementary color data of magenta stored in the register R56 is compared with a further complementary color data of yellow. If the former is equal to or greater than the latter, the process proceeds to a step ef. Otherwise, the subroutine is ended.

At step ee, the first complementary color data of cyan is compared with the further complementary color data of yellow. If the former is equal to or greater than the latter, the process proceeds to the step ef. Otherwise, the subroutine is ended.

At step ef, the minimum complementary color data is stored in the register R56, and a value (02H) is stored in the register R57. The subroutine is then ended.

Figure 54:
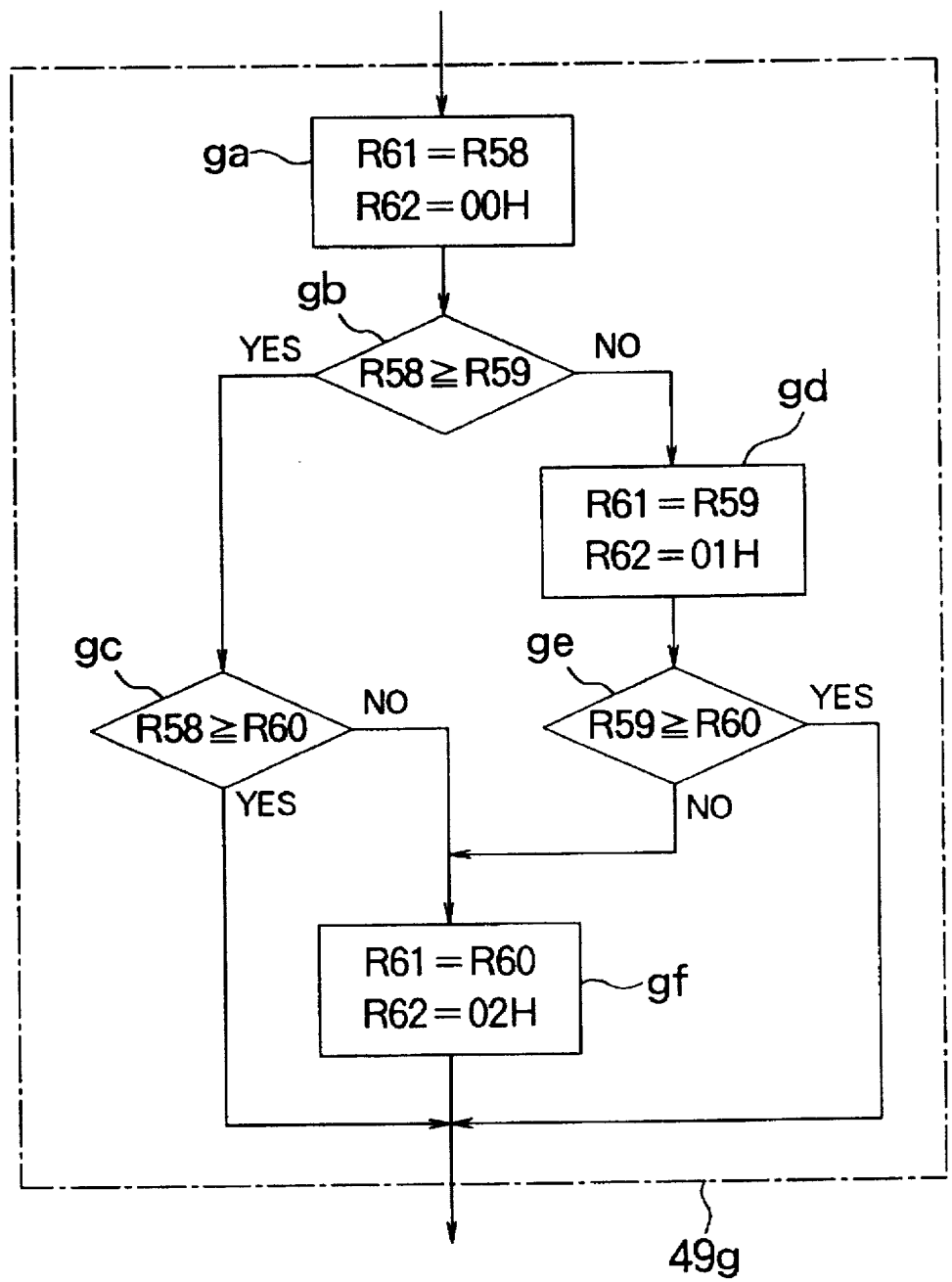

FIG. 54 shows the details of the subroutine for setting the sign (of plus or minus) of the maximum value, in which the maximum value is stored in the register R61, and the identification value is set in the register R62.

At step ga, the hue data R61 is stored in the register R61, and the value (00H) is stored in the register R62.

At step gb, the hue data of cyan stored in the register R61 is compared with another hue data of magenta. If the former is equal to or greater than the latter, the process proceeds to a step gc. Otherwise, the process proceeds to a step gd.

At step gc, the first hue data of cyan is compared with further hue data of yellow. If the former is equal to or greater than the latter, the subroutine is ended. Otherwise, the process proceeds to a step gf.

At step gd, the above-mentioned another data (of magenta) is stored in the register R61, and a value (01H) is stored in the register R62.

At step ge, the hue data of magenta stored in the register R61 is compared with the further hue data of yellow. If time former is equal to or greater than the latter, the subroutine is ended. Otherwise, the process proceeds to a step gf.

At step gf, the maximum hue data is stored in the register R61, and a value (02H) is stored in the register R62. The subroutine is then ended.

Figure 55:
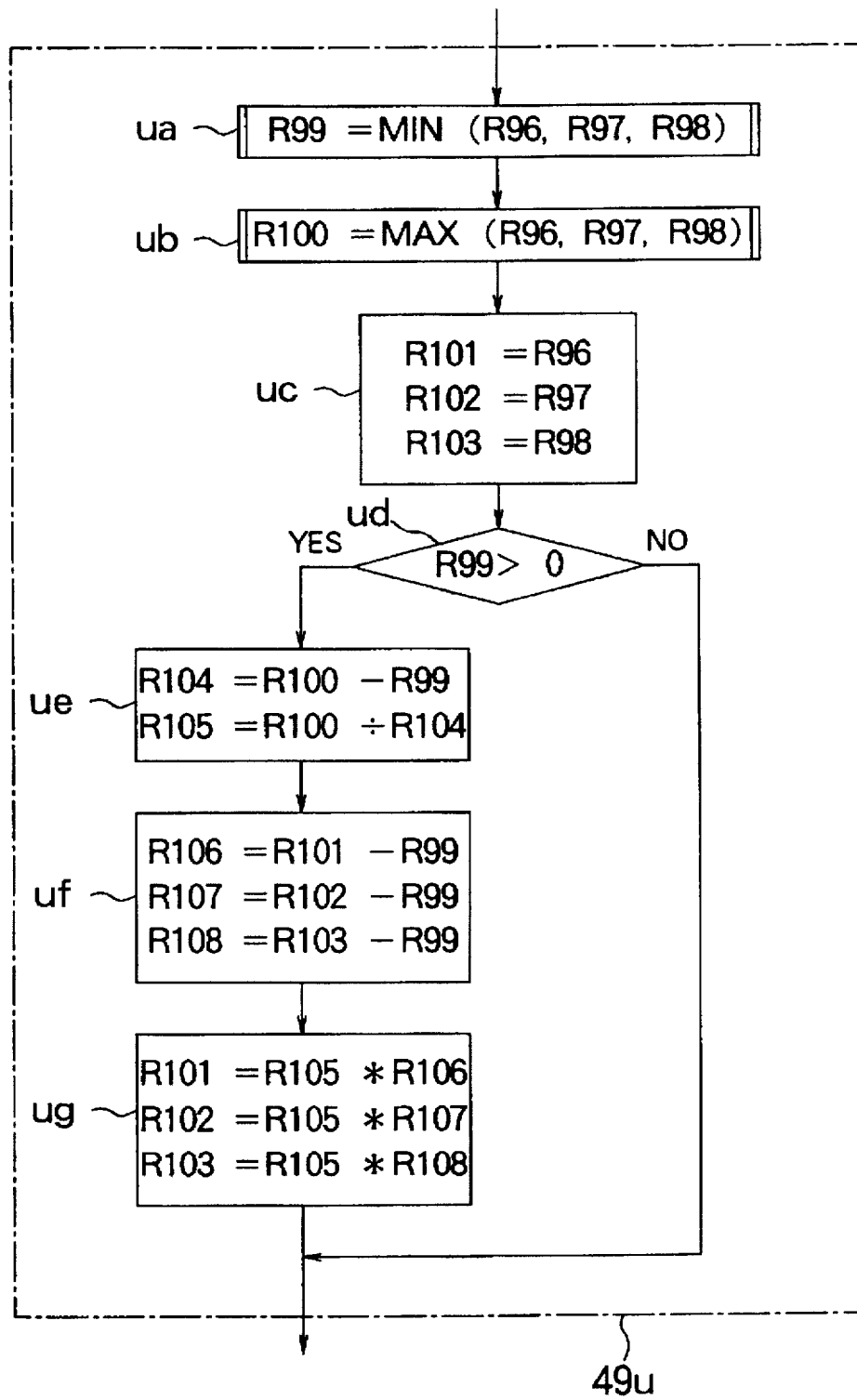

FIG. 55 shows the subroutine for the muddiness compensation.

At step ua, the minimum value of the color ink data is stored in the register R99.

At step ub, the maximum value of the color ink data is stored in the register R100.

At step uc, the color ink data are stored in the registers R101, R102, R103. This step is for setting, in the registers, the data for which the muddiness compensation is not made, and is effective for simplifying the process.

At step ud, decision is made on whether a muddiness compensation is to be made.

At step ue, the multiplication coefficient J is determined, and the result is stored in the register R105.

At step uf, the minimum value is subtracted from the color ink data, and the results are stored in the registers R106, R107, R108.

At step ug, the data stored at the steps ue and uf are used to produce the muddiness-compensated ink data, and are stored as the muddiness-removed data, in the registers R101, R102, R103.

Figure 56:
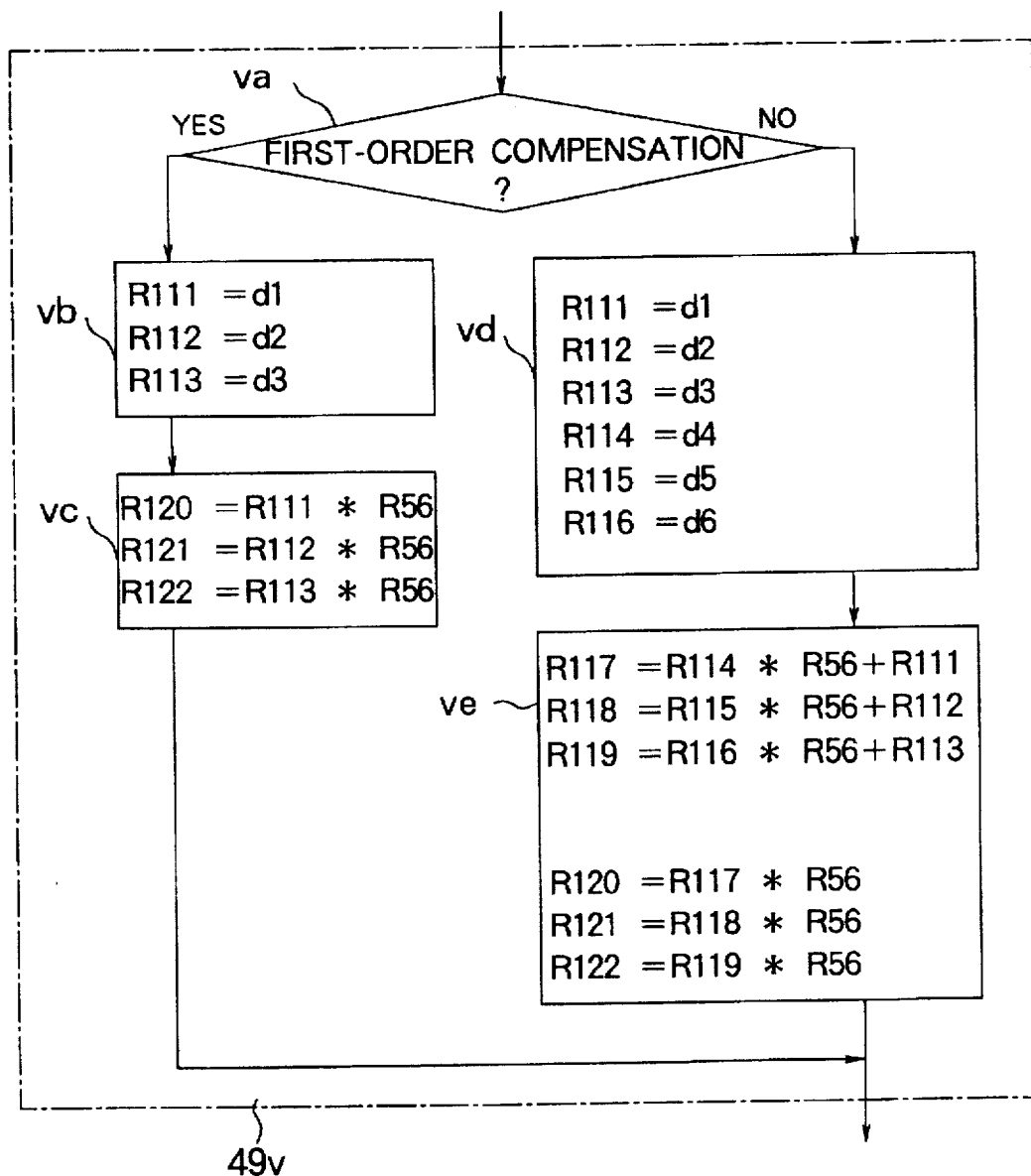

FIG. 56 shows the details of the subroutine for the achromatic color adjustment.

At step va, decision is made on whether a first-order function or a second-order function is to be used for the adjustment.

When a first-order function is to be used, then at step vb, the adjustment coefficients d1, d2, d3 are stored in the registers R111, R112, R113.

Then, at step vc, the achromatic data are multiplied with the adjustment coefficients, and the results (products) are stored, as the adjusted data, in the registers R120, R121, R122.

If, at step va, a second-order function is to be used, then at step vd, adjustment coefficients d1 to d6 are stored in the registers R111 to R116.

Then, at step ve, the adjustment calculations of the second-order function are performed, and the results of the calculation are stored, as the adjusted data, in the registers R120, R121, R122.

The achromatic data are thus adjusted, and selection from among reddish black, standard black, bluish black, and the like can be made. When no adjustment is to be made, a first-order function is selected, and the adjustment coefficients are set such that d1=d2=d3=1.

Figure 57:
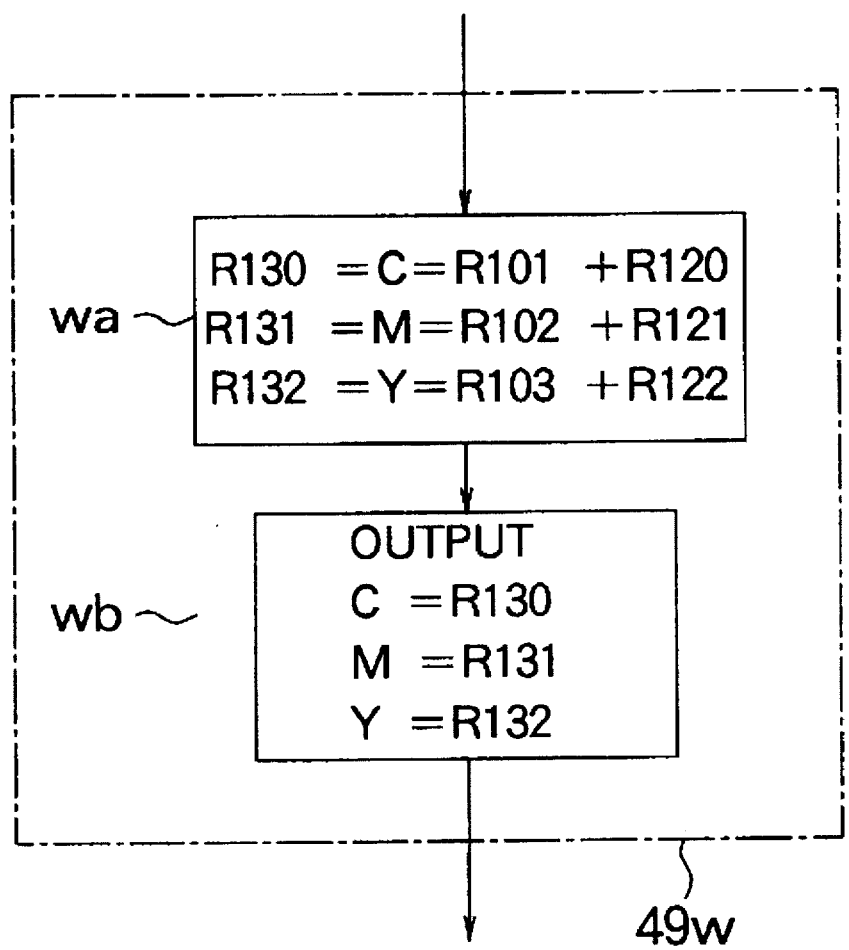

FIG. 57 shows the details of the subroutine of the outputting processing.

At step wa, the muddiness-removed data and the achromatic-color-adjusted data are added, and the sums are stored in the registers R130, R131, R132.

At step wb, the data in the registers R130, R131, R132 are output via predetermined ports, as the printing data C, M, Y.

As has been explained, the color conversion in accordance with the formula (15) can be effected by means of a software (or a programmed computer). The functional calculation according to any other formula can be implemented by means of a software.

Embodiment 27

Figure 58:
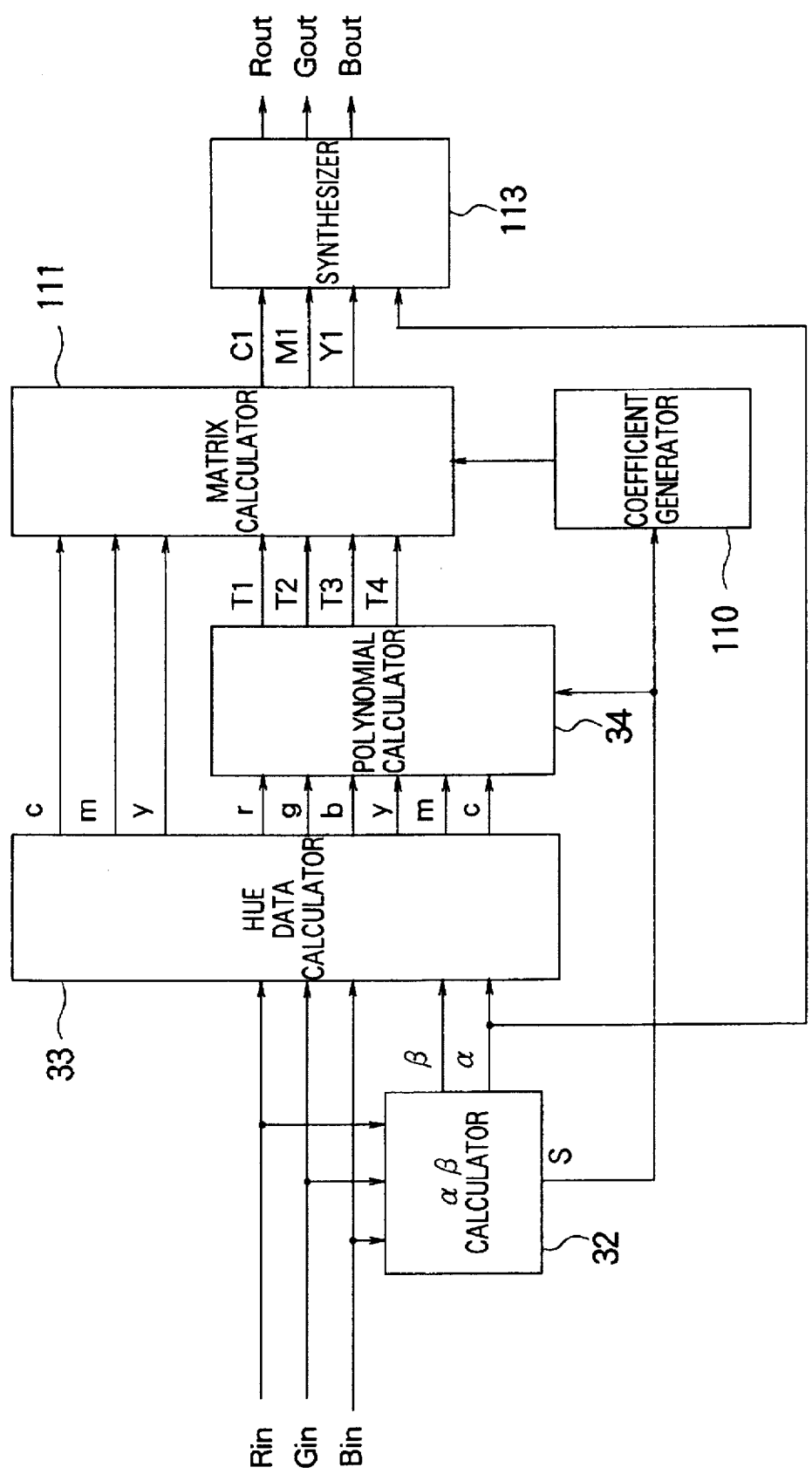
FIG. 58 is a block diagram showing a color conversion device of Embodiment 27 of the invention as applied to a scanner.

FIG. 58 is a block diagram showing the configuration of a color conversion device of Embodiment 27, which is applied to a scanner. The reference numerals identical to those in FIG. 30 denote identical or corresponding circuits.

The color conversion device of FIG. 58 is similar to the color conversion device of Embodiment 19, but the complement calculator 30 has been removed. The color conversion device of FIG. 58 is intended for color conversion of color-separated data from a scanner. Many of the recent color scanners use a CCD line sensor with color filters. In may cases, filters for red (R), green (G), and blue (B) are used. Such color filters do not permit free adjustment of the light transmission characteristic. It is therefore necessary to produce image signals for display, by color-converting the output signals of the sensor.

The color conversion device receives the sensor output signals Rin, Gin, Bin having been digitized. The inputs to the color conversion device of FIG. 30 are assumed to be such digitized inputs or data. The outputs of the color conversion device are assumed to be color-separated data Rout, Gout, Bout. Under such conditions, the data processing is performed in the same way as in Embodiment 19 shown in FIG. 30, the compensated (retouched) color-separated data are obtained. The color-separated data are the image data themselves.

Sensors with a C filter, an M filter, and a Y filter are also used. Where such a sensor is used, the color conversion device of Embodiment 27 shown in FIG. 58 may be used, to which sensor data Cin, Min, Yin may be input in place of the image data R, G, B, and from which printing data C, M, Y may be output as color-separated data Rout, Gout, Bout.

In order to cope with a variety of color conversion, the complement calculator 30 of the color conversion device of Embodiment 19 shown in FIG. 30 may be modified to selectively operate either in a direct output mode in which the input data is output directly, or an inverted output mode in which the input data are inverted and the inverted input data are output. Thus, a color conversion device which can be used for a variety of purposes can be realized. Such a color conversion device can be realized by using logic circuits such as EX-OR gate.

The color conversion device of the invention can be applied to implement the various conversion functions as set forth below:

(1) The function of converting image data into printing data
(2) The function of converting image data into display data
(3) The function of converting sensor data into color-separated data or image data
(4) The function of converting first image data into second image data
(5) The function of converting first printing data into second printing data
(6) The function of converting first color-separated data into second color-separated data
(7) The function of unifying or obtaining matching of the color reproducibility of at least three of the color-separated data, the image data, the printing data, and the display data The function (1) is suitable for providing printing data to a color printer or a color video printer. The function (2) is suitable for providing color reproducibility-compensated display data to a standard image monitor, or an LCD (liquid-crystal display) or CRT (cathode-ray tube) type projector. The function (3) is suitable for outputting the color-separated data or image data responsive to sensor data from a color scanner. The function (4) is suitable for conversion between NTSC image and HDTV (high-definition television) image. The function (5) is suitable for data conversion between business-purpose printers and simple printers. The function (6) is suitable for processing from the color-separated data into improved color-separated data. The function (7) is suitable for unification or obtain matching of the color reproducibility in an image processing personal computer, an electronic publication printers, and the like. It can also be used in an integrated system, rather than in a simple printer.

Embodiment 28

Figure 59A:
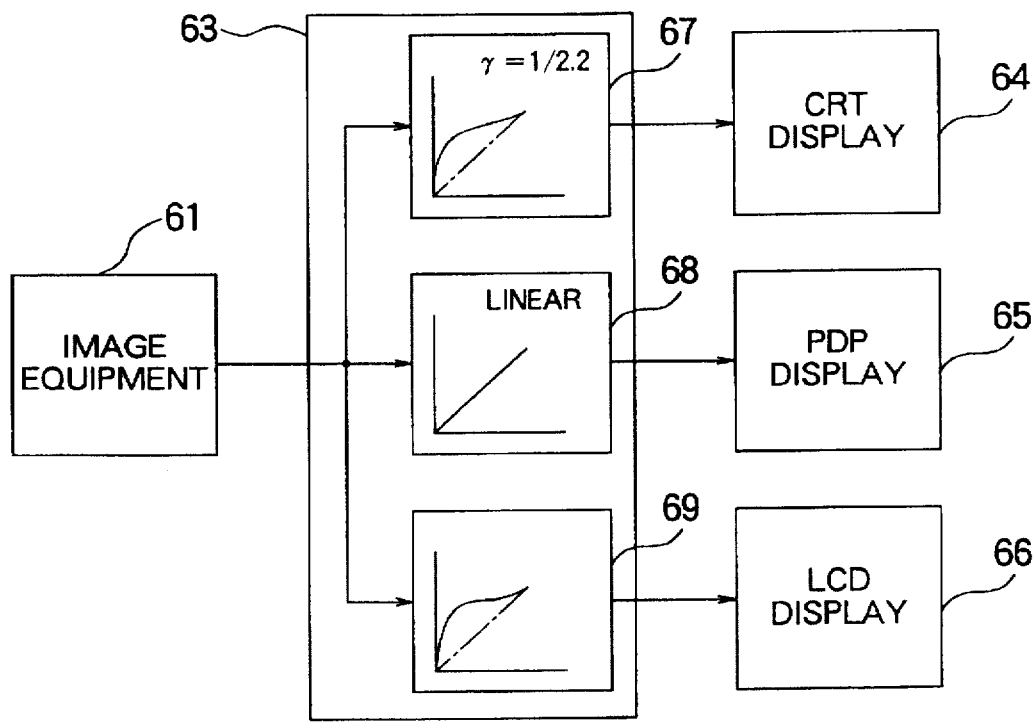
FIG. 59A and FIG. 59B are block diagrams showing the configuration of an image processing device of Embodiment 28 of the invention.
Figure 59B:
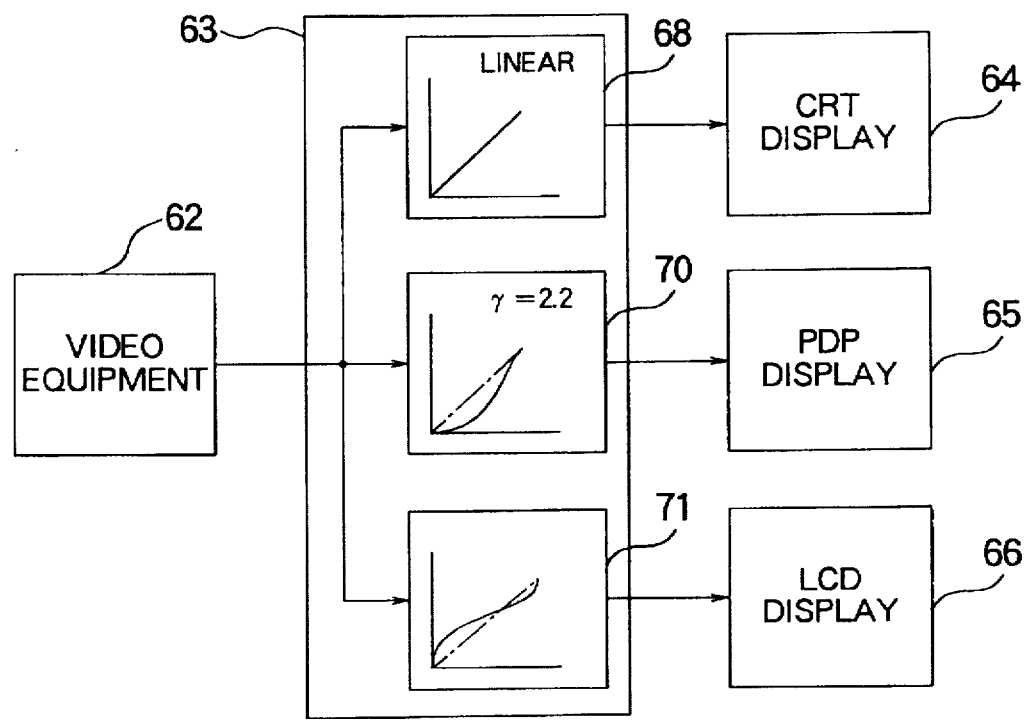

FIG. 59A and FIG. 59B are block diagrams showing the configurations of image processing devices of Embodiment 28. The gamma characteristic of the input image data is defined as $\Gamma$ in, the tone processing is defined as $\gamma$, and the gamma characteristic of the output equipment is defined as $\Gamma$ out.

FIG. 59A shows the configuration of an image processing device with $\Gamma$ in=1. FIG. 59B shows the configuration of an image processing device with $\Gamma$ in=½.2.

In the transmission of video data of the NTSC system, compensation by means of a gamma characteristic of $\Gamma$ in=½.2 is effected at the transmission side in order to compensate the inherent characteristic $\Gamma$ out=2.2 of the CRT display device. A representative example of image equipment shown in FIGS. 59A and 59B is a scanner, and a representative example of video equipment shown in FIGS. 59A and 59B is a television set.

In the figures, 61 denotes an image equipment, 52 denotes a video equipment, 63 denotes a tone processing device, 64 denotes a CRT display device, 65 denotes a PDP (plasma display panel) device, 66 denotes an LCD display device, and 67 to 71 denote a tone processing device having the first to fifth tone processing characteristics.

The CRT display device 64 of FIG. 59A requires a tone processing device 67 with $\gamma$=½.2 so that $\Gamma$ in *$\gamma$*$\Gamma$out=1. With the PDP display device 65, $\Gamma$ out=1, so that it permits direct display. The LCD display device 66 requires non-linear tone processing as illustrated.

With the CRT display device 64 of FIG. 59B, $\Gamma$ in *$\gamma$*$\Gamma$out=1, so that it permits direct display. The PDP display device 65 requires a tone processing device 70 with $\gamma$=2.2. The LCD display device 66 requires a tone processing device 71.

Another example of image output device is a video printer. It is often designed such that $\Gamma$ out=1. Accordingly, it requires tone processing similar to that required by the PDP display device 65.

It has been assumed that the overall tone characteristic $\Gamma$ in *$\gamma$*$\Gamma$ is equal to 1 (unity). This means image transmission with a high fidelity is desired. Other overall tone characteristics may be desired, and the invention can be adapted for such a requirement.

For instance, the lightness characteristic taking account of the human luminosity characteristic is a L*a*b* color system recommended by CIE in 1976. This color system matches best the human sense. The lightness L* is proportional to the ⅓ power of the luminance data for $\gamma$=1 expressing the luminance component of the video data, and has the tone characteristic of $\gamma$=⅓.

When such a luminosity characteristic is considered, if $\Gamma$ in *$\gamma$*$\Gamma$ out=⅓, a realistic image can be displayed or printed. In the case of the gamma-compensated luminance data with $\Gamma$ in=½, the calculation for $\gamma$=2.⅔=¹/₁.₃₆ for tone processing is required.

Figure 60A:
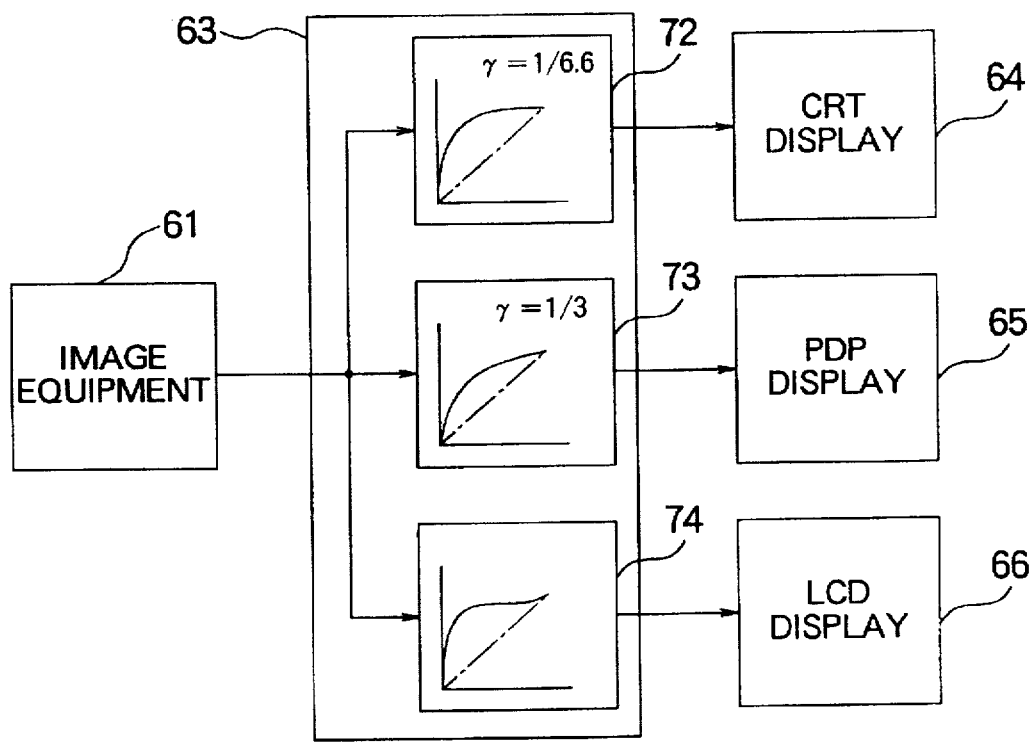
FIG. 60A and FIG. 60B are block diagrams showing the configuration of a modification of the image processing device of Embodiment 28 of the invention.
Figure 60B:
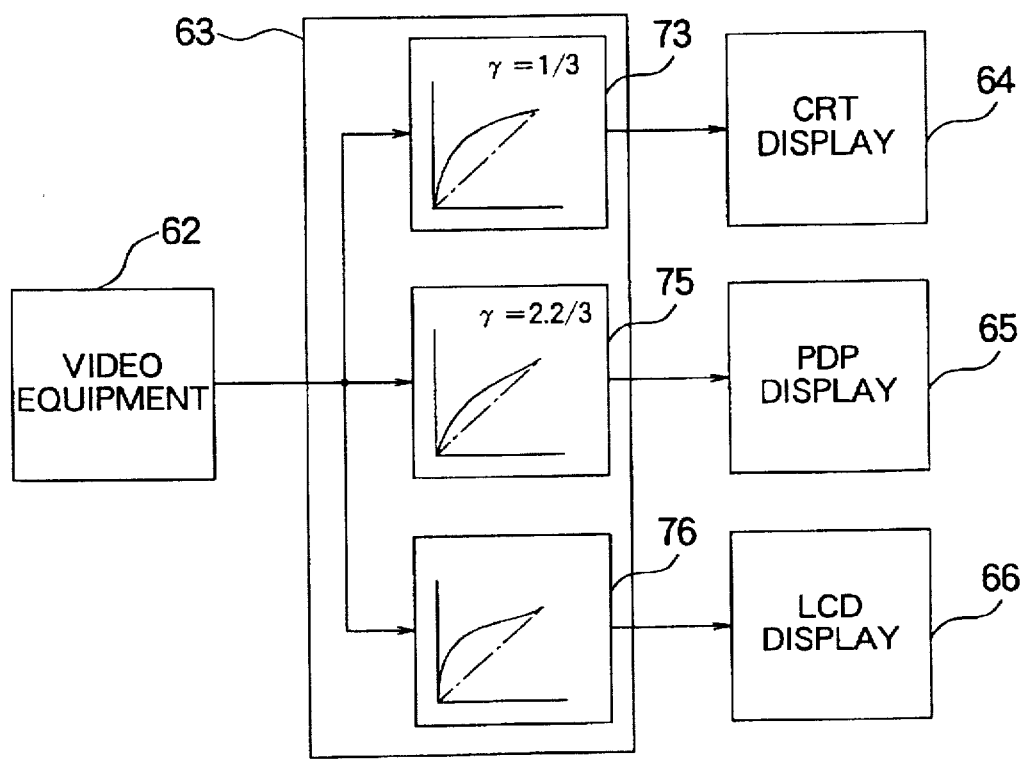
Figure 61:
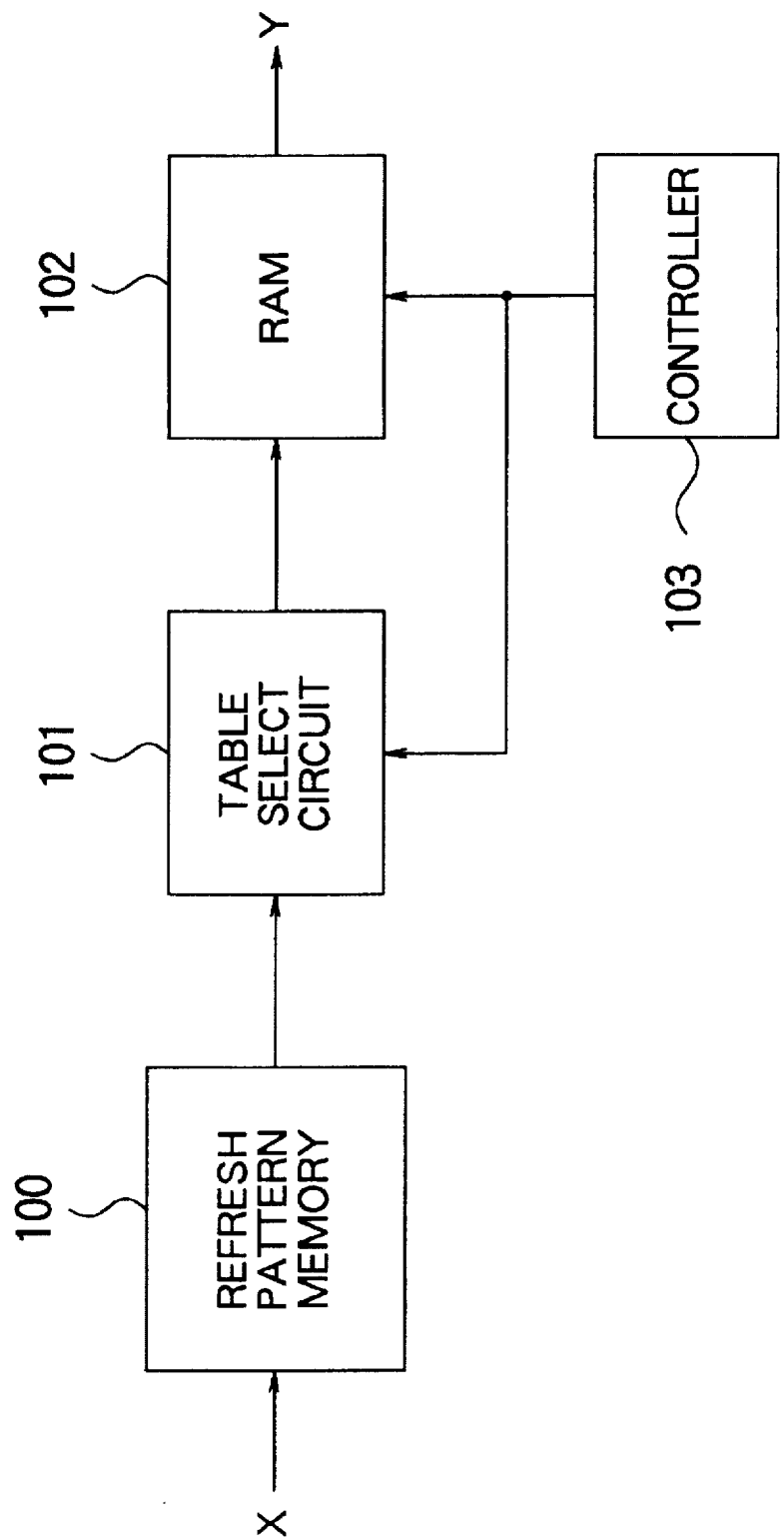
FIG. 61 is a diagram showing an example of conventional tone conversion device.
Figure 62:
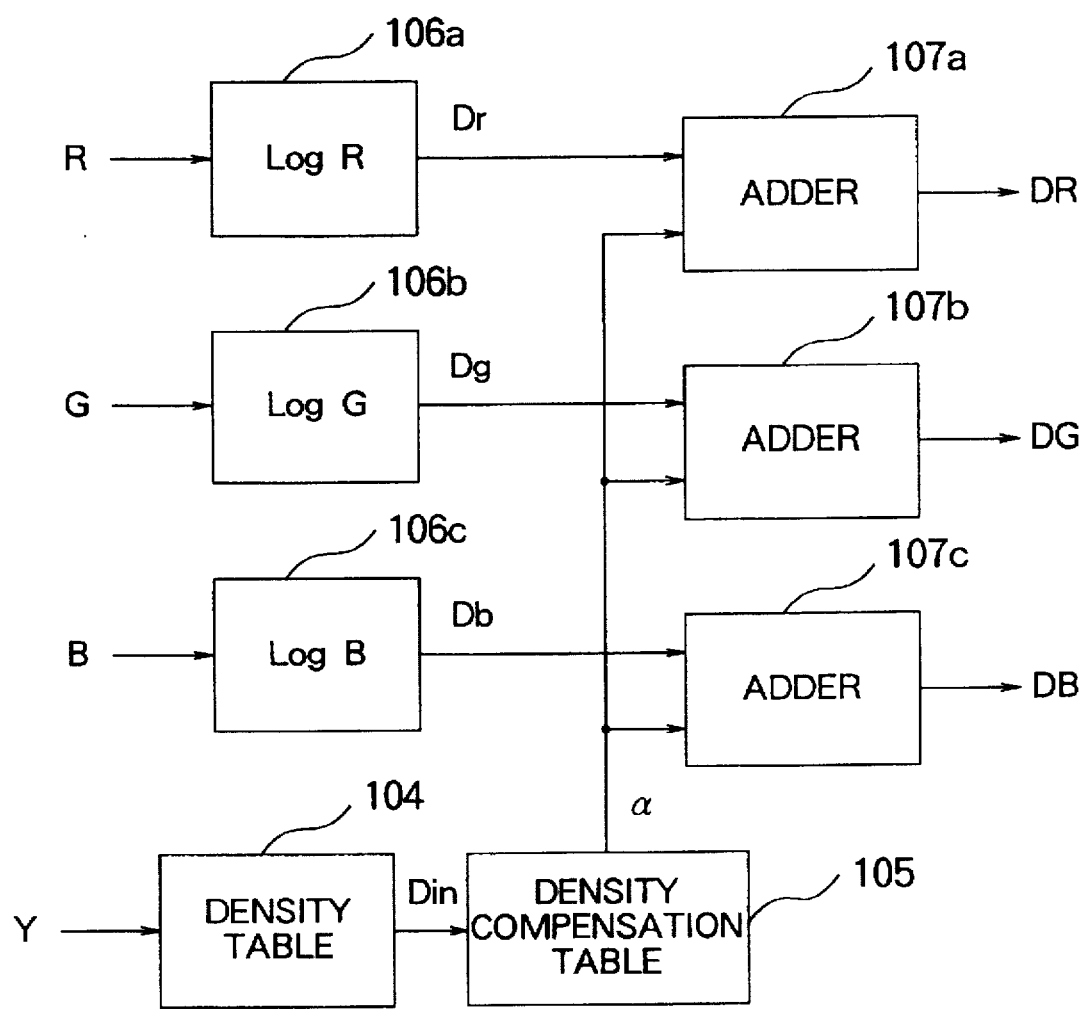
FIG. 62 is a diagram showing another example of conventional tone conversion device.

FIG. 60A and FIG. 60B are block diagrams showing the configurations of the modified image processing devices of Embodiment 28. Here, tone processings for $\gamma=1/6.6$, $\gamma=1/3$, $\gamma=2/3$, and higher-order tone processing for the LCD display device 66 are required.

FIG. 60A is for the case of an image equipment outputting the image data with $\Gamma=1$. FIG. 60B is for the case of an video equipment outputting the image data with $\Gamma$ in=1/2.2. In the figures, reference numerals 72 to 76 are sixth to tenth tone processing devices. The rest of the drawings are similar to those described above.

The CRT display device 64 of FIG. 60A requires a tone processing device 72 with $\gamma=6.6$, so that $\Gamma$ in $*\gamma*\Gamma$ out=1/3. The PDP display device 65 requires a tone processing device 73 with $\gamma=1/3$. The LCD display device 66 requires a non-linear tone processing device 74.

The CRT display device 64 of FIG. 60B requires a tone processing device 73 with $\gamma=1/3$. The PDP display device 65 requires a tone processing device 75 with $\gamma=2.2/3$. The LCD display device 66 requires a tone processing device 76.

The calculation, such as for $\gamma=1/6.6$, produces numerous spurious data data responsive to the input image data of 256 tones, resulting in false profile, so that the picture quality is degraded. The tone processing should therefore be such that the number of input bits of the image data is harmonized with the luminosity characteristic.

The S-shaped tone processing tends to increase the contrast of the image, and produces an image (picture) which is good to the eyes (visually good). For this tone processing, the formula (4) is effective.

It has been reported that the gamma characteristic of a CRT display device is within the range of 1.5<$\Gamma$ out<4. To realize linear total tone processing, tone characteristic of $1/4<\gamma<1/1.5$, or $2/4<\gamma<2.2/1.5$ is required.

It is now becoming increasingly important that the color matching taking account of tone reproducibility and color reproducibility be obtained between image-related equipment, video-related equipment, and printing-related equipment, and processings for unifying the tone characteristic of various equipment.

To cope with various requirements on tone processing, tone processing by means of functional calculation is effective, and the present invention provides one solution.

The tone processing can be effected flexibly according to the input-output characteristic inherent to the equipment, so that appropriate tone processing can be realized for any type of system configuration. Moreover, a single equipment may be so designed to permit a plurality of functional formulae to be used selectively according to the intended use of the tone processing device.

The invention can be used for tone processing of image data of R, G, B color system used in personal computers or the like, luminance and color difference data used in video equipment, ink data of yellow, magenta, cyan and black color system used in printing equipment.

What is claimed is:

1. An image processing method for performing tone calculation on input image data X to produce converted data Y, comprising the steps of:
    setting a functional formula including at least two of a first-order term of the input image data X, a third-order term of the input image data X, and a fraction term of the input image data X; and
    outputting said converted data Y in accordance with said functional formula.

2. The method of claim 1, wherein said converted data Y is expressed by $$Y = X + a1 \cdot X \cdot (X-a2)/(X+a3) \tag{1}$$

or $$Y = X \cdot \{1 + a1 \cdot (X-a2)/(X+a3)\} \tag{2}$$

where a1, a2 and a3 are constants.

3. The method of claim 2, wherein said method is implemented by means of a programmed computer, and
    said setting step includes the substeps of,
        generating the constants a1, a2, and a3;
        determining a difference (X−a2) and a sum (X+a3) from the image data X and the constants a2 and a3;
        determining a retouch amount a1·X·(X−a2)/(X+a3) from said image data X, said difference, said sum and the constant a1; and
    said outputting step includes the substep of,
        determining the converted data Y from the input image data X and said retouch amount.

4. The method of claim 2, wherein said method is implemented by means of a programmed computer, and
    said setting step includes the substeps of,
        generating the constants a1, a2, and a3;
        determining a difference (X−a2) and a sum (X+a3) from the image data X and the constants a2 and a3;
        determining a retouch coefficient 1+a1·(X−a2)/(X+a3) from said image data X, said difference, said sum and the constant a1; and
    said outputting step includes the substep of,
        determining the converted data Y from the input image data X and said retouch coefficient.

5. The method of claim 2, wherein the constants a1, a2 and a3 are varied to realize a selected one of a plurality of tone conversion characteristics.

6. The method of claim 1, wherein said converted data Y is determined from said image data X and constants a1, a2, a3 and a4 in accordance with:

$$Y = X + a1 \cdot X \cdot (X-a2) \cdot (X-a3)/(X+a4) \tag{3}$$

or $$Y = X \cdot \{1 + a1 \cdot (X-a2) \cdot (X-a3)/(X+a4)\} \tag{4}$$

7. The method of claim 6, wherein said method is implemented by means of a programmed computer, and
    said setting step includes the substeps of,
        generating the constants a1, a2, a3, and a4;
        determining differences (X−a2) and (X−a3) and a sum (X+a4) from the image data X and the constants a2, a3 and a4;
        determining a retouch amount a1·X·(X−a2)·(X−a3)/(X+a4) from said image data X, said differences, said sum and the constant a1; and
    said outputting step includes the substep of,
        determining the converted data Y from the input image data X and said retouch amount.

8. The image processing method of claim 6, wherein said method is implemented by means of a programmed computer, and
    said setting step includes the substeps of,
        generating the constants a1, a2, a3 and a4;
        determining differences (X−a2) and (X−a3) and a sum (X+a4) from the image data X and the constants a2, a3 and a4;
        determining a retouch coefficient 1+a1·(X−a2)·(X−a3)/(X+a4) from said image data X, said differences, said sum and the constant a1; and
    said outputting step includes the substep of, determining the converted data Y from the input image data X and said retouch coefficient.

9. The method of claim 6, wherein the constants a1, a2, a3 and a4 are varied to realize a selected one of a plurality of tone conversion characteristics.

10. The method of claim 1, wherein said converted data Y is determined from said image data X and constants a1, a2, a3, a4 and a5 in accordance with:

$$Y=X+a1\cdot X\cdot(X-a2)+a3\cdot X\cdot(X-a2)\cdot(X-a4)/(X+a5) \quad (5)$$

or $$Y=X\{1+a1\cdot(X-a2)+a3\cdot(X-a2)\cdot(X-a4)/(X+a5)\} \quad (6)$$

11. The method of claim 10, wherein said method is implemented by means of a programmed computer, and
said setting step includes the substeps of,
generating the constants a1, a2, a3, a4, and a5;
determining differences (X−a2) and (X−a4) and a sum (X+a5) from the image data X and the constants a2, a4 and a5;
determining a retouch amount a1·X·(X−a2)+a3·X·(X−a2)·(X−a4)/(X+a5) from said image data X, said differences, said sum and the constants a1 and a3; and
said outputting step includes the substep of,
determining the converted data Y from the input image data X and said retouch amount.

12. The method of claim 10, wherein said method is implemented by means of a programmed computer, and
said setting step includes the substeps of,
generating the constants a1, a2, a3, a4 and a5;
determining differences (X−a2) and (X−a4) and a sum (X+a5) from the image data X and the constants a2, a4 and a5;
determining a retouch coefficient 1+a1·(X−a2)+a3(X−a2)·(X−a4)/(X+a5) from said image data X, said differences, said sum and the constants a1 and a3; and
said outputting step includes the substep of,
determining the converted data Y from the input image data X and said retouch coefficient.

13. The method of claim 10, wherein the constants a1, a2, a3, a4, and a5 are varied to realize a selected one of a plurality of tone conversion characteristics.

14. The method of claim 1, wherein said converted data Y is determined from said image data X and constants a1, a2 and a3 in accordance with:

$$Y=X-a1\cdot X\cdot(X-a2)\cdot(X-a3) \quad (7)$$

or $$Y=X\cdot\{1-a1\cdot(X-a2)\cdot(X-a3)\} \quad (8)$$

15. The method of claim 14, wherein said method is implemented by means of a programmed computer, and
said setting step includes the substeps of,
generating the constants a1, a2, and a3;
determining differences (X−a2) and (X−a3) from the image data X and the constants a2 and a3;
determining a retouch amount a1·X·(X−a2)·(X−a3) from said image data X, said differences and the constant a1; and
said outputting step includes the substep of,
determining the converted data Y from the input image data x and said retouch amount.

16. The method of claim 14, wherein said method is implemented by means of a programmed computer, and
said setting step includes the substeps of,
generating the constants a1, a2 and a3;
determining differences (X−a2) and (X−a3) from the image data X and the constants a2 and a3;
determining a retouch coefficient 1−a1·(X−a2)·(X−a3) from said image data X, said differences, and the constant a1; and
said outputting step includes the substep of,
determining the converted data Y from the input image data X and said retouch coefficient.

17. The method of claim 14, wherein the constants a1, a2 and a3 are varied to realize a selected one of a plurality of tone conversion characteristics.

18. The method of claim 1, wherein said converted data Y is determined from said image data X and constants a2, a3, a4 and a5 in accordance with:

$$Y=X-X\cdot(X-a3)\cdot\{a4\cdot(X-a2)+a5\cdot|X-a2|\}$$

or $$Y=X\cdot(1-(X-a3)\cdot\{a4\cdot(X-a2)+a5\cdot|X-a2|\}).$$

19. The method of claim 18, wherein said method is implemented by means of a programmed computer, and
said setting step includes the substeps of,
generating the constants a2, a3, a4 and a5;
determining differences (X−a2) and (X−a3) and an absolute value |X−a2| from the image data X and the constant a2 and a3;
determining a retouch amount X·(X−a3)·{a4(X−a2)+a5·|X−a2|} from said image data X, said differences, said absolute value and the constants a4 and a5; and said outputting step includes the substep of,
determining the converted data Y from the input image data X and said retouch amount.

20. The method of claim 18, wherein said method is implemented by means of a programmed computer, and
said setting step includes the substeps of,
generating the constants a2, a3, a4 and a5;
determining differences (X−a2) and (X−a3), an absolute value |X−a2| from the image data X and the constants a2 and a3;
determining a retouch coefficient 1−(X−a3)·{a4·(X−a2)+a5·|X−a2|} from said image data X, said differences, said absolute value and the constants a4 and a5; and
said outputting step includes the substep of,
determining the converted data Y from the input image data X and said retouch coefficient.

21. The method of claim 18, wherein the constants a2, a3, a4 and a5 are varied to realize a selected one of a plurality of tone conversion characteristics.

22. The method of claim 1, wherein said converted data Y is determined from said image data X, a threshold value h and constants a1, a2, a3, a4 and a5 in accordance with:

$$Y=X-a1\cdot X\cdot(X-h)\cdot(X-a5) \quad (11)$$

when $X \leq h$ $$Y=X-a2\cdot(X-h)\cdot(X-a4)\cdot(X-a5) \quad (12)$$

when $X > h$.

23. The method of claim 22, wherein said method is implemented by means of a programmed computer, and said setting step includes the substeps of,
generating the threshold value h and the constants a1, a2, a3, a4, and a5;
determining differences (X−h), (X−a3), (X−a4) and (X−a5) from said image data X, the threshold value h and the constants a3 to a5;
comparing the image data $\underline{X}$ with the threshold value $\underline{h}$;
determining, from said image data X, said differences and said constants a1 and a2, a retouch amount, depending on the result of the comparison, in accordance with the following formula:

$$a1 \cdot X \cdot (X-h) \cdot (X-a3) \text{ when } X \leq h$$

or $$a2 \cdot X(X-h) \cdot (X-a4) \cdot (X-a5) \text{ when } X > h$$

and
said outputting step includes the substep of,
determining the converted data Y from the input image data X and aid retouch amount.

24. The method of claim 22, wherein the constants a1, a2, a3, a4, and a5 and/or the threshold value $\underline{h}$ are varied to realize a selected one of a plurality of tone conversion characteristics.

25. The method of claim 1, further comprising the step of:
generating said image data X using one of a display device and an image recording device.

26. An image processing method for performing tone calculation on input image data X to produce converted data Y, comprising the steps of:
setting a functional formula, as follows, for determining said converted data Y based on said image data X, a threshold value h, and constants a1, a2 and a3:

$$Y = X - a1 \cdot X \cdot (X-h) \text{ when } X \leq h \qquad (13)$$

$$Y = X - a2 \cdot (X-h) \cdot (X-a3) \text{ when } X > h \qquad (14)$$

and
outputting said converted data Y in accordance with said functional formula.

27. The method of claim 26, wherein said method is implemented by means of a programmed computer, and said setting step includes the substeps of,
generating the threshold value h and the constants a1, a2 and a3;
determining differences (X−h) and (X−a3) from said image data X, the threshold value h and the constant a3;
comparing the image data $\underline{X}$ with the threshold value $\underline{h}$;
determining, from said image data X, said differences and said constants a1 and a2, a retouch amount, depending on the result of the comparison, and in accordance with the following formula:

$$a1 \cdot X \cdot (X-h) \text{ when } X \leq h$$

or $$a2 \cdot (X-h) \cdot (X-a3) \text{ when } X > h$$

and
said outputting step includes the substep of,
determining the converted data Y from the input image data X and said retouch amount.

28. The method of claim 26, wherein the constants a1, a2 and a3 and/or the threshold value $\underline{h}$ are varied to realize a selected one of a plurality of tone conversion characteristics.

29. An image processing device for performing a tone calculation on image data X to produce converted data Y, comprising:
means for setting a functional formula including at least two of a first-order term of the input image data X, a third-order term of the input image data X, and a fraction term of the input image data X; and
means for outputting said converted data Y in accordance with said functional formula.

30. The device of claim 29, wherein
said means for setting includes,
means for generating constants a1, a2 and a3;
means for determining a difference (X−a2) and a sum (X+a3) from the image data X and the constants a2 and a3;
means for determining a retouch amount a1·X·(X−a2)/(X+a3) from said image data $\underline{X}$, said difference, said sum and the constant a1; and
said means for outputting includes,
means for determining the converted data Y from the input image data X and said retouch amount.

31. The device of claim 30, further comprising:
means for varying the constants a1, a2 and a3 to realize a selected one of a plurality of tone conversion characteristics.

32. The device of claim 29, wherein
said means for setting includes,
means for generating constants a1, a2, and a3;
means for determining a difference (X−a2) and a sum (X+a3) from the image data X and the constants a2 and a3;
means for determining a retouch coefficient 1+a1·(X−a2)/(X+a3) from said image data X, said difference, said sum and the constant a1; and
said means for outputting includes,
means for determining the converted data Y from the input image data X and said retouch coefficient.

33. The device of claim 32, further comprising:
means for varying the constants a1, a2 and a3 to realize a selected one of a plurality of tone conversion characteristics.

34. The device of claim 29, wherein
said means for setting includes,
means for generating constants a1, a2, a3, and a4;
means for determining differences (X−a2) and (X−a3) and a sum (X+a4) from the image data X and the constants a2, a3 and a4;
means for determining a retouch amount a1·X·(X−a2)·(X−a3)/(X+a4) from said image data X, said differences, said sum and the constant a1; and
said means for outputting includes,
means for determining the converted data Y from the input image data X and said retouch amount.

35. The device of claim 34, further comprising:
means for varying the constants a1, a2, a3 and a4 to realize a selected one of a plurality of tone conversion characteristics.

36. The device of claim wherein 29, wherein
said means for setting includes,
means for generating constants a1, a2, a3, a4;
means for determining differences (X−a2) and (X−a3) and a sum (X+a4) from the image data X and the constants a2, a3, and a4;

means for determining a retouch coefficient 1+a1·(X−a2)·(X−a3)/(X+a4) from said image data X, said differences, said sum and the constant a1; and said means for outputting includes,
means for determining the converted data Y from the input image data X and said retouch coefficient.

37. The device of claim 36, further comprising:
means for varying the constants a1, a2, a3 and a4 to realize a selected one of a plurality of tone conversion characteristics.

38. The device of claim 29, wherein
said means for setting includes,
means for generating constants a1, a2, a3, a4, and a5;
means for determining differences (X−a2) and (X−a4) and a sum (X+a5) from the image data X and the constants a2, a4 and a5;
means for determining a retouch amount a1·X·(X−a2) +a3·X·(X−a2)·(X−a4)/(X+a5) from said image data X, said differences, said sum and the constants a1 and a3; and said means for outputting includes,
means for determining the converted data Y from the input image data X and said retouch amount.

39. The device of claim 38, further comprising:
means for varying the constants a1, a2, a3, a4 and a5 to realize a selected one of a plurality of tone conversion characteristics.

40. The device of claim 29, wherein
said means for setting includes,
means for generating constants a1, a2, a3, a4 and a5;
means for determining differences (X−a2) and (X−a4) and a sum (X+a5) from the image data X and the constants a2, a4 and a5;
means for determining a retouch coefficient 1+a1·(X−a2)+a3·(X−a2)·(X−a4)/(X+a5) from said image data X, said differences, said sum and the constants a1 and a3; and
means for determining the converted data Y from the input image data X and said retouch amount.

41. The device of claim 40, further comprising:
means for varying the constants a1, a2, a3, a4 and a5 to realize a selected one of a plurality of tone conversion characteristics.

42. The device of claim 29, wherein
means for generating constants a1, a2, a3;
means for determining differences (X−a2) and (X−a3) from the image data X and the constants a2 and a3;
means for determining a retouch amount a1·X·(X−a2)·(X−a3) from said image data X, said differences and the constant a1; and
said means for outputting includes,
means for determining the converted data Y from the input image data. X and said retouch amount.

43. The device of claim 42, further comprising:
means for varying the constants a1, a2, and a3 to realize a selected one of a plurality of tone conversion characteristics.

44. The device of claim 29, wherein
said means for setting includes,
means for generating constants a1, a2 and a3;
means for determining differences (X−a2) and (X−a3) form the image data X and the constants a2 and a3;
means for determining a retouch coefficient 1−a1·(X−a2)·(X−a3) from said image data X, said differences, and the constant a1; and said means for outputting includes,
means for determining the converted data Y from the input image data X and said retouch coefficient.

45. The device of claim 44, further comprising:
means for varying the constants a1, a2 and a3 to realize a selected one of a plurality of tone conversion characteristics.

46. The device of claim 29, wherein
said means for setting includes,
means for generating constants a2, a3, a4 and a5;
means for determining differences (X−a2) and (X−a3) and an absolute value |X−a2| from the image data X and the constants a2 and a3;
means for determining a retouch amount X·(X−a3)·{a4·(X−a2)+a5·|X−a2|} from said image data X, said differences, said absolute value and the constants a4 and a5; and said means for outputting includes,
means for determining the converted data Y from the input image data X and said retouch amount.

47. The device of claim 46, further comprising:
means for varying the constants a2, a3, a4 and a5 to realize a selected one of a plurality of tone conversion characteristics.

48. The device of claim 29, wherein
said means for setting includes,
means for generating constants a2, a3, a4 and a5 ;
means for determining differences (X−a2) and (X−a3), an absolute value |X−a2| from the image data X and the constants a2 and a3;
means for determining a retouch coefficient 1−(X−a3)·{a4·(X−a2)+a5·|X−a2·} from said image data X, said differences, said absolute value and the constants a4 and a5;

and said means for outputting includes,
means for determining the converted data Y from the input image data X and said retouch coefficient.

49. The device of claim 48, further comprising:
means for varying the constants a2, a3, a4 and a5 to realize a selected one of a plurality of tone conversion characteristics.

50. The device of claim 29, wherein
said means for setting includes,
means for generating a threshold value h and constants a1, a2, a3, a4 and a5;
means for determining differences (X−h), (X−a3), (X−a4) and (X−a5) from said image data X, the threshold value h and the constants a3 to a5;
means for comparing the image data X with the threshold value h;
means for determining, from said image data X, said differences and said constants a1 and a2, a retouch amount depending on the result of the comparison, in accordance with:

$a1·X·(X−h)·(X−a3)$ when $X \leq h$ or $a2·(X−h)·(X−a4)·(X−a5)$ when $X > h$ and said means for outputting includes,
means for determining the converted data Y from the input image data X and said retouch amount.

51. The device of claim 50, further comprising:

means for varying the constants a1, a2, a3, a4, and a5 and/or the threshold value h to realize a selected one of a plurality of tone conversion characteristics.

52. The device of claim 29, further comprising: image data generating means for generating said image data X.

53. An image processing device for performing tone calculation on image data X to produce converted data Y, comprising:

means for generating a threshold value h and constants a1, a2 and a3;

means for determining differences (X−h) and (X−a3) from said image data X, the threshold value h and the constant a3;

means for comparing the image data X with the threshold value h;

means for determining, from said image data X, said differences and said constants a1 and a2, a retouch amount depending on the result of the comparison, in accordance with:

$$a1 \cdot X \cdot (X-h) \text{ when } X \leq h$$

or $$a2 \cdot (X-h) \cdot (X-a3) \text{ when } X > h;$$

means for determining the converted data Y from the input image data X and said retouch amount; and means for outputting the converted data Y.

54. The device of claim 53, further comprising:

means for varying the constants a1, a2 and a3 and/or the threshold value h to realize a selected one of a plurality of tone conversion characteristics.

55. An image processing method for performing tone calculation on input image data X to produce converted data Y, comprising the steps of:

setting a functional formula including at least two of a second-order term of the input image data X, a third-order term of the input image data X, and a fraction term of the input image data X; and outputting said converted data Y in accordance with said functional formula.

56. The method of claim 55, wherein said converted data Y is expressed by $$Y = X + a1 \cdot X \cdot (X-a2)/(X+a3) \tag{1}$$

or $$Y = X \cdot \{1 + a1 \cdot (X-a2)/(X+a3)\} \tag{2}$$

wherein a1, a2 and a3 are constants.

57. The method of claim 56, wherein said method is implemented by means of a programmed computer, and said setting step includes the substeps of,
generating the constants a1, a2, and a3;
determining a difference (X−a2) and a sum (X+a3) from the image data X and the constants a2 and a3;
determining a retouch amount a1·X·(X−a2)/(X+a3) from said image data X, said difference, said sum and the constant a1; and said outputting step includes the substep of,
determining the converted data Y from the input image data X and said retouch amount.

58. The method of claim 56, wherein said method is implemented by means of a programmed computer, and said setting step includes the substeps of,
generating the constants a1, a2, and a3;
determining a difference (X−a2) and a sum (X+a3) from the image data X and the constants a2 and a3;
determining a retouch coefficient 1+a1·(X−a2)/(X+a3) from said image data X, said difference, said sum and the constant a1; and said outputting step includes the substep of,
determining the converted data Y from the input image data X and said retouch coefficient.

59. The device of claim 58, wherein said image data generating means includes one of a display device and an image recording device.

60. The method of claim 56, wherein the constants a1, a2 and a3 are varied to realize a selected one of a plurality of tone conversion characteristics.

61. The method of claim 55, wherein said converted data Y is determined from said image data X and constants a1, a2, a3 and a4 in accordance with:

$$Y = X + a1 \cdot X \cdot (X-a2) \cdot (X-a3)/(X+a4) \tag{3}$$

or $$Y = X \cdot \{1 + a1 \cdot (X-a2) \cdot (X-a3)/(X+a4)\} \tag{4}$$

62. The method of claim 61, wherein said method is implemented by means of a programmed computer, and said setting step includes the substeps of,
generating the constants a1, a2, a3, and a4;
determining differences (X−a2) and (X−a3) and a sum (X+a4) from the image data X and the constants a2, a3 and a4;
determining a retouch amount a1·X·(X−a2)·(X−a3)/(X+a4) from said image data X, said differences, said sum and the constant a1; and said outputting step includes the substep of,
determining the converted data Y from the input image data X and said retouch amount.

63. The image processing method of claim 61, wherein said method is implemented by means of a programmed computer, and said setting step includes the substeps of,
generating the constants a1, a2, a3 and a4;
determining differences (X−a2) and (X−a3) and a sum (X+a4) from the image data X and the constants a2, a3 and a4;
determining a retouch coefficient 1+a1·(X−a2)·(X−a3)/(X+a4) from said image data X, said differences, said sum and the constant a1; and said outputting step includes the substep of,
determining the converted data Y from the input image data X and said retouch coefficient.

64. The method of claim 61, wherein the constants a1, a2, a3 and a4 are varied to realize a selected one of a plurality of tone conversion characteristics.

65. The method of claim 55, wherein said converted data Y is determined from said image data X and constants a1, a2, a3, a4, and a5 in accordance with:

$$Y = X + a1 \cdot X \cdot (X-a2) + a3 \cdot X \cdot (X-a2) \cdot (X-a4)/(X+a5) \tag{5}$$

or $$Y = X \cdot \{1 + a1 \cdot (X-a2) + a3 \cdot (X-a2) \cdot (X-a4)/(X+a5)\} \tag{6}$$

66. The method of claim 65, wherein said method is implemented by means of a programmed computer, and said setting step includes the substeps of,
  generating the constants a1, a2, a3, a4, and a5;
  determining differences (X–a2) and (X–a4) and a sum (X+a5) from the image data X and the constants a2, a4 and a5;
  determining a retouch amount a1·X·(X–a2)+a3·X·(X–a2)·(X–a4)/(X+a5) from said image data X, said differences, said sum and the constants a1 and a3; and said outputting step includes the substep of,
  determining the converted data Y from the input image data X and said retouch amount.

67. The method of claim 65, wherein said method is implemented by means of a programmed computer, and
  said setting step includes the substeps of,
    generating the constants a1, a2, a3, a4 and a5;
    determining differences (X a2) and (X–a4) and a sum (X+a5 from the image data X and the constants a2, a4 and a5;
    determining a retouch coefficient 1+a1·(X–a2)+a3·(X–a2)·(X–a4)/(X+a5) from said image data X, said differences,
  said sum and the constants a1 and a3; and said outputting step includes the substep of,
    determining the converted data Y from the input image data X and said retouch coefficient.

68. The method of claim 65, wherein the constants a1, a2, a3, a4, and a5 are varied to realize a selected one of a plurality of tone conversion characteristics.

69. The method of claim 55, wherein said converted data Y is determined from said image data X and constants a1, a2, and a3 in accordance with:

$$Y = X - a1 \cdot X \cdot (X-a2) \cdot (X-a3) \tag{7}$$

or $$Y = X \cdot \{1 - a1 \cdot (X-a2) \cdot (X-a3)\} \tag{8}$$

70. The method of claim 69, wherein said method is implemented by means of a programmed computer, and
  said setting step includes the substeps of,
    generating the constants a1, a2, and a3;
    determining differences (X–a2) and (X–a3) from the image data X and the constants a2 and a3;
    determining a retouch amount a1·X·(X–a2)·(X–a3) from said image data X, said differences and the constant a1; and said outputting step includes the substep of,
    determining the converted data Y from the input image data X and said retouch amount.

71. The method of claim 69, wherein said method is implemented by means of a programmed computer, and
  said setting step includes the substeps of,
  generating the constants a1, a2 and a3;
    determining differences (X–a2) and (X–a3) from the image data X and the constants a2 and a3;
    determining a retouch coefficient 1–a1·(X–a2)·(X–a3) from said image data X, said differences, and the constant a1; and said outputting step includes the substep of,
    determining the converted data Y from the input image data X and said retouch coefficient.

72. The method of claim 69, wherein the constants a1, a2 and a3 are varied to realize a selected one of a plurality of tone conversion characteristics.

73. The method of claim 55, wherein said converted data Y is determined from said image data X and constants a2, a3, a4 and a5 in accordance with:

$$Y = X - X \cdot (X-a3) \cdot \{a4 \cdot (X-a2)+a5 \cdot |X-a2|\} \tag{9}$$

or $$Y = X \cdot (1-(X-a3) \cdot \{a4 \cdot (X-a2)+a5 \cdot |X-a2|\}) \tag{10}$$

74. The method of claim 73, wherein said method is implemented by means of a programmed computer, and
  said setting step includes the substeps of,
    generating the constants a2, a3, a4 and a5;
    determining differences (X–a2) and (X–a3) and an absolute value |X–a2| from the image data X and the constant a2 and a3;
    determining a retouch amount X·(X–a3)·{a4·(X–a2)+a5·|X–a2|} from said image data X, said differences, said absolute value and the constants a4 and a5; and said outputting step includes the substep of,
    determining the converted data Y from the input image data X and said retouch amount.

75. The method of claim 73, wherein said method is implemented by means of a programmed computer, and
  said setting step includes the substeps of,
    generating the constants a2, a3, a4 and a5;
    determining differences (X–a2) and (X–a3), an absolute value |X–a2| from the image data X and the constants a2 and a3 ;
    determining a retouch coefficient 1–(X–a3)·{a4·(X–a2)+a5·|X–a2|} from said image data X, said differences, said absolute value and the constants a4 and a5; and said outputting step includes the substep of,
    determining the converted data Y from the input image data X and said retouch coefficient.

76. The method of 73, wherein the constants a2, a3, a4 and a5 are varied to realize a selected one of a plurality of tone conversion characteristics.

77. The method of claim 55, wherein said converted data Y is determined from said image data X, a threshold value h and constants a1, a2, a3, a4, and a5 in accordance with:

$$Y = X - a1 \cdot X \cdot (X-h) \cdot (X-a3) \tag{11}$$

when $X \leq h$ $$Y = X - a2 \cdot (X-h) \cdot (X-a4) \cdot (X-a5) \tag{12}$$

when $X \geq h$.

78. The method of claim 77, wherein said method is implemented by means of a programmed computer, and
  said setting step includes the substeps of,
    generating the threshold value h and the constants a1, a2, a3, a4, and a5;
    determining differences (X–h), (X–a3), (X–a4) and (X–a5) from said image data X, the threshold value h and the constants a3 to a5;
    comparing the image data X with the threshold value h;
    determining, from said image data X, said differences and said constants a1 and a2, a retouch amount, depending on the result of the comparison, in accordance with the following formulas:

$$a1 \cdot X \cdot (X-h) \cdot (X-a3) \text{ when } X \leq h$$

or $a2 \cdot (X-h) \cdot (X-a4) \cdot (X-a5)$ when $X > h$ and said outputting step includes the substep of,
determining the converted data Y from the input image data X and aid retouch amount.

79. The method of claim 77, wherein the constants a1, a2, a3, a4, and a5 and/or the threshold value h are varied to realize a selected one of a plurality of tone conversion characteristics.

80. An image processing device for performing a tone calculation on image data X to produce converted data Y, comprising:

means for setting a functional formula including at least two of a second-order term of the input image data X, a third-order term of the input image data X, and a fraction term of the input image data X; and means for outputting said converted data Y in accordance with said functional formula.

81. The device of claim 80, wherein
said means for setting includes,
means for generating constants a1, a2 and a3;
means for determining a difference (X−a2) and a sum (X+a3) from the image data X and the constants a2 and a3;
means for determining a retouch amount a1·X·(X−a2)/(X+a3) from said image data X, said difference, said sum and the constant a1; and
said means for outputting includes,
means for determining the converted data Y from the input image data X and said retouch amount.

82. The device of claim 81, further comprising:
means for varying the constants a1, a2 and a3 to realize a selected one of a plurality of tone conversion characteristics.

83. The device of claim 80, wherein
said means for setting includes,
means for generating constants a1, a2, and a3;
means for determining a difference (X−a2) and a sum (X+a3) from the image data X and the constants a2 and a3;
means for determining a retouch coefficient 1+a1·(X−a2)/(X+a3) from said image data X, said difference, said sum and the constant a1; and
said means for outputting includes,
means for determining the converted data Y from the input image data X and said retouch coefficient.

84. The device of claim 83, further comprising:
means for varying the constants a1, a2 and a3 to realize a selected one of a plurality of tone conversion characteristics.

85. The device of claim 80, wherein
said means for setting includes,
means for generating constants a1, a2, a3, and a4;
means for determining differences (X−a2) and (X−a3) and a sum (X+a4) from the image data X and the constants a2, a3 and a4;
means for determining a retouch amount a1·X·(X−a2)·(X−a3)/(X+a4) from said image data X, said differences, said sum and the constant a1; and
said means for outputting includes,
means for determining the converted data Y from the input image data X and said retouch amount.

86. The device of claim 85, further comprising:
means for varying the constants a1, a2, a3 and a4 to realize a selected one of a plurality of tone conversion characteristics.

87. The device of claim 80, wherein
said means for setting includes,
means for generating constants a1, a2, a3, a4;
means for determining differences (X−a2) and (X−a3) and a sum (X+a4) from the image data X and the constants a2, a3, and a4;
means for determining a retouch coefficient 1+a1·(X−a2)·(X−a3)/(X+a4) from said image data X, said differences, said sum and the constant a1; and
said means for outputting includes,
means for determining the converted data Y from the input image data X and said retouch coefficient.

88. The device of claim 87, further comprising:
means for varying the constants a1, a2, a3 and a4 to realize a selected one of a plurality of tone conversion characteristics.

89. The device of claim 80, wherein
said means for setting includes,
means for generating constants a1, a2, a3, a4, and a5;
means for determining differences (X−a2) and (X−a4) and a sum (X+a5) from the image data X and the constants a2, a4 and a5;
means for determining a retouch amount a1·X·(X−a2)+a3·X·(X−a2)·(X−a4)/(X+a5) from said image data X, said differences, said sum and the constants a1 and a3; and
said means for outputting includes,
means for determining the converted data Y from the input image data X and said retouch amount.

90. The device of claim 89, further comprising:
means for varying the constants a1, a2, a3, a4 and a5 to realize a selected one of a plurality of tone conversion characteristics.

91. The device of claim 80, wherein
said means for setting includes,
means for generating constants a1, a2, a3, a4 and a5;
means for determining differences (X−a2) and (X−a4) and a sum (X+a5) from the image data X and the constants a2, a4 and a5;
means for determining a retouch coefficient 1+a1·(X−a2)+a3·(X−a2)·(X−a4)/(X+a5) from said image data X, said differences, said sum and the constants a1 and a3; and
means for determining the converted data Y from the input image data X and said retouch amount.

92. The device of claim 91, further comprising:
means for varying the constants a1, a2, a3, a4 and a5 to realize a selected one of a plurality of tone conversion characteristics.

93. The device of claim 80, wherein
means for generating constants a1, a2, a3;
means for determining differences (X−a2) and (X−a3) from the image data X and the constants a2 and a3;
means for determining a retouch amount a1·X·(X−a2)·(X−a3) from said image data X, said differences and the constant a1; and
said means for outputting includes,
means for determining the converted data Y from the input image data X and said retouch amount.

94. The device of claim 93, further comprising:
means for varying the constants a1, a2, and a3 to realize a selected one of a plurality of tone conversion characteristics.

95. The device of claim 80, wherein
said means for setting includes, means for generating constants a1, a2 and a3;

means for determining differences (X–a2) and (X–a3) form the image data X and the constants a2 and a3;

means for determining a retouch coefficient 1–a1·(X–a2)·(X–a3) from said image data X, said differences, and the constant a1; and said means for outputting includes, means for determining the converted data Y from the input image data X and said retouch coefficient.

96. The device of claim 95, further comprising:

means for varying the constants a1, a2 and a3 to realize a selected one of a plurality of tone conversion characteristics.

97. The device of claim 80, wherein said means for setting includes, means for generating constants a2, a3, a4 and a5;

means for determining differences (X–a2) and (X–a3) and an absolute value |X–a2| from the image data X and the constants a2 and a3;

means for determining a retouch amount X·(X–a3)·{a4·(X–a2)+a5·|X–a2|} from said image data X, said differences, said absolute value and the constants a4 and a5; and said means for outputting includes, means for determining the converted data Y from the input image data X and said retouch amount.

98. The device of claim 97, further comprising:

means for varying the constants a2, a3, a4 and a5 to realize a selected one of a plurality of tone conversion characteristics.

99. The device of claim 80, wherein said means for setting includes, means for generating constants a2, a3, a4 and a5;

means for determining differences (X–a2) and (X–a3), an absolute value |X–a2| from the image data X and the constants a2 and a3;

means for determining a retouch coefficient 1–(X–a3)·{a4·(X–a2)+a5·|X–a2|} from said image data X, said differences, said absolute value and the constants a4 and a5; and said means for outputting includes, means for determining the converted data Y from the input image data X and said retouch coefficient.

100. The device of claim 99, further comprising:

means for varying the constants a2, a3, a4 and a5 to realize a selected one of a plurality of tone conversion characteristics.

101. The device of claim 80, wherein said means for setting includes, means for generating a threshold value h and constants a1, a2, a3, a4 and a5;

means for determining differences (X–h), (X–a3), (X–a4) and (X–a5) from said image data X, the threshold value h and the constants a3 to a5;

means for comparing the image data X with the threshold value h;

means for determining, from said image data X, said differences and said constants a1 and a2, a retouch amount depending on the result of the comparison, in accordance with:

$$a1 \cdot X \cdot (X-h) \cdot (X-a3) \text{ when } X > h$$

or $$a2 \cdot (X-h) \cdot (X-a4) \cdot (X-a5) \text{ when } X > h$$

and said means for outputting includes, means for determining the converted data Y from the input image data X and said retouch amount.

102. The device of claim 101, further comprising:

means for varying the constants a1, a2, a3, a4, and a5 and/or the threshold value h to realize a selected one of a plurality of tone conversion characteristics.

* * * * *